(12) United States Patent
Brouwer et al.

(10) Patent No.: US 9,182,045 B2
(45) Date of Patent: Nov. 10, 2015

(54) CONCENTRIC DIVERTER CARTRIDGE

(71) Applicant: Kohler Co., Kohler, WI (US)

(72) Inventors: Douglas J. Brouwer, Sheboygan, WI (US); Michael A. Niver, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 239 days.

(21) Appl. No.: 13/802,186

(22) Filed: Mar. 13, 2013

(65) Prior Publication Data

US 2014/0261813 A1    Sep. 18, 2014

(51) Int. Cl.
*F16K 11/20* (2006.01)
*F16K 11/00* (2006.01)

(52) U.S. Cl.
CPC ......... *F16K 11/00* (2013.01); *Y10T 137/86863* (2015.04)

(58) Field of Classification Search
CPC .............................. F16K 11/00; F16K 11/0743
USPC ................... 137/597, 625.15, 625.31, 625.46
See application file for complete search history.

(56) References Cited

U.S. PATENT DOCUMENTS

| | | | |
|---|---|---|---|
| 2,145,114 A | 1/1939 | Gibbs et al. | |
| 2,983,279 A | 5/1961 | Biermann | |
| RE25,037 E | 9/1961 | Brazier | |
| 3,385,321 A * | 5/1968 | Ehrens et al. | 137/625.46 |
| 3,688,790 A | 9/1972 | Esten | |
| 3,724,480 A | 4/1973 | Povalski et al. | |
| 3,770,017 A | 11/1973 | Enterante | |
| 3,794,075 A | 2/1974 | Stoll et al. | |
| 3,823,737 A | 7/1974 | Szymanski | |
| 3,946,756 A | 3/1976 | Specht | |
| 4,095,610 A | 6/1978 | Priesmeyer | |
| 4,121,761 A | 10/1978 | Nolden | |
| 4,174,726 A | 11/1979 | Arnold et al. | |
| 4,220,175 A | 9/1980 | Keller et al. | |
| 4,381,073 A | 4/1983 | Gloor | |
| 4,397,330 A | 8/1983 | Hayman | |
| 4,516,753 A | 5/1985 | Thomsen | |
| 4,609,007 A | 9/1986 | Uhl | |

(Continued)

FOREIGN PATENT DOCUMENTS

WO    WO 2010/069606    6/2010

OTHER PUBLICATIONS

Aquatite Wetwall Caddy Installation Instructions, 2005, 2 pages.

(Continued)

*Primary Examiner* — John K Fristoe, Jr.
*Assistant Examiner* — Reinaldo Sanchez-Medina
(74) *Attorney, Agent, or Firm* — Foley & Lardner LLP

(57) ABSTRACT

A diverter cartridge for a fluid mixing valve includes an inlet adapter having a first inlet port, a second inlet port, a first outlet port and a second outlet port. The cartridge further includes a diverter plate having a first inlet channel and a second inlet channel. The diverter plate is rotatable relative to the inlet adapter between a first end position, a second end position, and a neutral position between the first and second end positions. Rotation of the diverter plate from the neutral position toward the first end position increases a volume flow rate through the cartridge and diverts the fluid to the first outlet port. Rotation of the diverter plate from the neutral position toward the second end position increases a volume flow rate through the cartridge and diverts the fluid to the second outlet port.

17 Claims, 43 Drawing Sheets

(56) References Cited

U.S. PATENT DOCUMENTS

| | | |
|---|---|---|
| 4,662,389 A | 5/1987 | Igbal |
| 4,681,140 A | 7/1987 | Hayman |
| 4,896,381 A | 1/1990 | Hutto |
| 4,905,732 A | 3/1990 | Bright et al. |
| 4,915,295 A | 4/1990 | Pullen et al. |
| 4,923,092 A | 5/1990 | Kirschner et al. |
| 4,978,059 A | 12/1990 | Nicklas et al. |
| 5,129,576 A | 7/1992 | Pullen et al. |
| 5,137,048 A | 8/1992 | Brattoli |
| 5,170,816 A | 12/1992 | Schnieders |
| 5,331,996 A | 7/1994 | Ziehm |
| 5,340,018 A | 8/1994 | MacDonald |
| 5,341,845 A * | 8/1994 | Graber .................... 137/625.41 |
| 5,355,906 A | 10/1994 | Marty et al. |
| 5,425,394 A | 6/1995 | Clare |
| 5,433,378 A | 7/1995 | Orlandi |
| 5,441,075 A | 8/1995 | Clare |
| 5,501,244 A | 3/1996 | Shahriar |
| 5,505,225 A | 4/1996 | Niakan |
| 5,518,019 A | 5/1996 | Clare |
| 5,518,022 A | 5/1996 | Ziehm |
| 5,634,391 A | 6/1997 | Eady |
| 5,725,010 A | 3/1998 | Marty et al. |
| 5,730,171 A | 3/1998 | Niakan |
| 5,732,729 A | 3/1998 | Shieh |
| 5,807,983 A | 9/1998 | Jiang et al. |
| 5,829,469 A | 11/1998 | Sileno et al. |
| 5,893,386 A | 4/1999 | Caria et al. |
| 6,012,476 A | 1/2000 | Ko |
| 6,050,285 A | 4/2000 | Goncze et al. |
| 6,052,929 A | 4/2000 | Canadas |
| 6,123,094 A | 9/2000 | Breda |
| 6,161,567 A | 12/2000 | Ziehm |
| 6,237,622 B1 | 5/2001 | Cook et al. |
| 6,279,604 B1 | 8/2001 | Korb et al. |
| 6,283,447 B1 | 9/2001 | Fleet |
| 6,302,131 B1 | 10/2001 | Pitsch |
| 6,343,619 B1 | 2/2002 | Pruitt |
| 6,357,476 B1 * | 3/2002 | Moretti .................... 137/597 |
| 6,378,911 B1 | 4/2002 | Grohe |
| 6,382,517 B1 | 5/2002 | Bommelaer et al. |
| 6,427,713 B1 | 8/2002 | Dempsey et al. |
| 6,484,949 B2 | 11/2002 | Procter |
| 6,546,948 B2 | 4/2003 | Tarzia |
| 6,561,548 B1 | 5/2003 | Mantel et al. |
| 6,718,569 B2 | 4/2004 | Burger et al. |
| 6,732,754 B2 | 5/2004 | Ottelli |
| 6,761,184 B1 | 7/2004 | Jordan |
| 6,832,396 B1 | 12/2004 | Lin |
| 6,845,785 B1 | 1/2005 | Condon |
| 6,877,523 B2 | 4/2005 | Dempsey et al. |
| 6,880,565 B2 | 4/2005 | Ouyoung |
| 7,021,337 B2 | 4/2006 | Markham |
| 7,063,098 B2 | 6/2006 | Sprague |
| 7,073,725 B2 | 7/2006 | Swadling |
| 7,077,150 B2 | 7/2006 | McNerney |
| RE39,257 E | 9/2006 | Kamimura et al. |
| 7,100,630 B2 | 9/2006 | Vu et al. |
| 7,163,157 B2 | 1/2007 | Goncze et al. |
| 7,337,804 B2 | 3/2008 | Rosko |
| 7,344,088 B2 | 3/2008 | Yang |
| 7,509,971 B2 | 3/2009 | Kajuch |
| D621,479 S | 8/2010 | McNerney |
| 7,775,234 B2 | 8/2010 | Campisi |
| 7,775,450 B2 | 8/2010 | Warshawsky |
| 7,823,603 B2 | 11/2010 | Cochart et al. |
| 7,841,362 B2 | 11/2010 | Kim |
| 7,874,318 B2 | 1/2011 | Malone et al. |
| 8,162,001 B2 | 4/2012 | Yang |
| 8,176,934 B2 | 5/2012 | Niver |
| 8,408,239 B2 | 4/2013 | King |
| 2003/0213850 A1 | 11/2003 | Mayer et al. |
| 2004/0094214 A1 | 5/2004 | Ottelli |
| 2004/0261864 A1 | 12/2004 | Coll |
| 2005/0067017 A1 | 3/2005 | Condon et al. |
| 2006/0231140 A1 | 10/2006 | McNerney |
| 2008/0029156 A1 | 2/2008 | Rosal et al. |
| 2008/0053528 A1 | 3/2008 | Breda |
| 2009/0260696 A1 | 10/2009 | Cruickshank et al. |
| 2010/0006169 A1 | 1/2010 | Bolgar et al. |
| 2010/0058534 A1 | 3/2010 | Martin et al. |
| 2011/0265890 A1 | 11/2011 | Killian |
| 2011/0266355 A1 | 11/2011 | Yang |
| 2012/0279595 A1 | 11/2012 | Huck et al. |

OTHER PUBLICATIONS

Delta, MultiChoice Installation Instructions, 2011, 6 pages.
Hansgrohe, iBox Universal Plus, Planning and Installation, Mar. 2011, 26 pages.

* cited by examiner

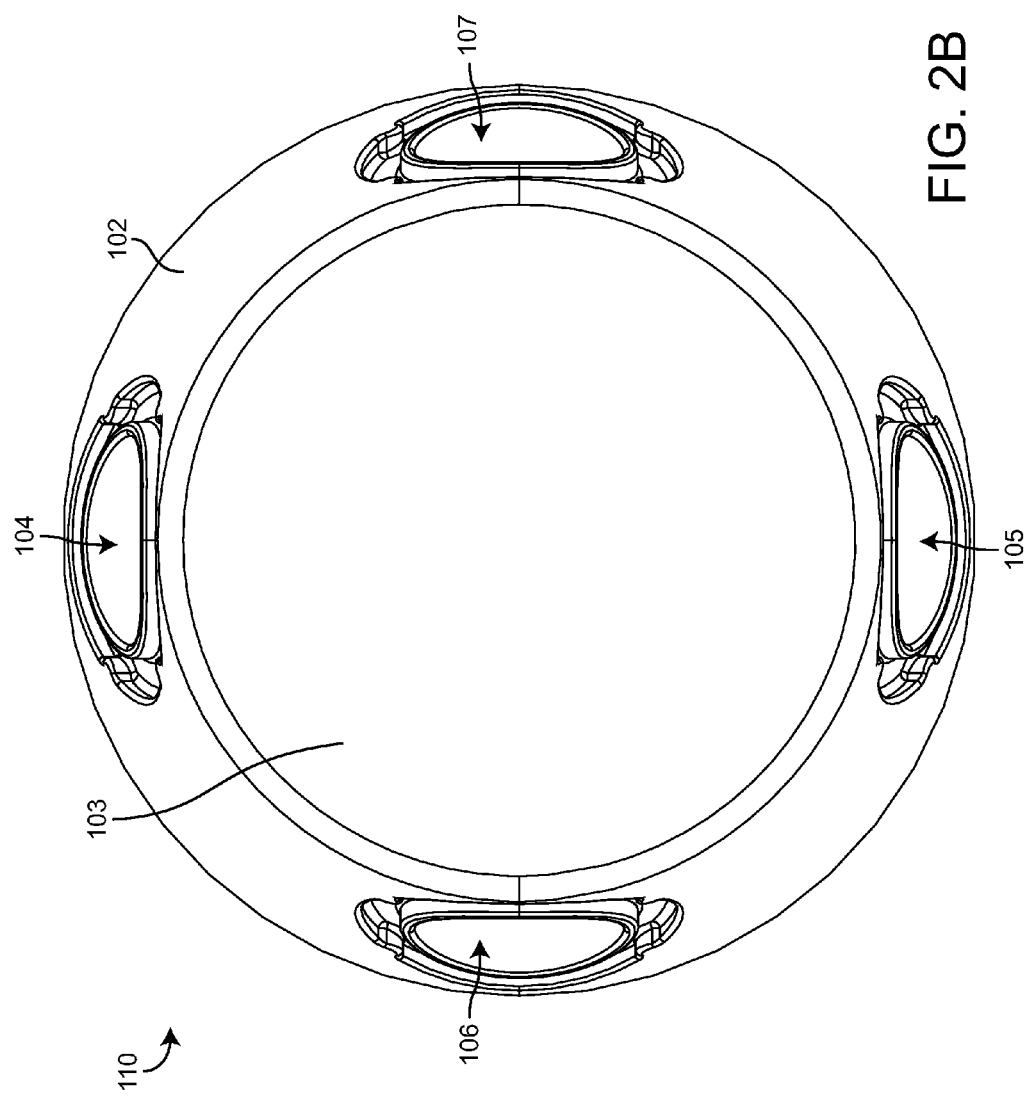

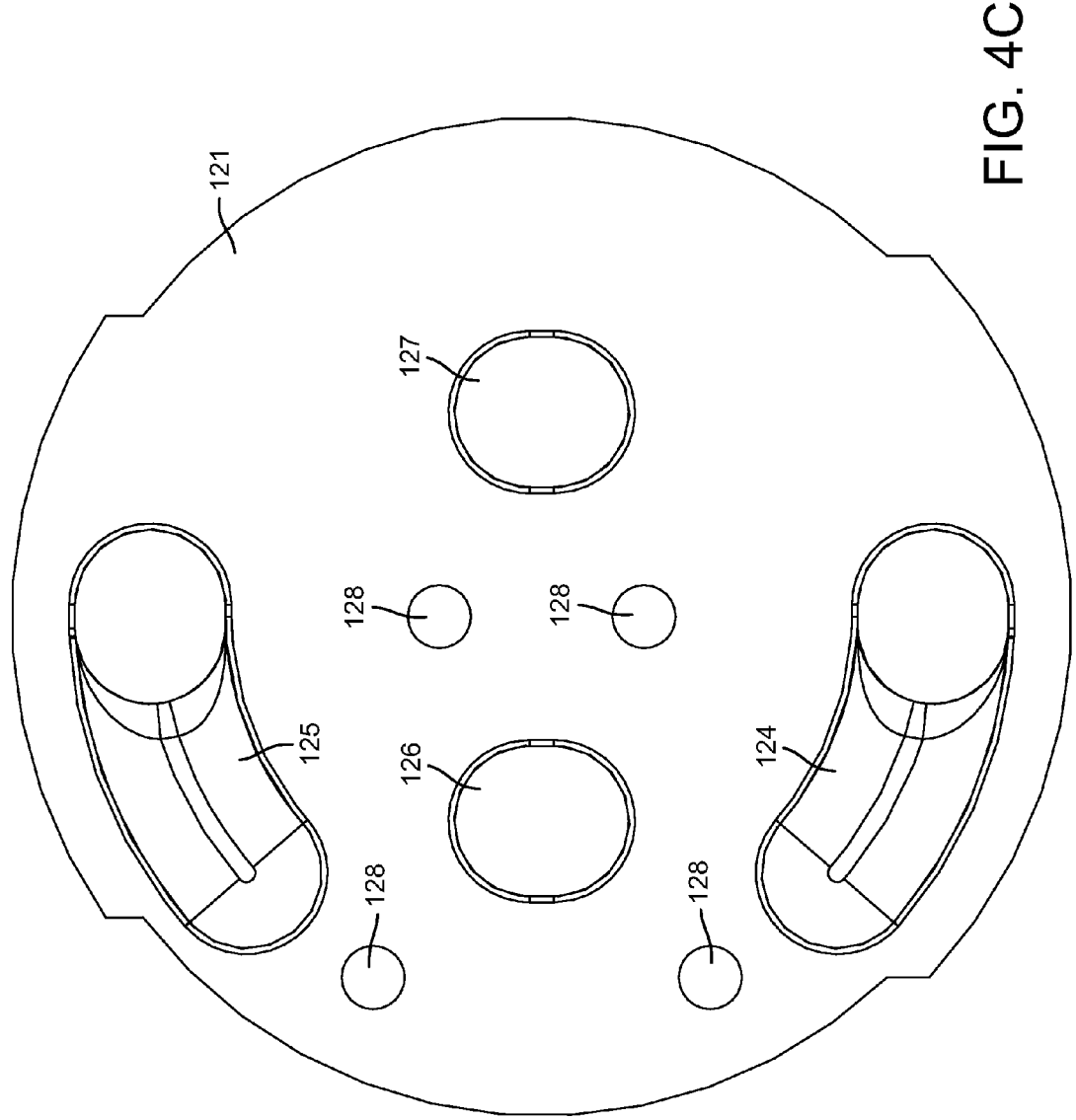

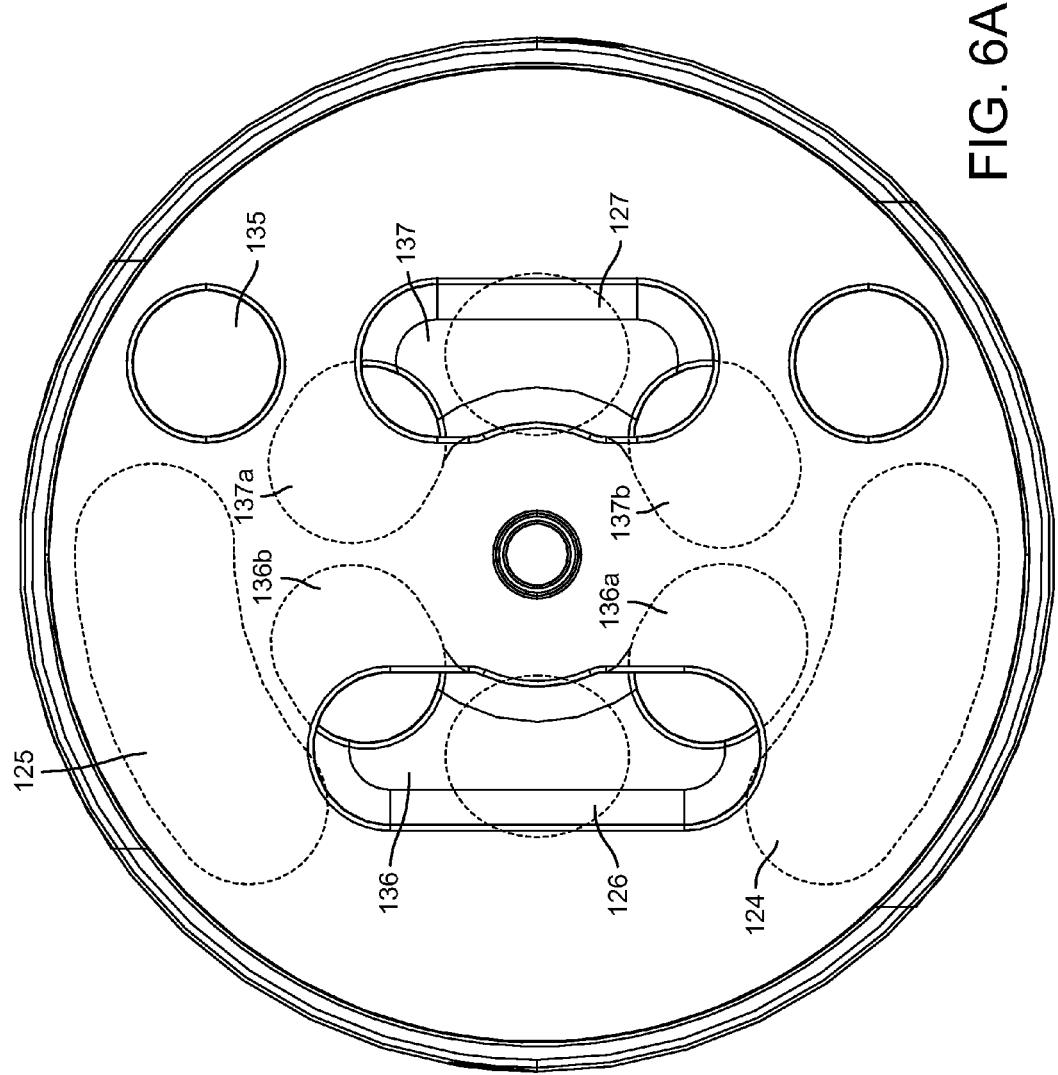

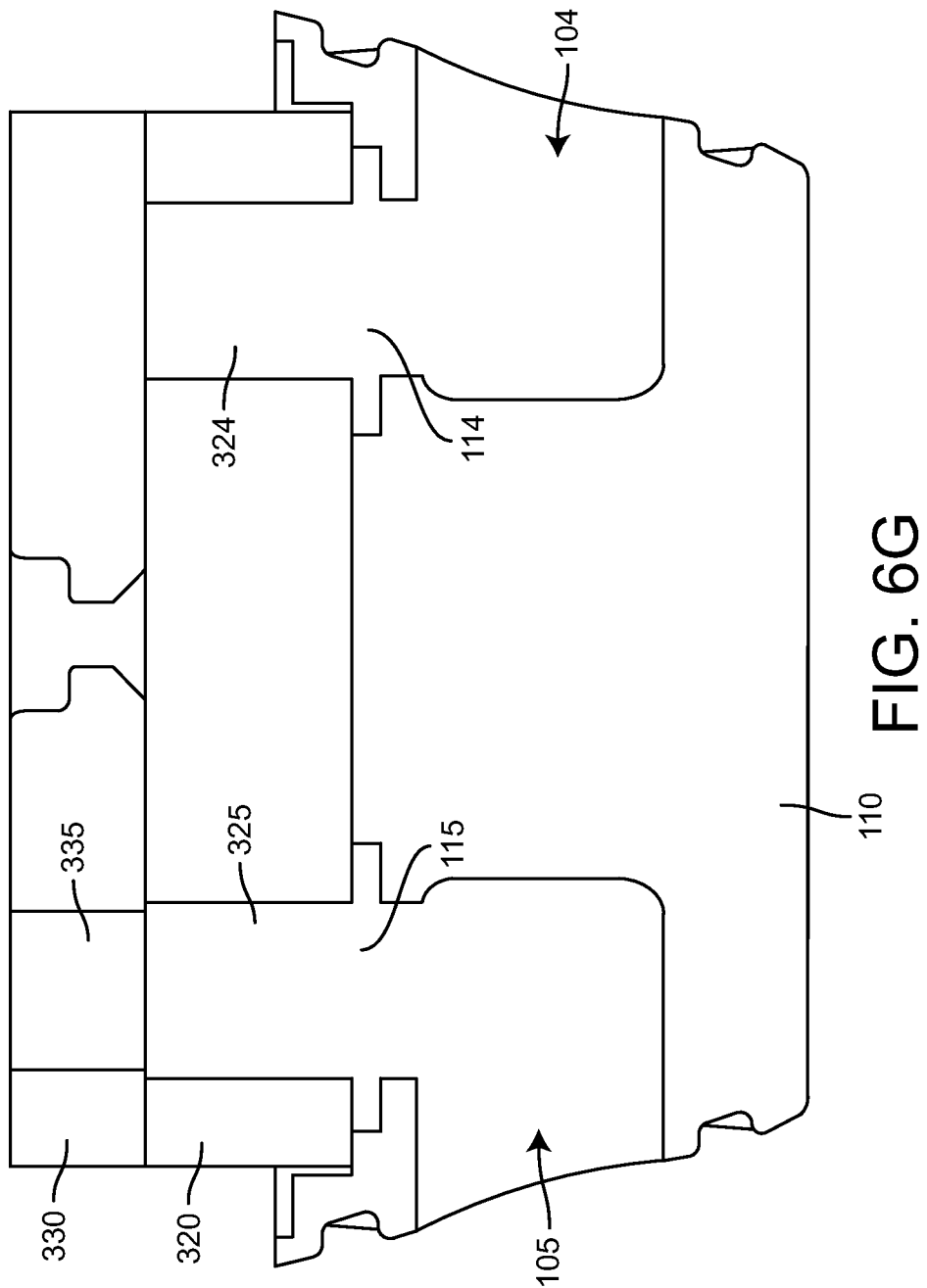

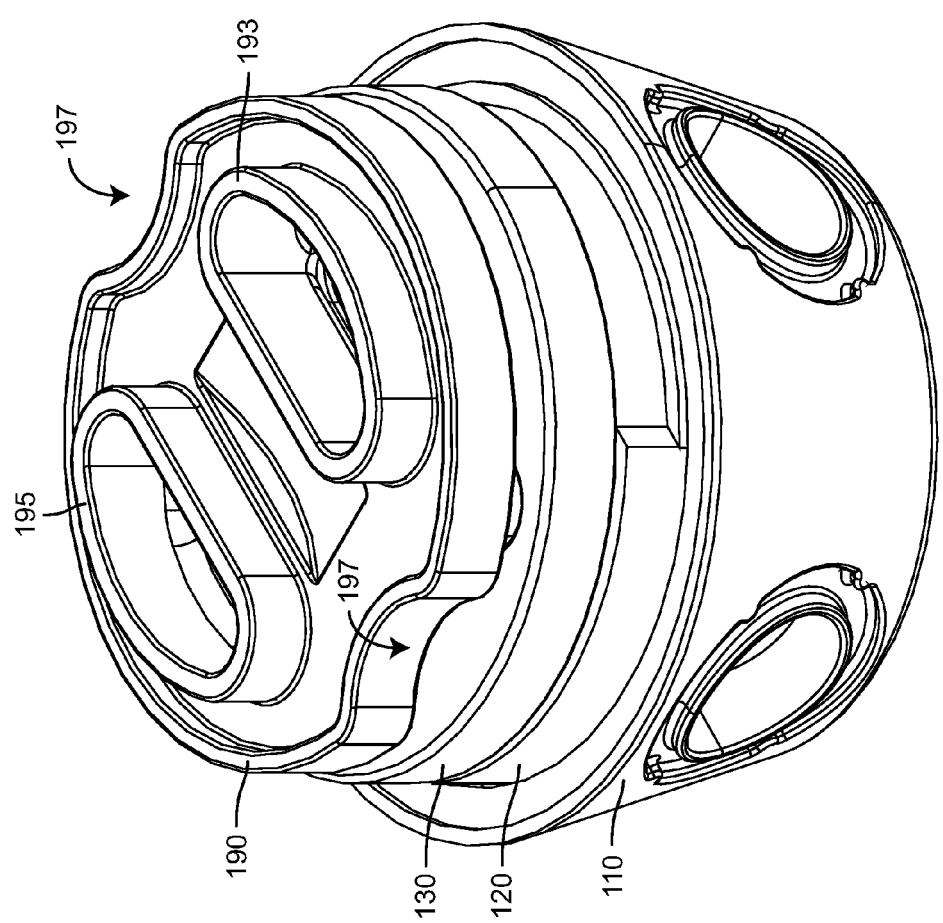

US 9,182,045 B2

CONCENTRIC DIVERTER CARTRIDGE

BACKGROUND

The present disclosure relates generally to the field of valve assemblies for fluid control devices and more particularly to a valve assembly cartridge for controlling fluid volume and fluid temperature.

Valve assemblies are used in a variety of plumbing fixtures for controlling the temperature and volume of water dispensed from the fixture. A valve assembly may receive hot water and cold water from separate supply lines and controllably mix the water to provide an output having an intermediate temperature.

Sequential valve assemblies use a single handle that, upon rotation, opens the valve and increases the volumetric flow rate to maximum flow of cold water. Continued rotation of the handle maintains the volumetric flow rate while increasing the temperature.

Other valve assemblies use two concentrically mounted handles or dials, one to control temperature and one to control volumetric flow rate. Such valve assemblies are typically referred to as "concentric" valves. Current concentric valves suffer from the disadvantage that the concentric controls are frequently interdependent. For example, turning the outer concentric volume control dial may cause the inner concentric temperature control dial to rotate. This results in the inability to set the desired temperature (e.g., by turning an inner concentric dial) until after the volumetric flow rate has been set (e.g., by turning the outer dial). Thus, a user may be required to set both temperature and flow rate sequentially each time the valve is operated.

SUMMARY

One implementation of the present disclosure is diverter cartridge for a fluid mixing valve. The diverter cartridge includes an inlet adapter having a first inlet port, a second inlet port, a first outlet port and a second outlet port. The diverter cartridge further includes a diverter plate having a first inlet channel and a second inlet channel. The diverter plate is rotatable relative to the inlet adapter between a first end position, a second end position, and a neutral position between the first and second end positions. Rotation of the diverter plate from the neutral position toward the first end position increases a volume flow rate of a fluid through at least one of the first and second inlet channels and diverts the fluid to exit the cartridge via the first outlet port. Rotation of the diverter plate from the neutral position toward the second end position increases a volume flow rate of a fluid through at least one of the first and second inlet channels and diverts the fluid to exit the cartridge via the second outlet port.

Another implementation of the present disclosure is a diverter cartridge for a fluid mixing valve. The diverter cartridge includes an inlet adapter and a diverter plate. The inlet adapter includes a first inlet port, a second inlet port, a first outlet port and a second outlet port. The diverter plate includes a first outlet channel and a second outlet channel, wherein the diverter plate is rotatable relative to the inlet adapter between a first end position, a second end position, and a neutral position between the first and second end positions. Rotation of the diverter plate from the neutral position toward the first end position increases a volume flow rate of a fluid through the first outlet channel and diverts the fluid to exit the cartridge via the first outlet port, and rotation of the diverter plate from the neutral position toward the second end position increases a volume flow rate of a fluid through the second outlet channel and diverts the fluid to exit the cartridge via the second outlet port.

Another implementation of the present disclosure is a concentric cartridge for a fluid mixing valve. The concentric cartridge includes an inlet adapter configured to receive a first fluid and a second fluid, a pressure balance unit, a diverter plate rotatably coupled to the pressure balance unit and positioned between the inlet adapter and the pressure balance unit, a temperature control plate, and a mixing plate positioned between the pressure balance unit and the temperature control plate. The pressure balance unit and the diverter plate are rotatable relative to the inlet adapter and the temperature control plate is rotatable relative to the mixing plate.

Another implementation of the present disclosure is a concentric cartridge for a fluid control valve including a volume control shaft and a temperature control sleeve located around the volume control shaft. The volume control shaft and the temperature control sleeve are independently rotatable about a shared axis. The temperature control sleeve remains substantially stationary during rotation of the volume control shaft and the volume control shaft remains substantially stationary during rotation of the temperature control sleeve. In one embodiment, the concentric cartridge includes a diverter plate having a first inlet channel and a second channel, wherein rotation of the volume control shaft causes rotation of the diverter plate between a first position in which the first and second inlet channels are fluidly connected with respective first and second fluid supply lines and a second position in which the first and second inlet channels are not fluidly connected with the respective first and second fluid supply lines.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 2B is a bottom view of the inlet adapter, showing a first inlet port, a second inlet port, a first outlet port, and a second outlet port, according to an exemplary embodiment.

FIG. 4C is a top plan view of the first diverter plate showing a first inlet channel, a second inlet channel, a first outlet channel, and a second outlet channel, according to an exemplary embodiment.

FIG. 6A is a plan view of the first and second diverter plates illustrating the positions of the inlet and outlet channels of the second diverter plate relative to the inlet and outlet channels of the first diverter plate when the second diverter plate is in a neutral "no-flow" position, according to an exemplary embodiment.

FIGS. 6D-6H illustrate an alternate configuration of the first and second diverter plates in which volume control is performed after the first and second fluids have passed through the pressure balance unit and combined to form a mixed fluid, according to an exemplary embodiment.

FIG. 8A is a drawing of the transition element located on top of the second diverter plate, according to an exemplary embodiment.

DETAILED DESCRIPTION

Referring generally to the FIGURES, a concentric diverter cartridge and components thereof are shown according to an exemplary embodiment. Before discussing further details of the concentric diverter cartridge and/or the components thereof, it should be noted that references to "front," "back," "rear," "top," "bottom," "upward," "downward," "inner," "outer," "right," and "left" in this description are merely used to identify the various elements as they are oriented in the FIGURES. These terms are not meant to limit the element which they describe, as the various elements may be oriented differently in various applications.

It should further be noted that for purposes of this disclosure, the term "coupled" means the joining of two members directly or indirectly to one another. Such joining may be stationary in nature or moveable in nature and/or such joining may allow for the flow of fluids, transmission of forces, stresses, torques, or other interaction between joined members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
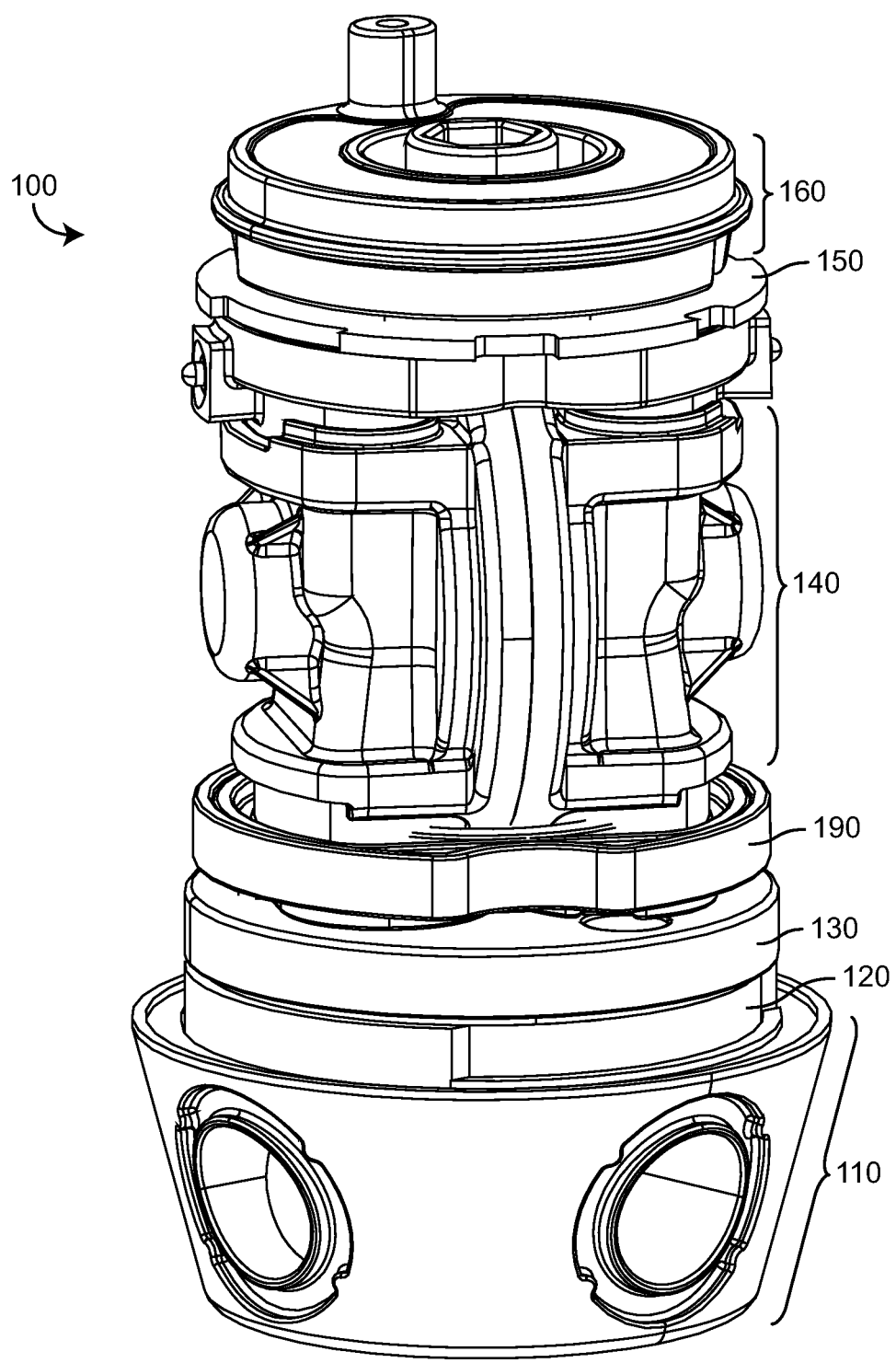
FIG. 1 is drawing of a concentric diverter cartridge including an inlet adapter, a first diverter plate, a second diverter plate, a pressure balance unit, a transition element, a mixing plate, and a temperature control plate, according to an exemplary embodiment.

Referring now to FIG. 1, a concentric diverter cartridge 100 is shown, according to an exemplary embodiment. Cartridge 100 is shown to include an inlet adapter 110, a first diverter plate 120, a second diverter plate 130, a pressure balance unit 140, a mixing plate 150, and a temperature control plate 160. In some embodiments, cartridge 100 may further include a transition element 190 positioned between second diverter plate 130 and pressure balance unit 140.

In operation, two fluids from separate fluid supply lines (e.g., hot water and cold water) may enter inlet adapter 110 via separate inlet ports. Inlet adapter 110 may deliver the fluids through diverter plates 120,130 and into pressure balance unit 140. Pressure balance unit 140 may then output the separate fluids through mixing plate 150 and into a mixing chamber where the fluids are combined (e.g., into water having an intermediate temperature). The mixing chamber may be an open volume between the internal components of cartridge 100 and an external housing containing components 120-160.

The combined fluid may travel in a reverse direction (e.g., back toward inlet adapter 110) around mixing plate 150, around pressure balance unit 140, and through an outlet opening in second diverter plate 130. In some embodiments, second diverter plate 130 may have multiple outlet openings. A first outlet opening in second diverter plate 130 may direct the mixed fluid through a first outlet port of inlet adapter 110 whereas a second outlet opening in second diverter plate 130 may direct the mixed fluid through a second outlet port of inlet adapter 110.

Advantageously, rotation of second diverter plate 130 relative to first diverter plate 120 may control which of the outlet openings in second diverter plate 130 are fluidly connected to inlet adapter 110. This advantage may facilitate the selection of a specific outlet port of inlet adapter 110 (e.g., the first outlet port or the second outlet port) to which the mixed fluid is directed. In some implementations, the first outlet port of inlet adapter 110 may be fluidly connected to a bathtub faucet whereas the second outlet port of inlet adapter 110 may be fluidly connected to a shower head. By selectively rotating second diverter plate 130 relative to first diverter plate 120 (e.g., via an attached volume control handle), a user may control which of the bathtub faucet and the shower head receives the mixed fluid. For example, by rotating second diverter plate 130 in a first direction, the user may select that the mixed fluid be delivered to the first outlet port. By rotating second diverter plate 130 in a second direction, the user may select that the mixed fluid be delivered to the second outlet port. Continued rotation of second diverter plate 130 in either direction from a neutral position (e.g., an "off" position) may increase the volume flow rate of the mixed fluid to either the first or second outlet port.

In some embodiments, diverter cartridge 100 may perform volume control before the fluids enter pressure balance unit 140. Such volume control may be accomplished by rotating second diverter plate 130 relative to first diverter plate 120. For example, when second diverter plate 130 is in a neutral position (e.g., an "off" position), the fluids may be blocked from passing through diverter plates 120,130 due to a misalignment of inlet openings in first diverter plate 120 with inlet openings in second diverter plate 130. By rotating second diverter plate 130 relative to first diverter plate 120, a fluid connection may be formed between the inlet openings in diverter plates 120,130, thereby allowing the fluids to enter pressure balance unit 140. Advantageously, closing the fluid connection between pressure balance unit 140 and inlet adapter 110 may protect the internal components of pressure balance unit 140 (e.g., an internal diaphragm, sliding element, shuttle, etc. from damage (e.g., water hammer effects)). Closing the fluid connection may also prevent fluid crossover (e.g., in the event of a diaphragm or shuttle failure) between the first and second fluid channels within pressure balance unit 140.

In some embodiments, temperature control and volume control may be substantially or truly independent. For example, temperature control plate 160 may be rotated via an external temperature control handle to variably cover or uncover slots in mixing plate 150 for controlling the temperature of the mixed fluid. Pressure balance unit 140 and second diverter plate 130 may be rotated via an external volume control handle to control the volumetric flow rate of the fluids into pressure balance unit 140. The positions of the temperature control handle and the volume control handle may be adjusted independently, thereby allowing a user to control each of temperature and volumetric flow rate without affecting the other.

Figure 2A:
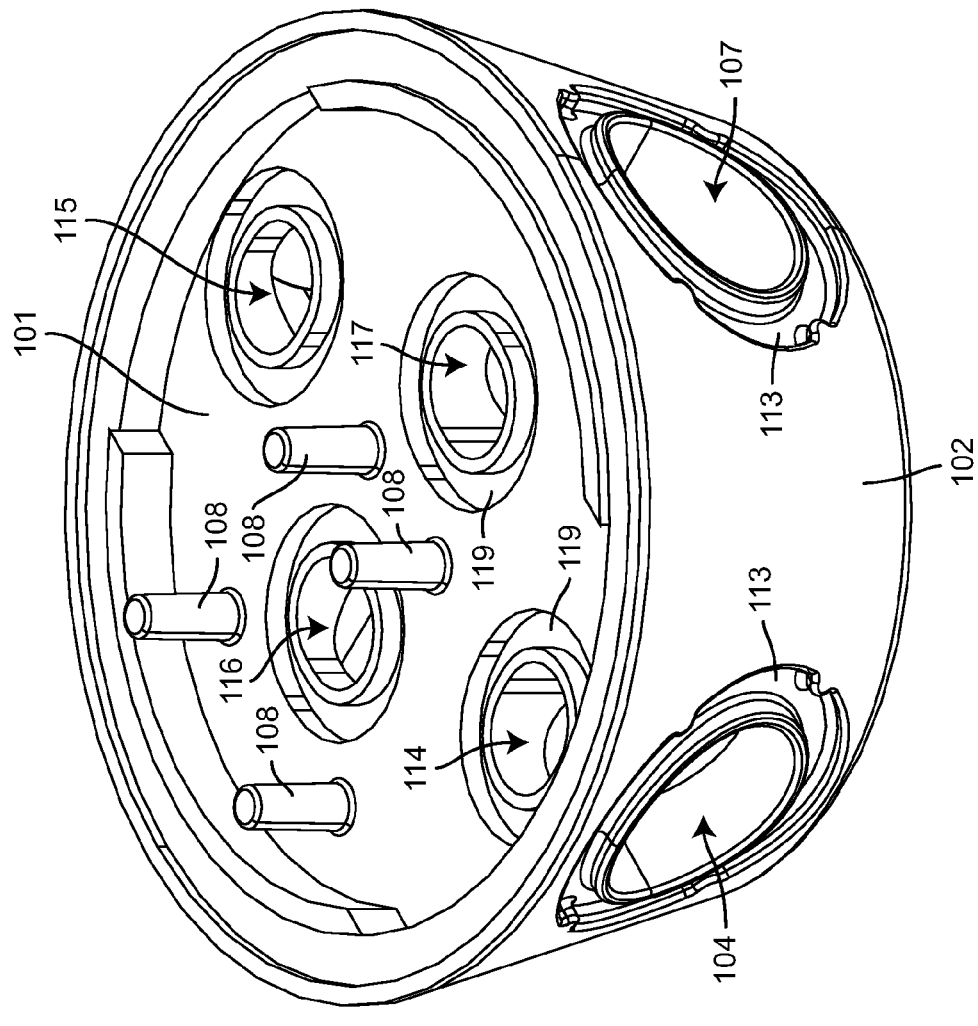
FIG. 2A is a drawing illustrating the inlet adapter in greater detail, according to an exemplary embodiment.

Referring now to FIGS. 2A and 2B inlet adapter 110 is shown, according to an exemplary embodiment. Inlet adapter 110 is shown to include a top surface 101, a bottom surface 103, and a side wall 102. In some embodiments, top surface 101 and bottom surface 103 may be substantially parallel. Side wall 102 may connect an outer perimeter of top surface 101 with an outer perimeter of bottom surface 103. Side wall 102 may intersect top surface 101 and bottom surface 103 at an angle of intersection. In some embodiments, the angle of intersection may be between 30° and 60°. In other embodiments, the angle of intersection may be between 60° and 90°. In further embodiments, the angle of intersection may be approximately 45° or approximately 75°. In some embodiments, top surface 101 and bottom surface 103 may be substantially circular. As shown in FIG. 1, inlet adapter 110 may have a frustoconical shape. For example, the radius of top surface 101 may exceed the radius of bottom surface 103. In other embodiments, inlet adapter 110 may be cylindrical, hexagonal, rectangular, or have any other shape.

Inlet adapter 110 is further shown include a first inlet port 106 and a second inlet port 107. In some embodiments, ports 106,107 may be openings in side wall 102. Inlet port 106 may be located approximately opposite inlet port 107 (e.g., approximately 180° apart) about side wall 102. In some implementations, inlet ports 106,107 may be openings in adapter 110 through which fluid from separate fluid supply lines may enter cartridge 100. For example, port 106 may receive hot water from a hot water supply line and port 107 may receive cold water from a cold water supply line.

Inlet adapter 110 is further shown to include a first outlet port 104, and a second outlet port 105. Ports 104,105 may be openings in side wall 102. In some embodiments, outlet port 104 may be located approximately opposite outlet port 105 (e.g., approximately 180° apart) about side wall 102. In some embodiments, ports 104-107 may be spaced at approximately equal distances about side wall 102. For example, ports 104-107 are shown spaced approximately 90° from each other. Outlet ports 104,105 may be openings in adapter 110 through which a mixed fluid (e.g., a mixture of hot and cold water) may exit cartridge 100. In some implementations, port 104 may be fluidly connected to a bathtub faucet and port 105 may be fluidly connected to a shower head. Advantageously, a user may be able to select which of the bathtub faucet and shower head receives the mixed fluid by directing the fluid to exit cartridge 100 via either outlet port 104 or outlet port 105.

Figure 2C:
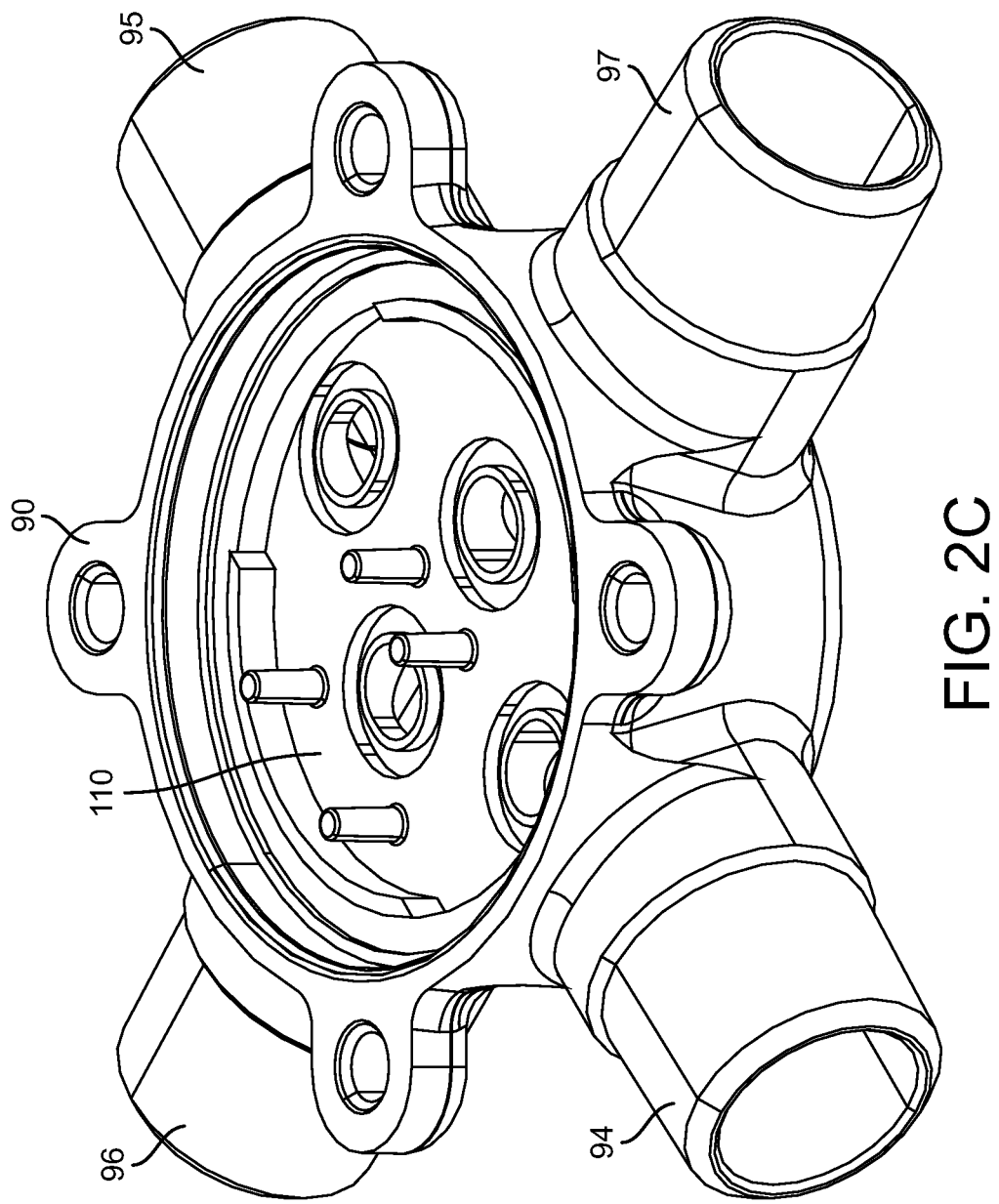
FIG. 2C is a drawing of the inlet adapter inserted into a valve body, showing the alignment of the inlet and outlet ports with openings in the valve body, according to an exemplary embodiment.

Referring now to FIG. 2C inlet adapter 110 may be configured to fit within a valve body 90. Valve body 90 is shown to include inlet connections 96,97 and outlet connections 94,95. Inlet ports 106,107 may align with inlet connections 96,97. Outlet ports 104,105 may align with outlet connections 94,95. In some implementations, inlet connections 96,97 may be fluidly connected to hot and cold water supply lines. Outlet connections 94,95 may be fluidly connected to a bathtub faucet and a shower head.

Figure 2D:
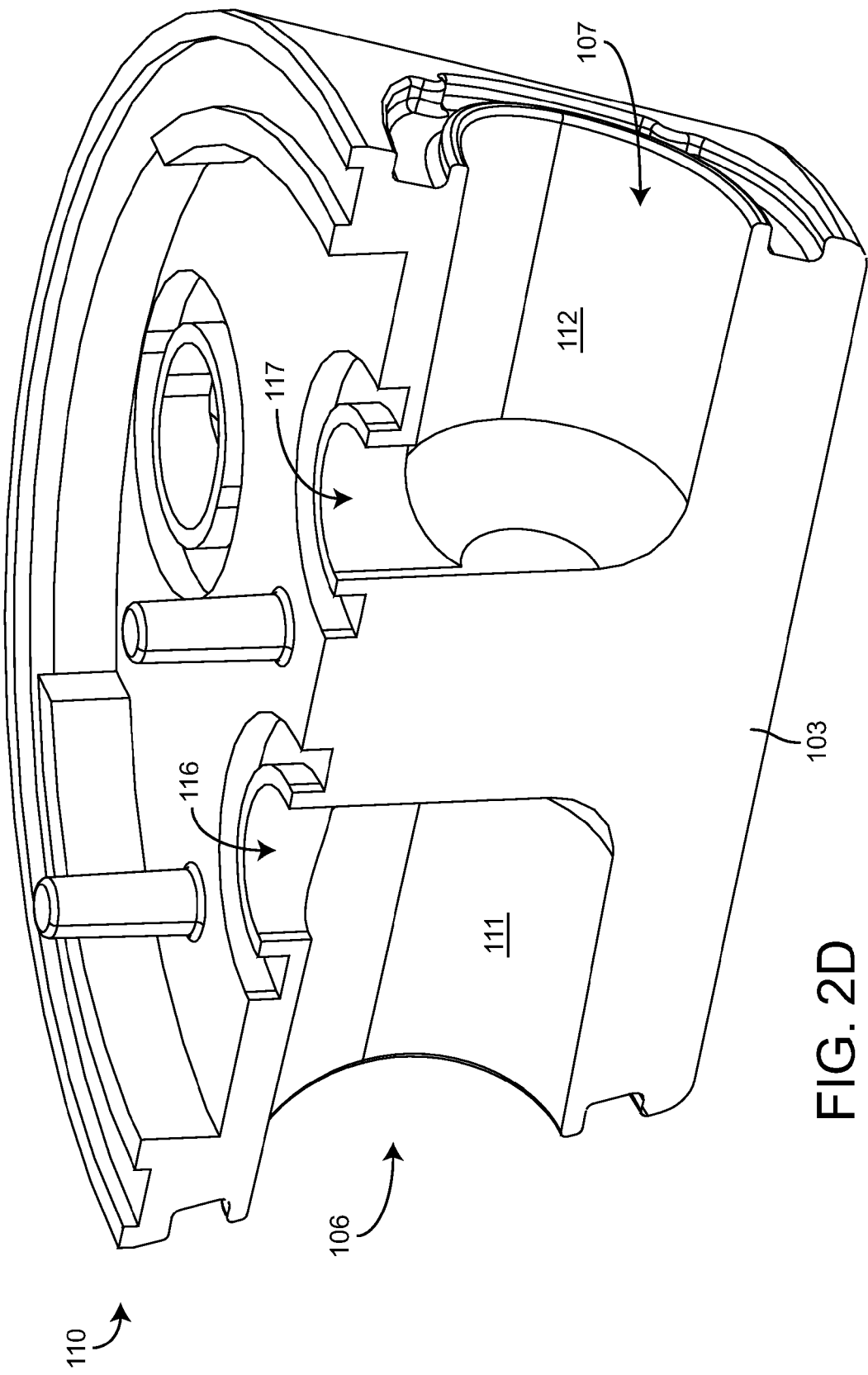
FIG. 2D is a half-sectional view of the inlet adapter showing a fluid connection between the first inlet port and a first connection port and between the second inlet port and a second connection port, according to an exemplary embodiment.

Referring now to FIGS. 2A and 2D, inlet adapter 110 is shown to further include connection ports 114-117. Connection ports 114,115 may be fluidly connected to outlet ports 104,105 respectively. Connection ports 116,117 may be fluidly connected to inlet ports 106,107 respectively. For example, referring specifically to FIG. 2C, fluid channel 111 is shown connecting inlet port 106 with connection port 116. Fluid channel 112 is shown connecting inlet port 107 with connection port 117. Similarly, outlet port 104 may be fluidly connected with outlet connection 114 via a fluid channel (not shown) and outlet port 105 may be fluidly connected with outlet connection 115 via a fluid channel (not shown).

In some embodiments, inlet adapter 110 may further include pegs 108 (e.g., fasteners, screws, pins, etc.). Pegs 108 are shown extending upward from top surface 101. Pegs 108 may be configured to fit within corresponding holes in first diverter plate 120 for securing first diverter plate 120 in an operating position. For example, pegs 108 may prevent rotation of first diverter plate 120 relative to inlet adapter 110. In other embodiments, other mechanisms (e.g., clamps, fittings, adhesives, etc.) or geometric arrangements may be used for securing first diverter plate 120 to inlet adapter 110.

Figure 2E:
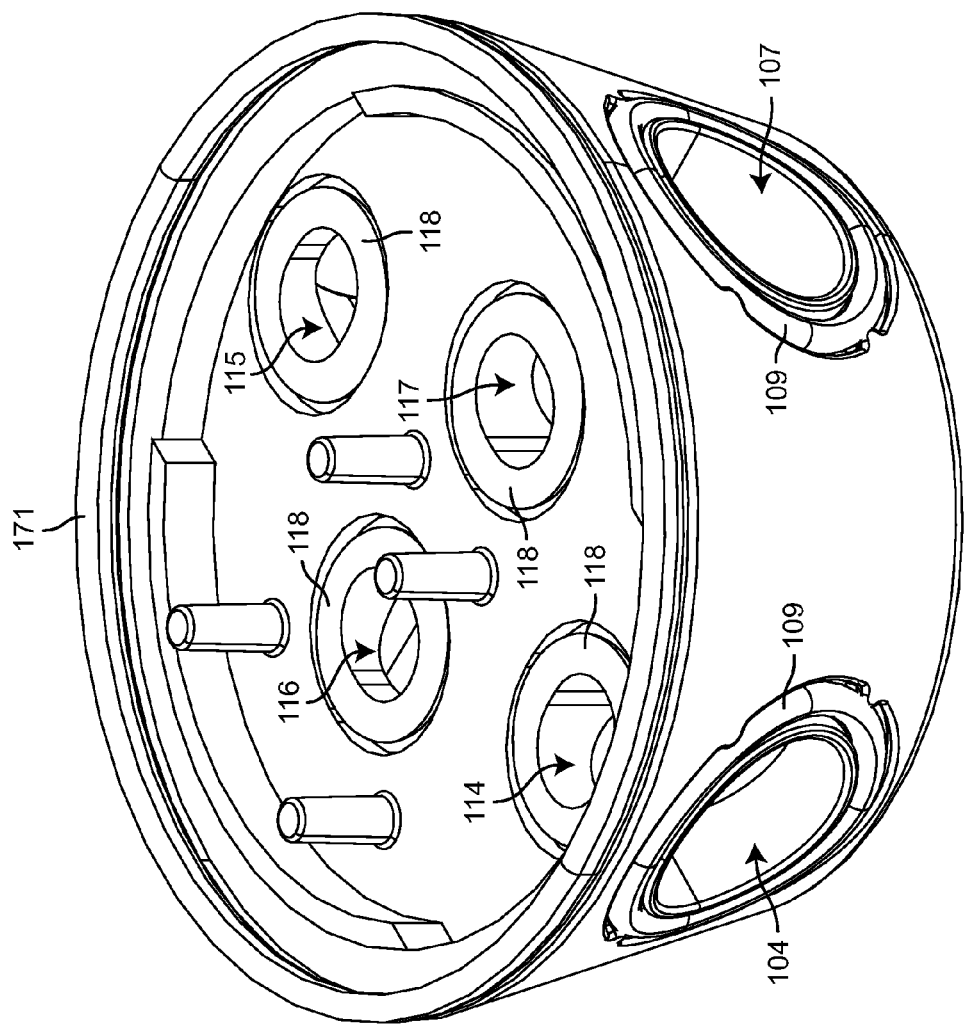
FIG. 2E. is a drawing of the inlet adapter showing seals located around the inlet ports, outlet ports, and connection ports, according to an exemplary embodiment.

Referring now to FIGS. 2A and 2E, in some embodiments, inlet adapter 110 may include indentations 113 around inlet ports 106,107 and/or inlet ports 104,105. Indentations 113 may be configured to receive perimeter seals 109 surrounding ports 104-107. Perimeter seals 109 may be rubber o-rings, adhesive seals, ceramic inserts, or other devices ensuring a watertight barrier between inlet adapter 110 and valve body 90. Inlet adapter 110 may further include indentations 119 around connection ports 114-117. Indentations 119 may be configured to receive perimeter 118 seals surrounding connection ports 114-117. Perimeter seals 118 may ensure a watertight barrier between inlet adapter 110 and first diverter plate 120. Inlet adapter 110 may further include a perimeter seal 171. Seal 171 may be positioned along an upper perimeter of inlet adapter 110. Perimeter seal 171 may form a watertight barrier between inlet adapter 110 and a housing 170, described in greater detail in reference to FIG. 3.

Figure 3A:
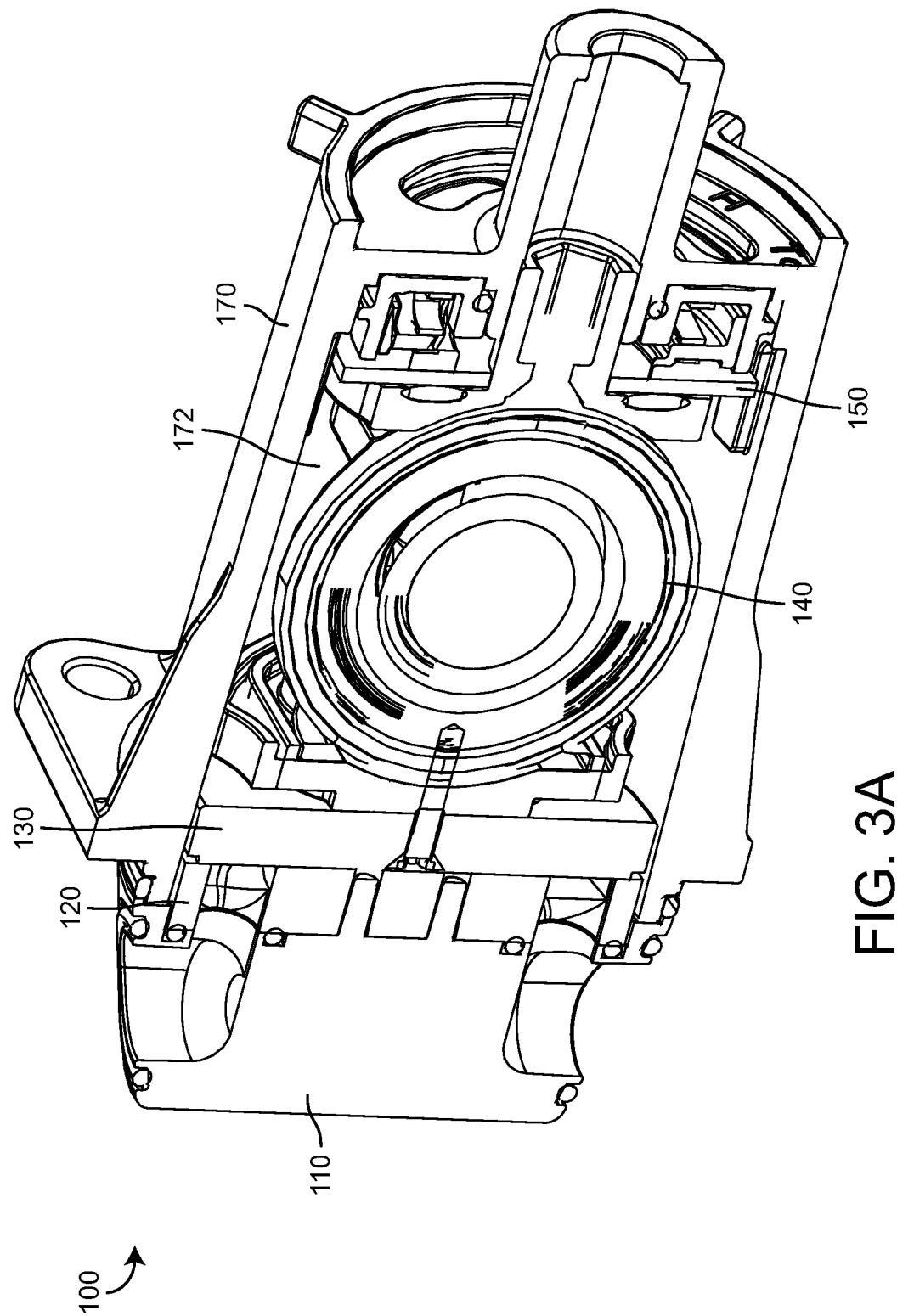
FIG. 3A is a half-sectional view of the concentric diverter cartridge showing a housing surrounding the internal cartridge components and defining a mixing chamber, according to an exemplary embodiment.

Referring now to FIG. 3A, a half-sectional view of cartridge 100 is shown, according to an exemplary embodiment. In some embodiments, diverter cartridge 100 may further include a housing 170. Housing 170 may contain, support, insulate, or protect the other components of cartridge 100. Housing 170 may also contain, guide, or channel the mixed fluid once the fluid has passed through components 110-150. For example, after passing through mixing plate 150, the individual fluids (e.g., hot water and cold water) may combine in a mixing chamber 172 defined as the open volume between cartridge 100 and housing 170. Housing may contain the mixed fluid and guide the mixed fluid around components mixing plate 150, pressure balance unit 140, and back into inlet adapter 110 through diverter plates 120,130.

Figure 3B:
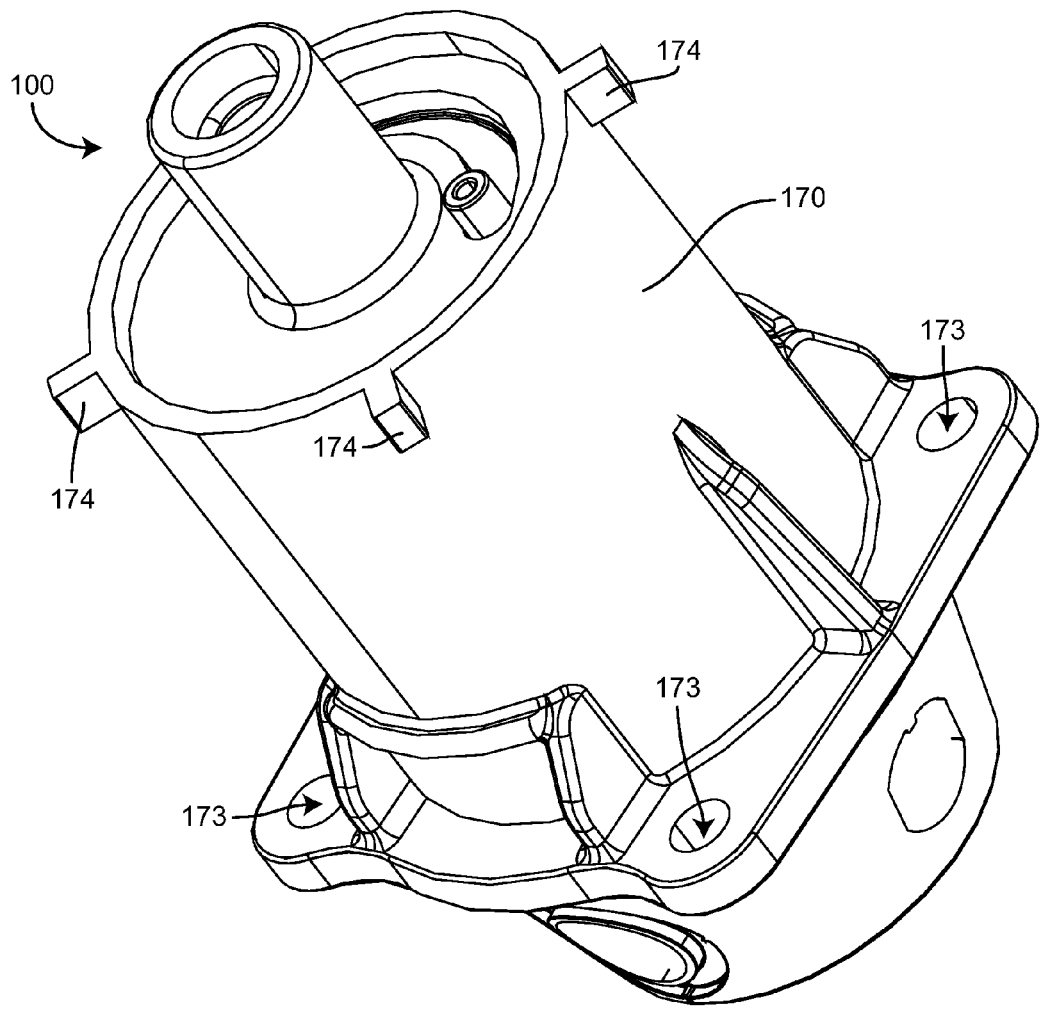
FIG. 3B is a perspective view of the concentric diverter cartridge contained within the housing, according to an exemplary embodiment.

Referring now to FIG. 3B, in some embodiments, housing 170 may include one or more holes 173. Holes 173 may be used to attach and secure housing 170 to a valve body. Holes 173 may be threaded or unthreaded. In some embodiments, holes 173 may allow screws, bolts, pins, or other fasteners to pass through housing 170. For example, when cartridge 100 is inserted into a valve body, holes 173 may align with holes in the valve body. Screws or other fastening hardware may be inserted through holes 173 and engage the holes in the valve body. In other embodiments, holes 173 may extend only partially through housing 170. Holes 173 may be configured to engage with a threaded bolt for fastening, securing, or attaching housing 170 to a valve body or other hardware component.

In some embodiments, housing 170 may include flanges 174. Flanges 174 may assist in securing cartridge 100 in an operating position (e.g., between a valve body and a wall). For example, flanges 174 may be configured to engage a plate, sheet, disc, or other planar element. The planar element may align with an installation surface, thereby securing cartridge 100 in an installed or operating position. Flanges 174 may engage an article of installation hardware or may engage an installation surface directly. In the exemplary embodiment, flanges 174 extend radially from housing 170 and are spaced 90° apart along a circumference of housing 170. In some embodiments, flanges 174 may be replaced with threads (e.g., along an exterior surface of housing 170), holes, pegs, slots, sockets, or other connection, attachment, fastening, or stabilization elements.

Figure 4A:
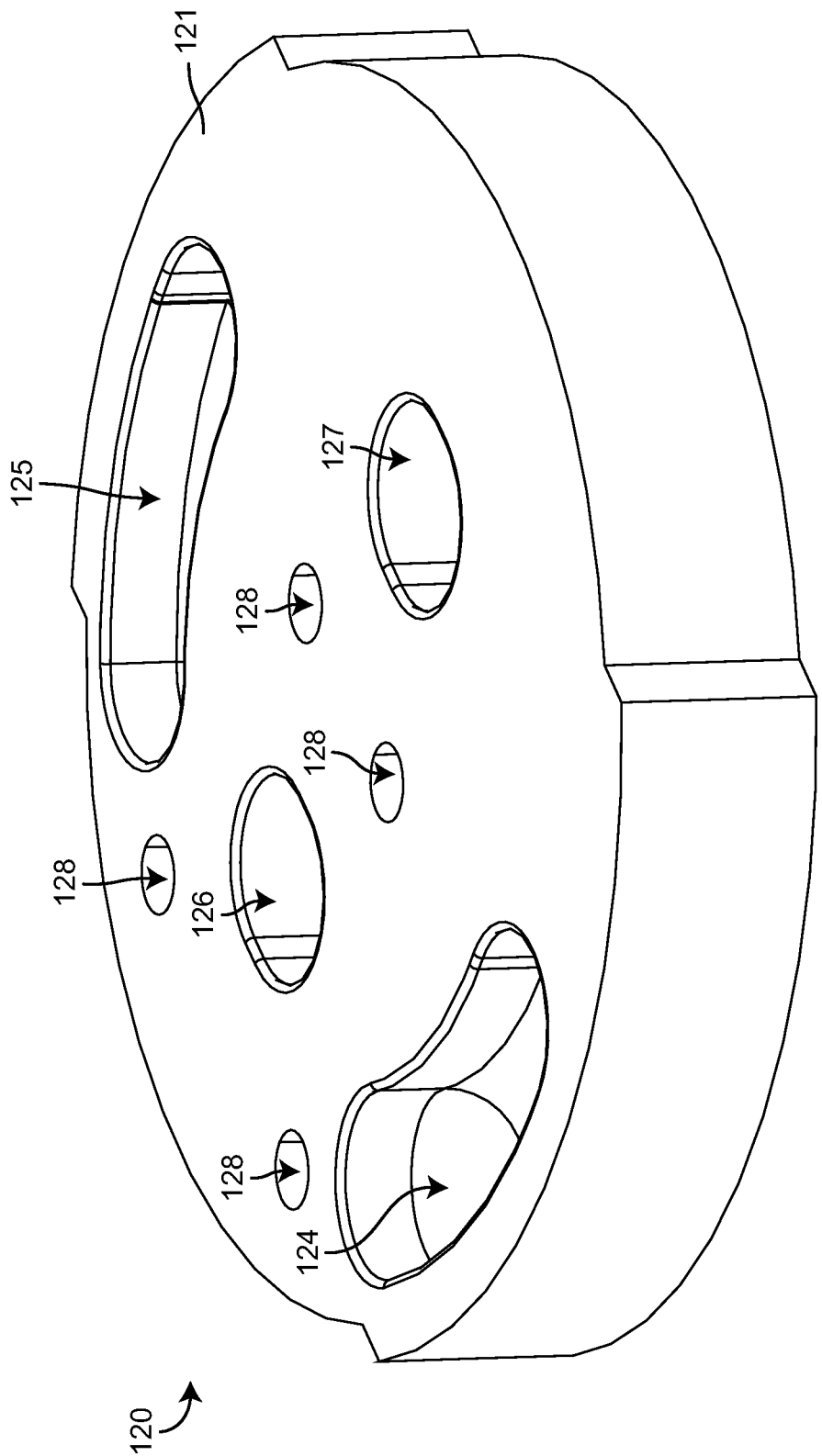
FIG. 4A is a drawing illustrating the first diverter plate in greater detail, according to an exemplary embodiment.

Referring now to FIG. 4A, a front perspective view of first diverter plate 120 is shown, according to an exemplary embodiment. In some embodiments, first diverter plate 120 is as a substantially cylindrical disc or plate. In other embodiments, first diverter plate 120 may be hexagonal, rectangular, or have any other cross-sectional shape. First diverter plate 120 may be made of a ceramic material. Advantageously, the use of a ceramic material for first diverter plate 120 may prevent leakage between first diverter plate 120 and second diverter plate 130 without requiring additional sealing components. First diverter plate 120 is shown to include a top surface 121, outlet channels 124,125, inlet channels 126,127, and peg holes 128.

Figure 4B:
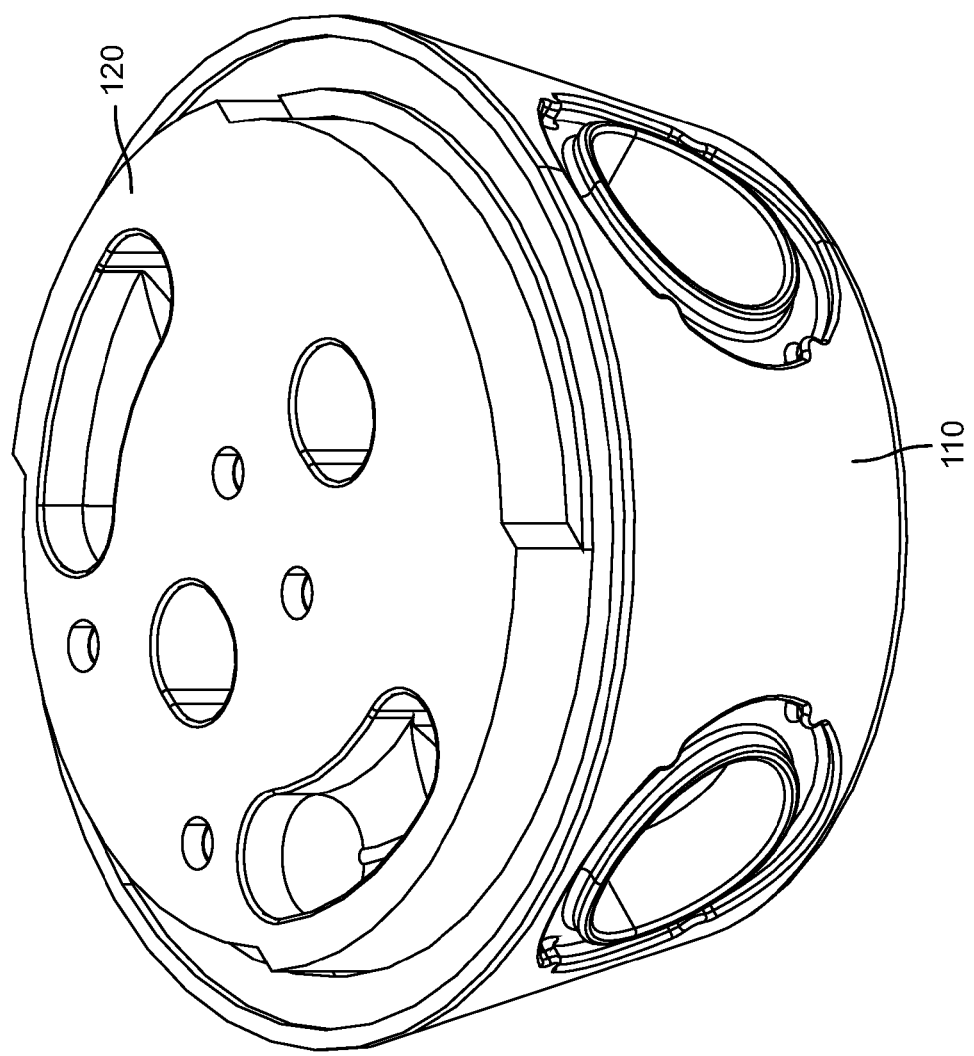
FIG. 4B is a drawing showing the first diverter plate located on top of the inlet adapter, according to an exemplary embodiment.

As shown in FIG. 4B, first diverter plate 120 may be positioned on top of inlet adapter 110. First diverter plate 120 may have a fixed position relative to inlet adapter 110. Pegs 108 extending from inlet adapter 110 may fit within peg holes 128 in first diverter plate 120 for securing first diverter plate 120 in the fixed position. Outlet channels 124,125, inlet channels 126,127, and peg holes 128 may be in continuous alignment with connection ports 114,115, connection ports 116,117, and pegs 108 respectively.

Figure 4D:
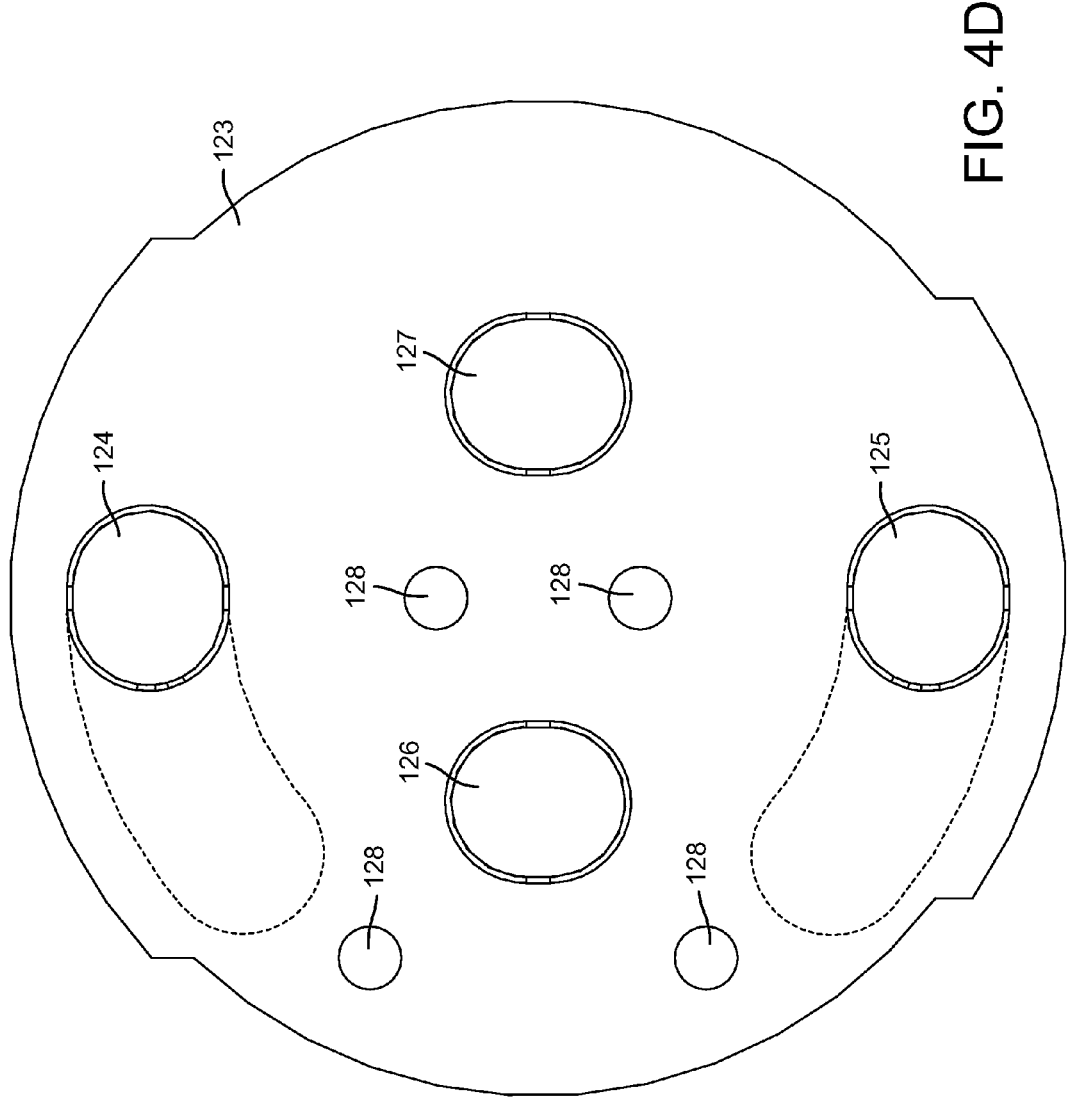
FIG. 4D is a bottom plan view of the first diverter plate showing the openings of the inlet and outlet channels on a bottom surface of the first diverter plate, according to an exemplary embodiment.

Referring now to FIGS. 4C and 4D, a top view (FIG. 4C) and a bottom view (FIG. 4D) of first diverter plate 120 are shown, according to an exemplary embodiment. Inlet channel 126 may be configured to align with connection port 116 of inlet adapter 110. Similarly, inlet channel 127 may be configured to align with connection port 117 of inlet adapter 110. Inlet channels 126,127 may be holes in first diverter plate 120, extending through first diverter plate 120 from top surface 121 to bottom surface 123. In some embodiments, inlet channels 126,127 may have a substantially circular or oval-shaped cross-section (e.g., a horizontal cross-section parallel to surface 121). The cross-sections of inlet channels 126,127 may be uniform throughout the longitudinal extension of channels 126,127 (e.g., from top surface 121 to bottom surface 123). In other words, an upper opening of inlet channels 126,127 (e.g., an opening in top surface 121) may be the same size as a lower opening of inlet channels 126,127 (e.g., an opening in bottom surface 123).

First diverter plate 120 is further shown to include outlet channels 124,125. Outlet channel 124 may be configured to align with connection port 114 of inlet adapter 110. Similarly, outlet channel 125 may be configured to align with connection port 115 of inlet adapter 110. Outlet channels 124,125 be holes in first diverter plate 120, extending first diverter plate 120 from top surface 121 to bottom surface 123. Notably, outlet channels 124,125 may have non-uniform cross-sections (e.g., a horizontal cross-sections parallel to surface 121). For example, the upper openings of outlet channels 124,125 (e.g., in top surface 121) may be differently shaped than the lower openings of outlet channels 124,125 (e.g., in bottom surface 123). Referring to FIG. 4C, outlet channels 124,125 are shown having "kidney-shaped" openings in top surface 121. In other embodiments, outlet channels 124,125 may have "tear-shaped," oval-shaped, or otherwise shaped openings in top surface 121. Referring to FIG. 4D, outlet channels 124,125 are shown having oval-shaped openings in bottom surface 123. The lower openings of outlet channels 124,125 may be configured to align with connection ports 114,115 of inlet adapter 110.

In some embodiments, the lower openings of outlet channels 124,125 (e.g., in bottom surface 123) may be smaller than the upper openings of outlet channels 124,125 (e.g., in top surface 121). Advantageously, the larger upper openings of outlet channels 124,125 may allow an outlet channel in second diverter plate 130 (e.g., outlet channel 134 or outlet channel 135) to remain fluidly connected one of connection ports 114,115 as second diverter plate 130 rotates relative to first diverter plate 120. For example, a lower opening in outlet channel 134 may move along the upper opening in outlet channel 124 as second diverter plate 130 rotates, thereby maintaining the fluid connection between channels 124,134 for an extended rotational range.

Figure 4E:
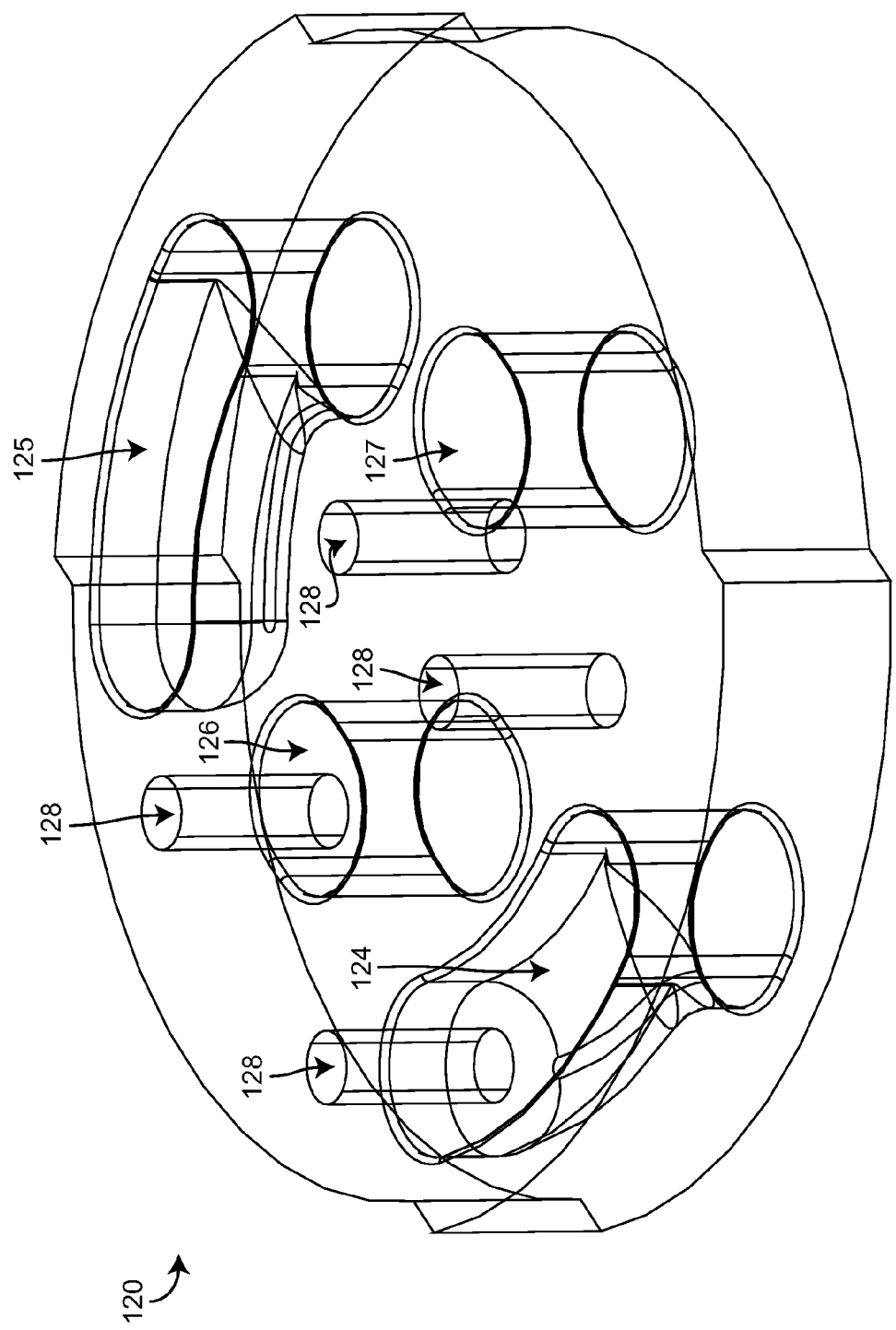
FIG. 4E. is a drawing of a wireframe model of the first diverter plate, illustrating the upper and lower openings of the outlet channels, according to an exemplary embodiment.

Referring now to FIG. 4E, a wireframe model of first diverter plate 120 is shown, according to an exemplary embodiment. Inlet channels 126,127 are shown having a uniform cross-section throughout the longitudinal extension of such channels between top surface 121 and bottom surface 123. Holes 128 are also shown having a uniform horizontal cross-section between top surface 121 and bottom surface 123. Outlet channels 124,125 are shown having a larger upper opening (e.g., in top surface 121) and a smaller lower opening (e.g., in bottom surface 123).

Figure 5A:
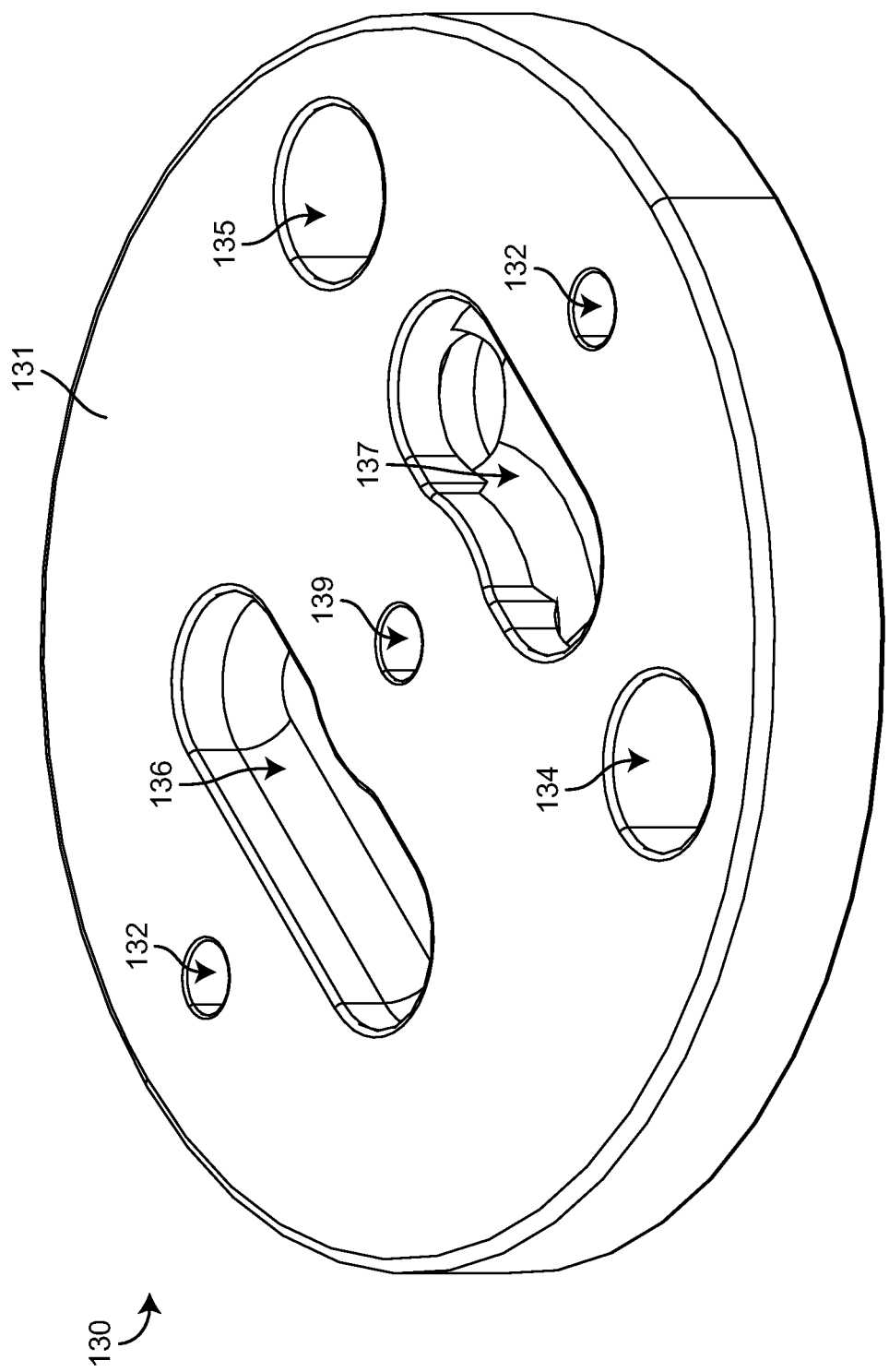
FIG. 5A is a drawing illustrating the second diverter plate in greater detail, according to an exemplary embodiment.
Figure 5B:
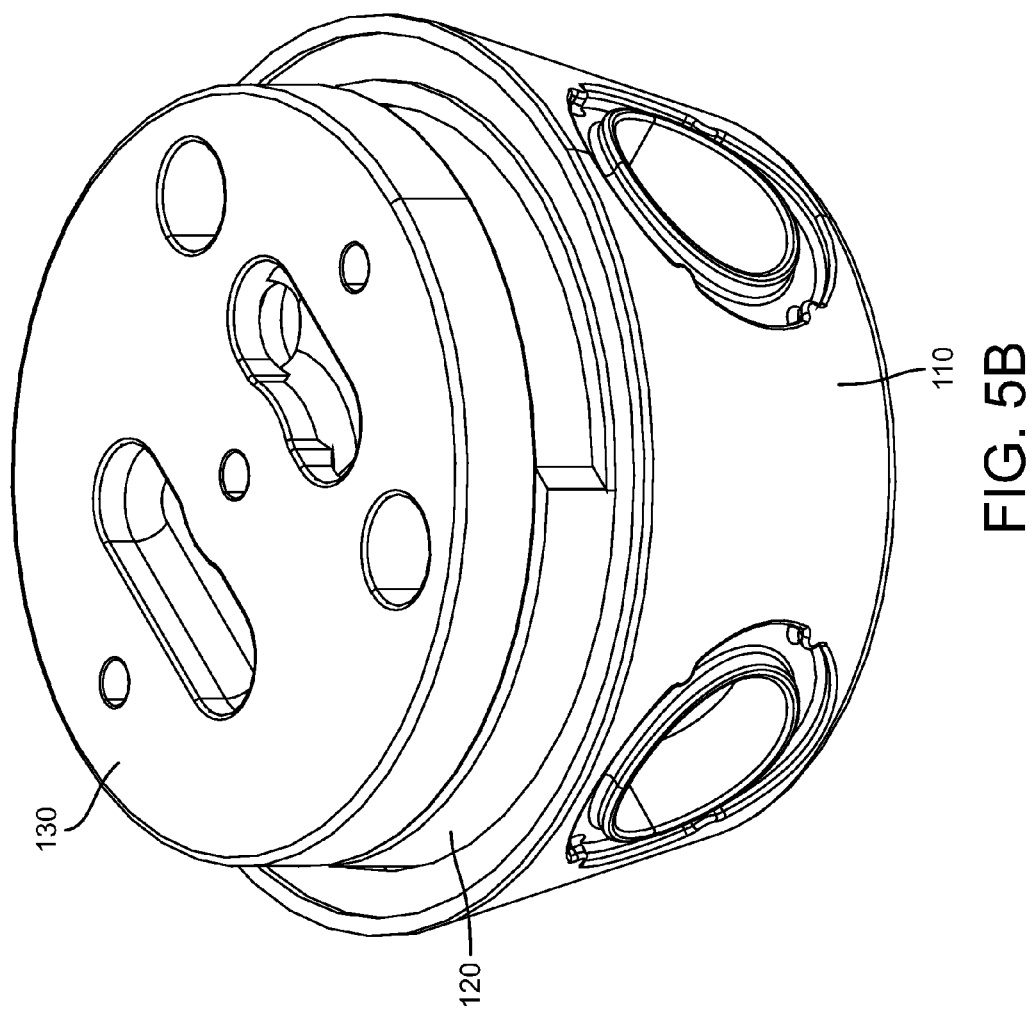
FIG. 5B is a drawing showing the second diverter plate located on top of the first diverter plate, according to an exemplary embodiment.

Referring now to FIGS. 5A and 5B, a front perspective view of second diverter plate 130 is shown, according to an exemplary embodiment. In some embodiments, second diverter plate 130 is as a substantially cylindrical disc or plate. In other embodiments, second diverter plate 130 may be hexagonal, rectangular, or have any other cross-sectional shape. In some embodiments, second diverter plate 130 may be made of a ceramic material. Advantageously, the use of a ceramic material for second diverter plate 130 may prevent leakage between first diverter plate 120 and second diverter plate 130 without requiring additional sealing components. As shown in FIG. 5B, second diverter plate 130 may be positioned on top of first diverter plate 120. Second diverter plate 130 is shown to include a top surface 131, outlet channels 134,135, inlet channels 136,137, and peg holes 132.

Peg holes 132 may extend into second diverter plate 130 from top surface 131. In some embodiments, peg holes 132 extend completely through second diverter plate 130. In other embodiments, peg holes 132 extend partially through second diverter plate 130. Peg holes 132 may be configured to receive one or more pegs projecting from pressure balance unit 140 or a transition element between pressure balance unit 140 and second diverter plate 130. Peg holes 132 may be used to rotate second diverter plate 130 relative to first diverter plate 120 about central hole 139 or axis.

Figure 5C:
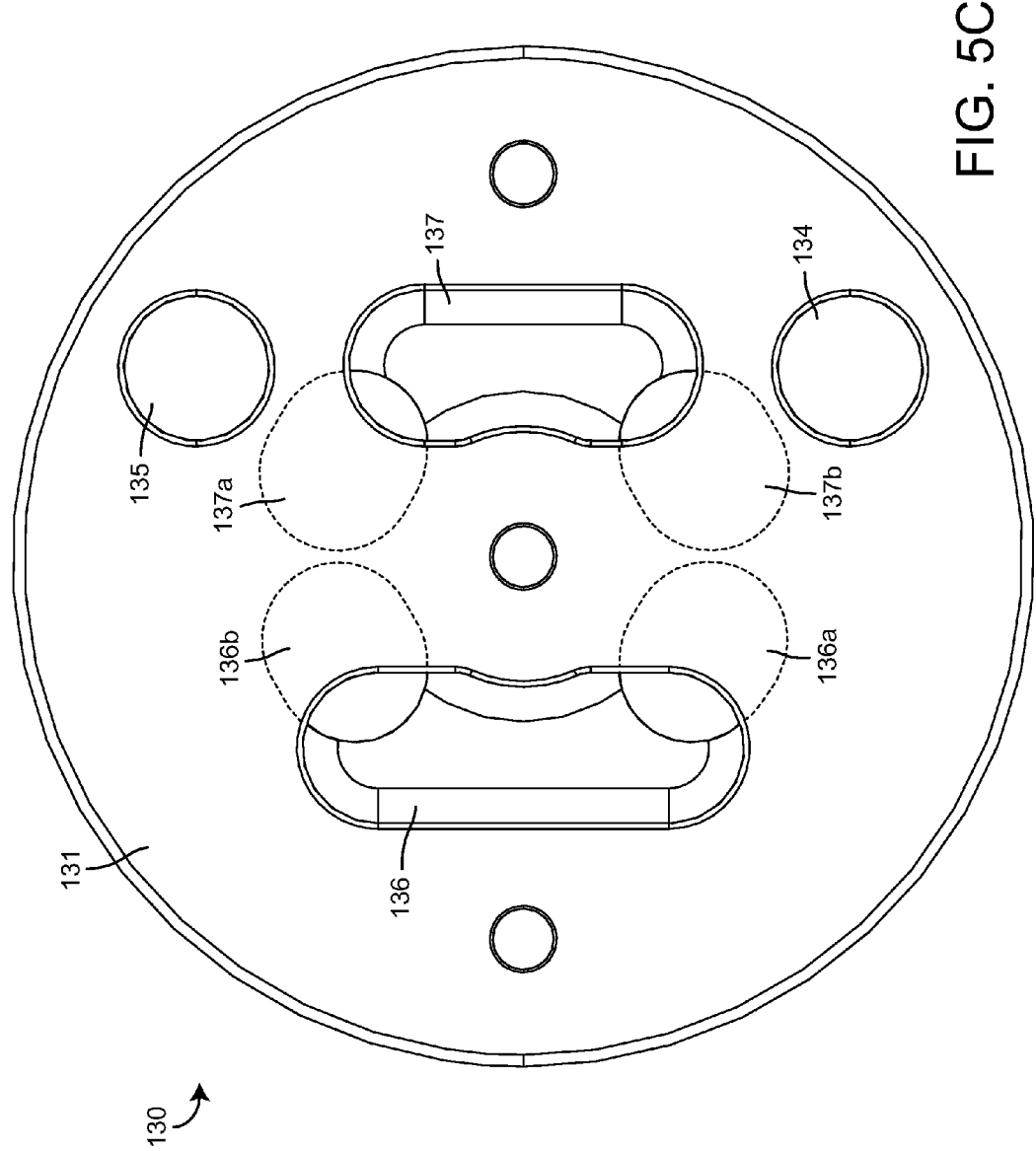
FIG. 5C is a top plan view of the second diverter plate showing a first inlet channel, a second inlet channel, a first outlet channel, and a second outlet channel, according to an exemplary embodiment.
Figure 5D:
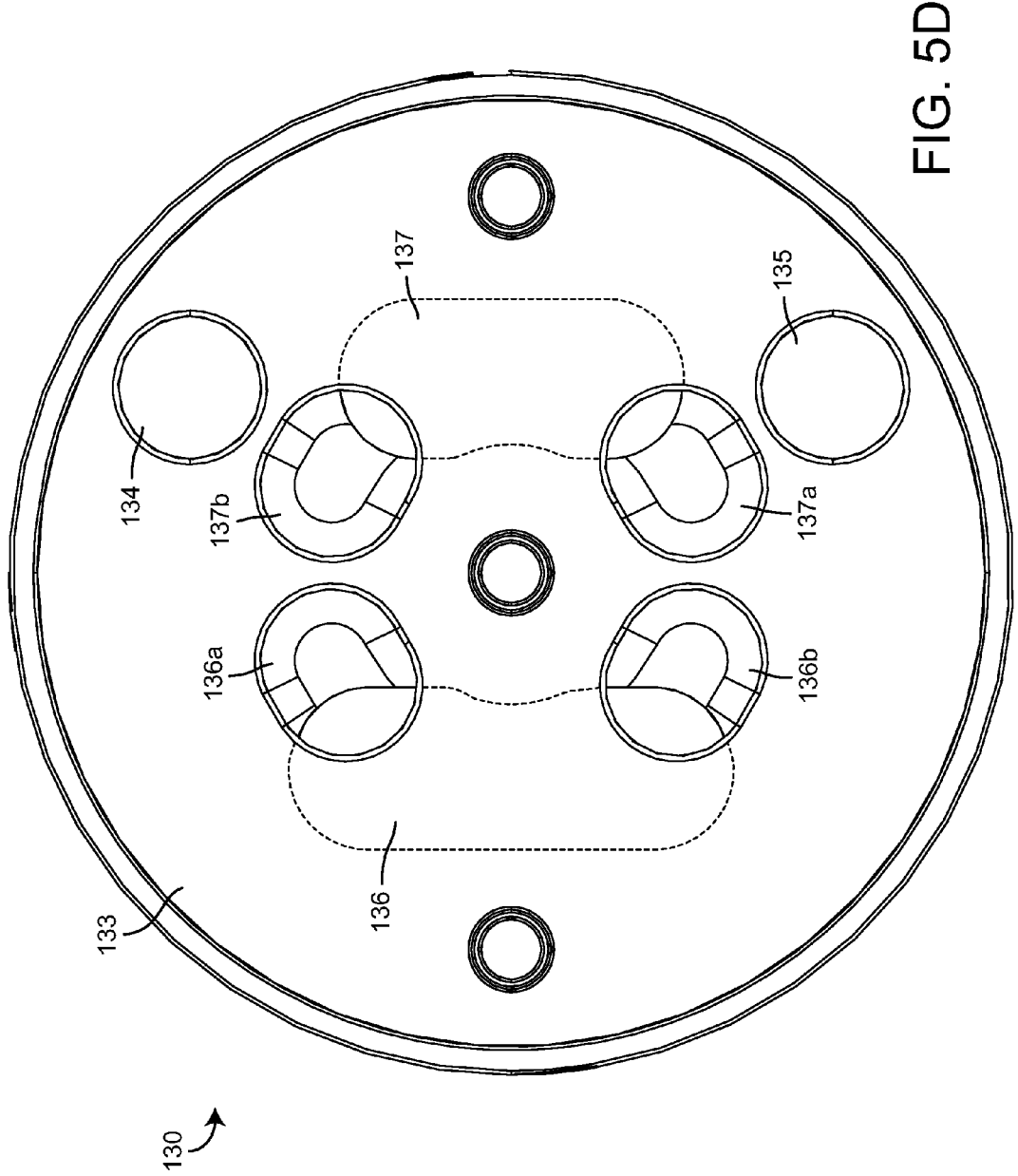
FIG. 5D is a bottom plan view of the second diverter plate, showing a pair of openings for each of the first and second inlet channels, according to an exemplary embodiment.

Referring now to FIGS. 5C and 5D, a top view (FIG. 5C) and a bottom view (FIG. 5D) of second diverter plate 130 are shown, according to an exemplary embodiment. Outlet channels 134,135 may be holes in second diverter plate 130, extending through first diverter plate 120 from top surface 131 to bottom surface 133. In some embodiments, outlet channels 134,135 may have a substantially circular or oval-shaped cross-section (e.g., a horizontal cross-section parallel to surface 131). The cross-sections of outlet channels 134,135 may be uniform throughout the longitudinal extension of channels 134,135 (e.g., from top surface 131 to bottom surface 133). In other words, an upper opening of outlet channels 134,135 (e.g., an opening in top surface 131) may be the same size as a lower opening of outlet channels 134,135 (e.g., an opening in bottom surface 133).

Second diverter plate 130 is further shown to include inlet channels 136,137. Notably, inlet channels 136,137 may have a non-uniform cross-section (e.g., a horizontal cross-section parallel to surface 131). Referring specifically to FIG. 5C, in some embodiments, inlet channels 136,137 may have oval-shaped or kidney-shaped upper openings (e.g., in top surface 131). The upper openings of inlet channels 136,137 may be equally sized or differently sized. The upper openings of inlet channels 136,137 may extend into second diverter plate 130 approximately halfway through second diverter plate 130.

Referring specifically to FIG. 5D, inlet channels 136,137 may each have a pair of lower openings (e.g., in bottom surface 133). Inlet channel 136 is shown having lower openings 136a and 136b. Inlet channel 137 is shown having lower openings 137a and 137b. In some embodiments, lower openings 136a,136b,137a,137b may be circular or oval-shaped. In some embodiments, lower openings 136a,136b,137a,137b may be sized and/or shaped to match the upper openings of inlet channels 126,127 in first diverter plate 120. Lower openings 136a,136b,137a,137b may extend into second diverter plate 130 approximately halfway through second diverter plate 130.

In some embodiments, a portion of lower openings 136a, 136b may horizontally overlap with the upper opening of inlet channel 136. The upper opening of inlet channel 136 may connect with lower openings 136a,136b. In some embodiments, the upper opening of inlet channel 136 may have a larger area than the combined area of lower openings 136a, 136b. In some embodiments, a portion of lower openings 137a,137b may horizontally overlap with the upper opening of inlet channel 137. Similarly, the upper opening of inlet channel 137 may connect with lower openings 137a,137b. In some embodiments, the upper opening of inlet channel 137 may have a larger area than the combined area of lower openings 137a,137b.

Figure 5E:
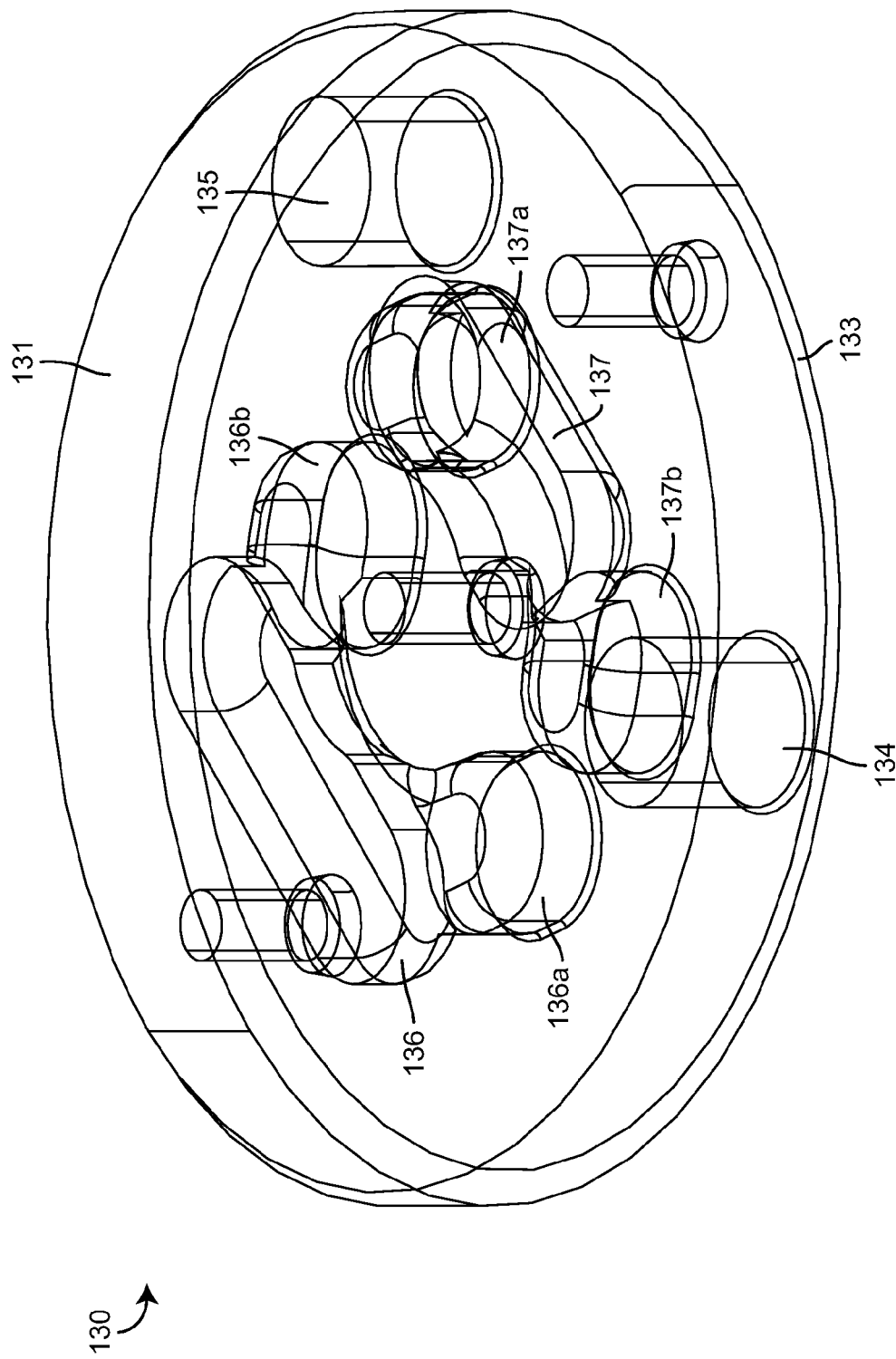
FIG. 5E. is a drawing of a wireframe model of the second diverter plate, illustrating the upper and lower openings of the inlet channels, according to an exemplary embodiment.

Referring now to FIG. 5E, a wireframe model of second diverter plate 130 is shown, according to an exemplary embodiment. Outlet channels 134,135 are shown having a uniform horizontal cross-section throughout second diverter plate 130 (e.g. from top surface 131 to bottom surface 133). Inlet channels 136,137 are shown having a "flattened arc" cross-section. For example, lower openings 136a,136b and 137a,137b are shown extending upward from bottom surface 133 approximately halfway through second diverter plate 130. The upper openings of inlet channels 136,137 are shown extending downward from top surface 131 approximately halfway through second diverter plate 130. The upper opening of inlet channel 136 may connect with lower openings 136a,136b to form inlet channel 136. The upper opening of inlet channel 137 may connect with lower openings 137a, 137b to form inlet channel 137.

Referring now to FIG. 6A, a plan view of second diverter plate 130 overlaid onto first diverter plate 120 is shown, according to an exemplary embodiment. When second diverter plate 130 is positioned on top of first diverter plate 120, top surface 121 and bottom surface 133 may be approximately coplanar. Solid lines are used to represent visible features (e.g., features on top surface 131 of second diverter plate 130 as well as the visible edges of lower openings 136a,136b,137a,137b). Dotted lines are used to represent hidden features (e.g., features on bottom surface 133 of second diverter plate 130 as well as features on top surface 121 of first diverter plate 120) Peg holes 132 and peg holes 128 have been omitted for clarity of explanation.

FIG. 6A illustrates the positions of inlet channels 136,137 and outlet channels 134,135 when second diverter plate 130 is in a neutral position (e.g., an off or no flow position) relative to first diverter plate 120. In the neutral position, lower openings 136a,136b may be misaligned with inlet channel 126 and lower openings 137a,137b may be misaligned with inlet channel 127. This misalignment may prevent the fluids from inlet channels 126,127 from passing through second diverter plate 130. Although the upper openings of inlet channels 136,137 are shown in horizontal alignment with inlet channels 126,127, fluid is nonetheless blocked from passing through second diverter plate 130 because the upper openings of inlet channels 136,137 extend only partially through second diverter plate 130. In order to create a fluid connection, at least one of lower openings 136a,136b,137a,137b must be horizontally aligned with one of inlet channels 126,127.

Still referring to FIG. 6A, fluid is also prevented from flowing through cartridge 100 due to the misalignment of outlet channel 134 with outlet channel 124 and the misalignment of outlet channel 135 with outlet channel 125. In other words, when second diverter plate 130 is in the neutral position, fluid may be prevented from both entering and exiting cartridge 100.

Figure 6B:
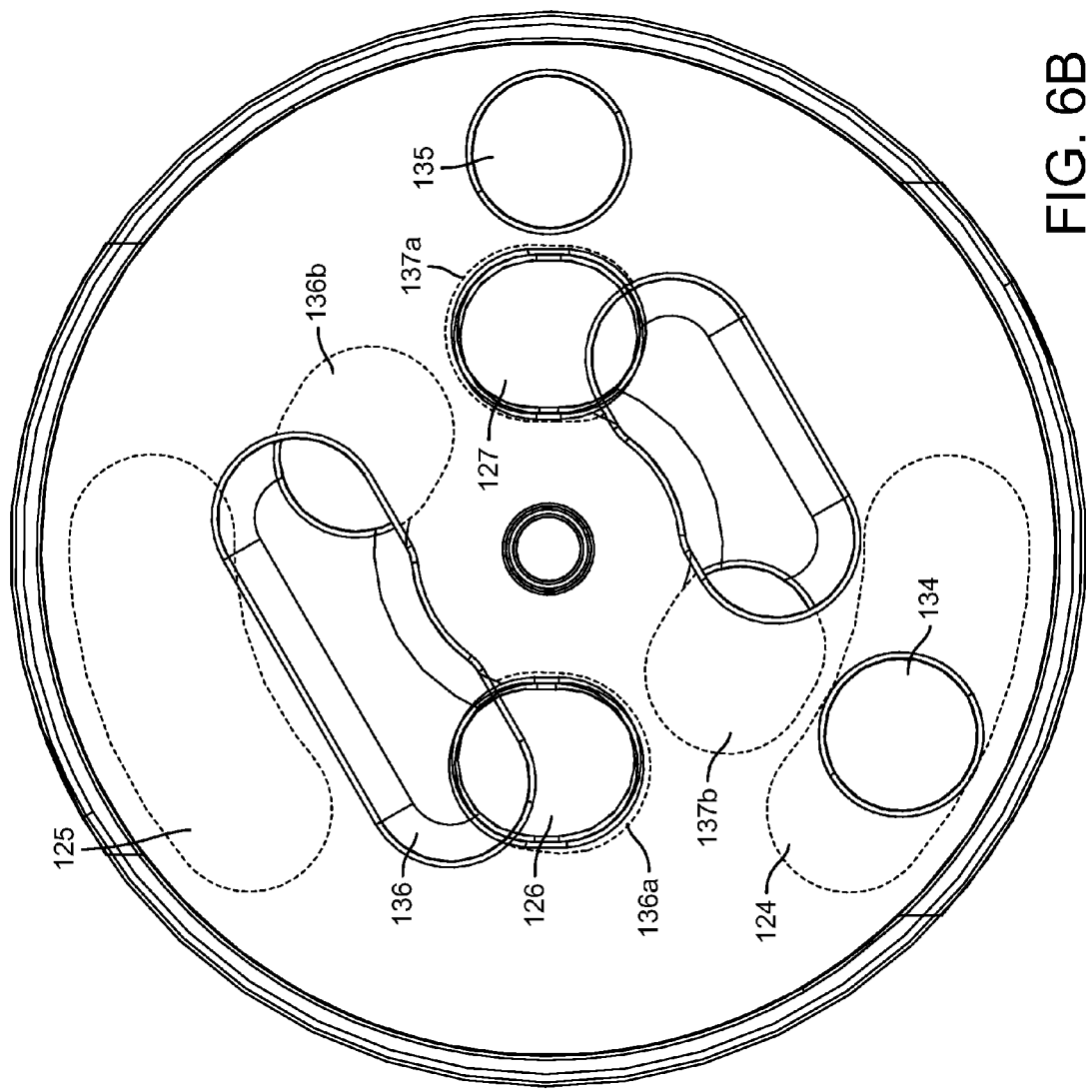
FIG. 6B is a plan view of the first and second diverter plates illustrating the positions of the inlet and outlet channels of the second diverter plate relative to the inlet and outlet channels of the first diverter plate with the second diverter plate rotated in a clockwise direction relative to FIG. 6A, thereby diverting flow to the first outlet port, according to an exemplary embodiment.

Referring now to FIG. 6B, a plan view of second diverter plate 130 overlaid onto first diverter plate 120 and rotated in a first direction is shown, according to an exemplary embodiment. In FIG. 6B, second diverter plate 130 has been rotated clockwise by approximately 60° from the neutral position illustrated in FIG. 6A. The features of first diverter plate 120 are shown in the same position because first diverter plate 120 may not rotate relative to inlet adapter 110 (e.g., due to pegs 108 linking inlet adapter 110 and first diverter plate 120). However, the features of second diverter plate 130 are shown rotated in a clockwise direction from the neutral position. For example, lower opening 136a is shown in alignment with inlet channel 126 and lower opening 137a is shown in alignment with inlet channel 127. This alignment may create a fluid connection between inlet channels 126,127 and inlet channels 136,137 respectively. In other words, fluid from inlet channel 126 may be permitted to flow into inlet channel 136 via the alignment of lower opening 136a with inlet channel 126. Similarly, fluid from inlet channel 127 may be permitted to flow into inlet channel 137 via the alignment of lower opening 137a with inlet channel 127.

Still referring to FIG. 6B, outlet channel 134 is shown in alignment with outlet channel 124. This alignment may allow the mixed fluid to pass through outlet channel 134, outlet channel 124, and re-enter inlet adapter 110 via connection port 114. The mixed fluid may then exit inlet adapter 110 via outlet port 104. In some implementations, outlet port 104 may be fluidly connected with a bathtub faucet. Accordingly, the mixed fluid may be selectively directed to the bathtub faucet by rotating second diverter plate 130 in a clockwise direction. Notably, when second diverter plate 130 is rotated in the clockwise direction, outlet channel 135 may remain misaligned with outlet channel 125. This misalignment may prevent the mixed fluid from exiting cartridge 100 through outlet port 105, thereby diverting the entirety of the fluid flow to outlet port 104.

Advantageously, the kidney shape of outlet channel 124 (i.e. the upper opening of outlet channel 124) may facilitate a fluid connection between outlet channel 134 and outlet channel 124 throughout a wide rotational range of second diverter plate 130. For example, outlet channel 134 may be completely aligned with outlet channel 124 as outlet channel 134 moves from one end of the kidney-shaped opening to the other end of the kidney-shaped opening. This fluid connectivity may allow the mixed fluid to exit cartridge 100 throughout a wide rotational range of second diverter plate 130.

In some embodiments, cartridge 100 may perform volume control via the selective rotation of second diverter plate 130 relative to first diverter plate 120. In FIG. 6B, lower opening 136a is shown in complete alignment with inlet channel 126 and lower opening 137a is shown in complete alignment with inlet channel 127. Accordingly, the rotational position of second diverter plate 130 shown in FIG. 6B may correspond to a maximum flow position for diverting the mixed fluid to outlet port 104. As second diverter plate 130 is rotated between the no flow position shown in FIG. 6A and the maximum flow position for outlet port 104 shown in FIG. 6B, lower openings 136a,137a may move from complete misalignment with inlet channels 126,127 into complete alignment with inlet channels 126,136. When second diverter plate 130 is in an intermediate position (e.g., between the no flow position and the maximum flow position for outlet port 104), lower openings 136a,137a may be partially aligned with inlet channels 126,127. Cartridge 100 may perform volume control by controlling the degree of alignment of lower openings 136a,137a with inlet channels 126,127. Such alignment may be controlled via the selective rotation of second diverter plate 130 (e.g., via an attached volume control handle).

Figure 6C:
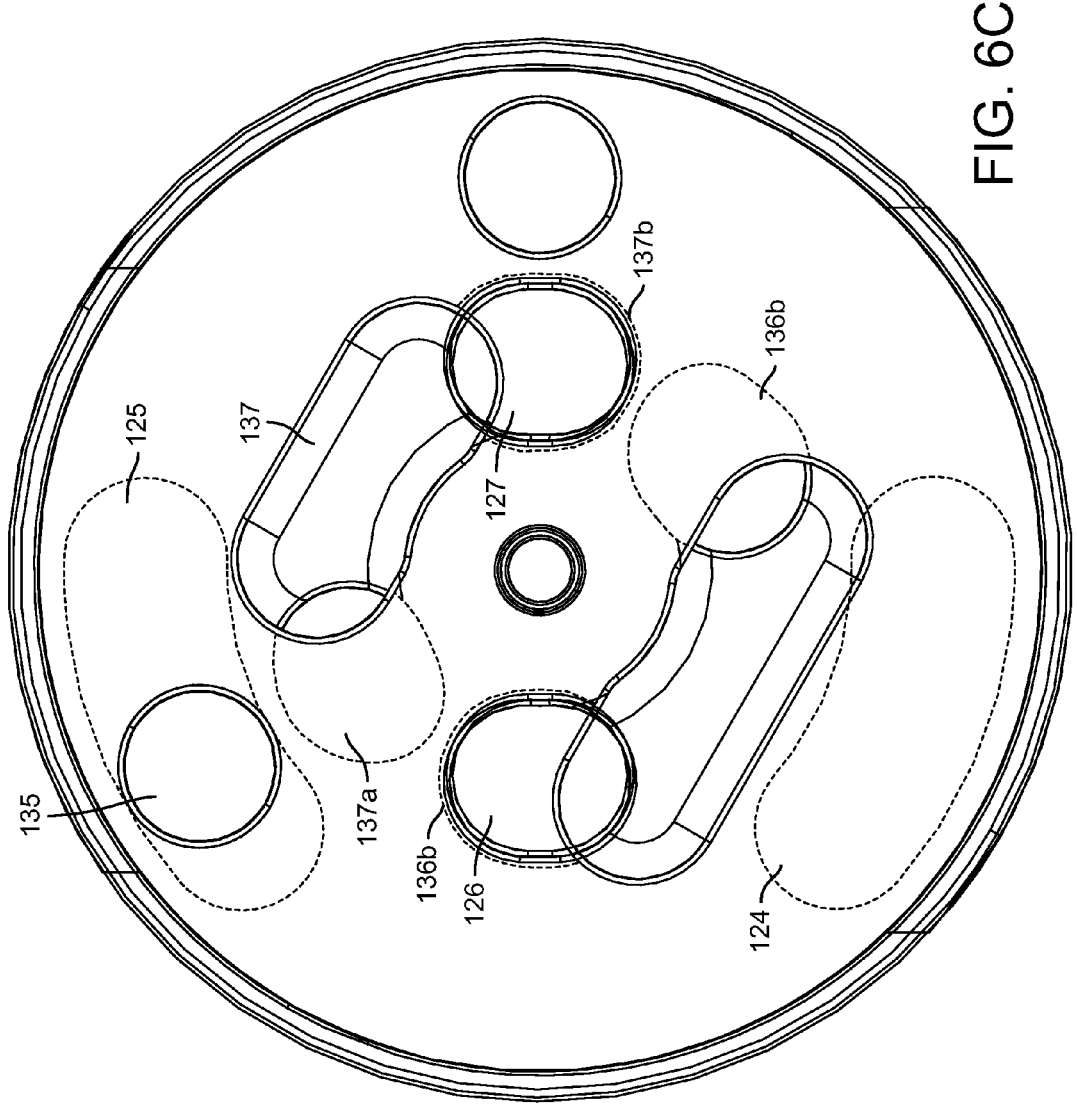
FIG. 6C is a plan view of the first and second diverter plates illustrating the positions of the inlet and outlet channels of the second diverter plate relative to the inlet and outlet channels of the first diverter plate with the second diverter plate rotated in a counter-clockwise direction relative to FIG. 6A, thereby diverting flow to the second outlet port, according to an exemplary embodiment.

Referring now to FIG. 6C, a plan view of second diverter plate 130 overlaid onto first diverter plate 120 and rotated in a second direction is shown, according to an exemplary embodiment. In FIG. 6C, second diverter plate 130 has been rotated counter-clockwise by approximately 60° from the neutral position illustrated in FIG. 6A. The features of first diverter plate 120 are shown in the same position because first diverter plate 120 may not rotate relative to inlet adapter 110 (e.g., due to pegs 108 linking inlet adapter 110 and first diverter plate 120). However, the features of second diverter plate 130 are shown rotated in a counter-clockwise direction from the neutral position. For example, lower opening 136b is shown in alignment with inlet channel 126 and lower opening 137b is shown in alignment with inlet channel 127. This alignment may create a fluid connection between inlet channels 126,127 and inlet channels 136,137 respectively. In other words, fluid from inlet channel 126 may be permitted to flow into inlet channel 136 via the alignment of lower opening 136b with inlet channel 126. Similarly, fluid from inlet channel 127 may be permitted to flow into inlet channel 137 via the alignment of lower opening 137b with inlet channel 127.

Still referring to FIG. 6C, outlet channel 135 is shown in alignment with outlet channel 125. This alignment may allow the mixed fluid to pass through outlet channel 135, outlet channel 125, and re-enter inlet adapter 110 via connection port 115. The mixed fluid may then exit inlet adapter 110 via outlet port 105. In some implementations, outlet port 105 may be fluidly connected with a shower head. Accordingly, the mixed fluid may be selectively directed to the shower head by rotating second diverter plate 130 in a counter-clockwise direction. Notably, when second diverter plate 130 is rotated in the counter-clockwise direction, outlet channel 134 may remain misaligned with outlet channel 124. This misalignment may prevent the mixed fluid from exiting cartridge 100 through outlet port 104, thereby diverting the entirety of the fluid flow to outlet port 105.

Advantageously, the kidney shape of outlet channel 125 (i.e., the upper opening of outlet channel 125) may facilitate a fluid connection between outlet channel 135 and outlet channel 125 throughout a wide rotational range of second diverter plate 130. For example, outlet channel 135 may be completely aligned with outlet channel 125 as outlet channel 135 moves from one end of the kidney-shaped opening to the other end of the kidney-shaped opening. This fluid connectivity may allow the mixed fluid to exit cartridge 100 throughout a wide rotational range of second diverter plate 130.

Still referring to FIG. 6C, lower opening 136b is shown in complete alignment with inlet channel 126 and lower opening 137b is shown in complete alignment with inlet channel 127. Accordingly, the rotational position of second diverter plate 130 shown in FIG. 6C may correspond to a maximum flow position for diverting the mixed fluid to outlet port 105. As second diverter plate 130 is rotated between the no flow position shown in FIG. 6A and the maximum flow position for outlet port 105 shown in FIG. 6C, lower openings 136b, 137b may move from complete misalignment with inlet channels 126,127 into complete alignment with inlet channels 126,136. When second diverter plate 130 is in an intermediate position (e.g., between the no flow position and the maximum flow position for outlet port 105), lower openings 136b,137b may be partially aligned with inlet channels 126,127. Cartridge 100 may perform volume control by controlling the degree of alignment of lower openings 136b,137b with inlet channels 126,127. Such alignment may be controlled via the selective rotation of second diverter plate 130 (e.g., via an attached volume control handle).

Referring now to FIGS. 6D-6H, an alternate configuration 300 of diverter plates 120,130 is shown, according to an exemplary embodiment. First diverter plate 120 has been replaced with diverter plate 320 and second diverter plate 130 has been replaced with diverter plate 330. Diverter plate 320 is shown positioned between diverter plate 330 and inlet adapter 110. Diverter plate 320 may be fixed relative to inlet adapter 110 (e.g., via screws, pegs, or another fastener inserted through coupling holes 322). Diverter plate 330 may be rotatable relative to diverter plate 320.

In configuration 300, first and second inlet ports 106,107 may be fluidly connected with pressure balance unit 140 at all times (e.g., regardless of the rotational position of diverter plate 330). Volume control may be performed after the first and second fluids have passed through diverter plates 320, 330, pressure balance unit 140, and have combined to form a mixed fluid. In some embodiments, volume control may be performed by rotating diverter plate 330 such that an outlet channel of diverter plate 330 moves into alignment with an outlet channel in diverter plate 320. In some embodiments, diverter plate 330 may be rotatable between a first end position in which the mixed fluid is diverted to outlet port 104 and a second end position in which the mixed fluid is diverted to outlet port 105. When diverter plate 330 is in a neutral position (e.g., midway between the first end position and the second end position), the mixed fluid may be prevented from flowing through cartridge 100.

Still referring to FIGS. 6D-6H, diverter plate 320 is shown to include a first inlet channel 326 and a second inlet channel 327. Inlet channels 326,327 may be in continuous alignment with inlet connections 116,117 of inlet adapter 110. Inlet channels 326,327 may receive the first and second fluids from inlet connections 116,117 and guide the separate fluids into inlet channels 336,337. In some embodiments, inlet channels 326,327 may have a kidney-shaped or oval-shaped upper opening such that inlet channels 326,327 remain fluidly connected with inlet channels 336,337 regardless of the rotational position of diverter plate 330.

Diverter plate 320 is further shown to include a first outlet channel 324 and a second outlet channel 325. Outlet channels 324,325 may be in continuous alignment with outlet connections 114,115 of inlet adapter 110. Outlet channel 324 may receive the mixed fluid from outlet channel 334 and guide the mixed fluid toward outlet ports 104. Similarly, outlet channel 325 may receive the mixed fluid from outlet channel 335 and guide the mixed fluid toward outlet ports 105. In some embodiments, an upper opening of outlet channels 324,325 may be shaped to effectuate volume control over the mixed fluid. For example, the upper openings of outlet channels 324,325 may be teardrop-shaped, kidney-shaped, or oval-shaped for more particularly controlling an amount of fluid permitted to pass through diverter plate 320.

Still referring to FIGS. 6D-6H, diverter plate 330 is shown to include a first inlet channel 336 and a second inlet channel 337. Inlet channels 336,337 may be fluidly connected with inlet channels 326,327 at all times. In some embodiments, inlet channels 336,337 may have a kidney-shaped or oval-shaped bottom opening such that inlet channels 326,327 remain fluidly connected with inlet channels 326,327 regardless of the rotational position of diverter plate 330. Inlet channels 336,337 may receive the first and second fluids from inlet channels 326,327 and provide the separate fluids to pressure balance unit 140.

Diverter plate 330 is further shown to include a first outlet channel 334 and a second outlet channel 335. Outlet channels 334,335 may receive the mixed fluid from mixing chamber 172. In configuration 300, the mixed fluid may be selectively diverted to one of outlet ports 104,105 by moving one of outlet channels 334,335 into alignment with one of outlet channels 324,325. By rotating diverter plate 330 in a first direction from the neutral position (e.g., toward the first end position), outlet channel 334 may be moved into alignment with outlet channel 324. By rotating diverter plate 330 in a second direction from the neutral position (e.g., toward the second end position), outlet channel 335 may be moved into alignment with outlet channel 325. Volume control may be performed by increasing or decreasing the alignment of outlet channels 334,335 with outlet channels 324,325.

Figure 6D:
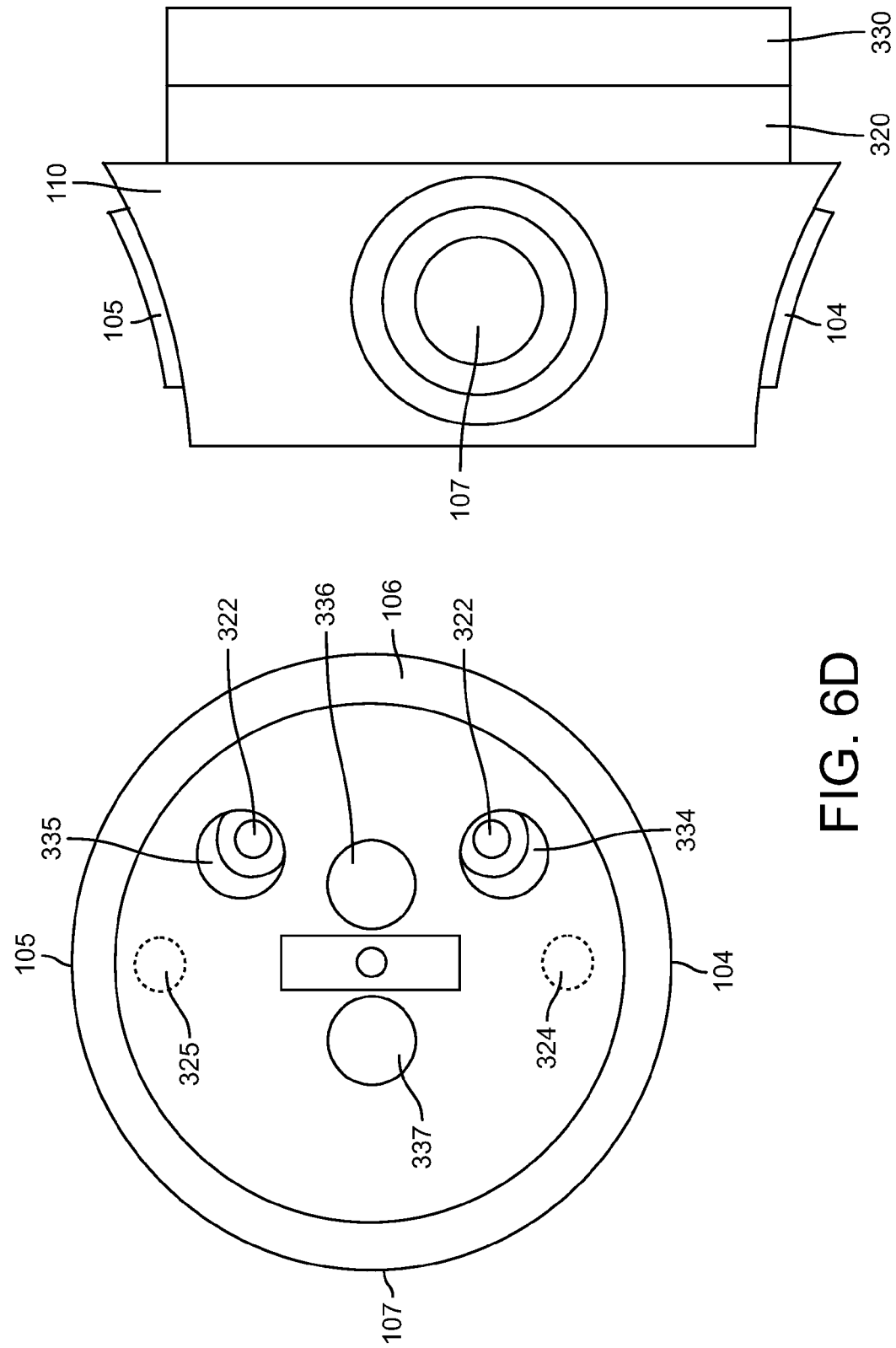
Figure 6E:
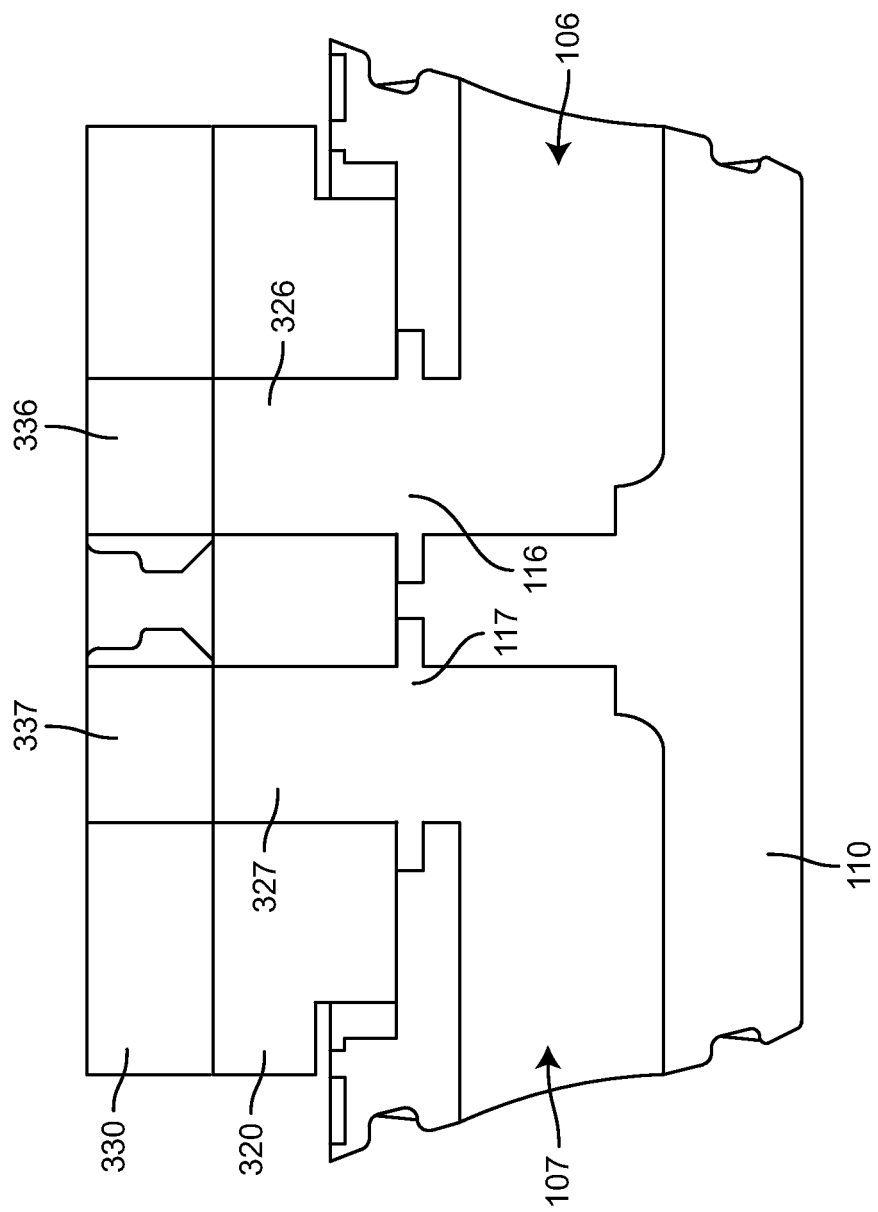
Figure 6F:
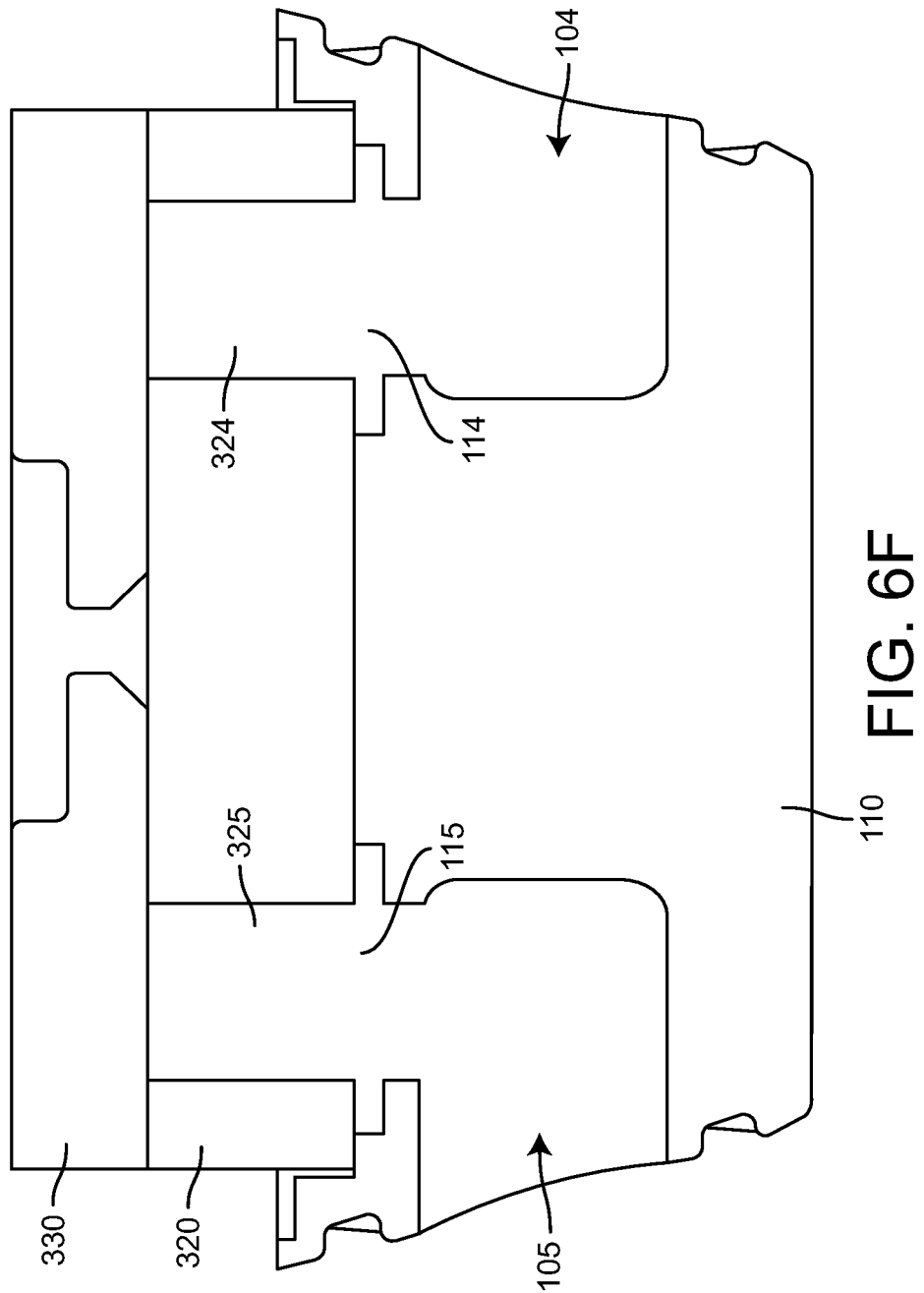

Referring specifically to FIGS. 6D-6F, diverter plate 330 is shown in the neutral position, according to an exemplary embodiment. In the neutral position, inlet channels 336,337 may be fluidly connected with inlet channels 326,327. However, outlet channels 334,335 may be misaligned with outlet channels 324,325. Therefore, the mixed fluid may be prevented from flowing through cartridge 100. Outlet channels 324,325 are shown as dotted lines, hidden below a blocking surface of diverter plate 330.

Figure 6H:
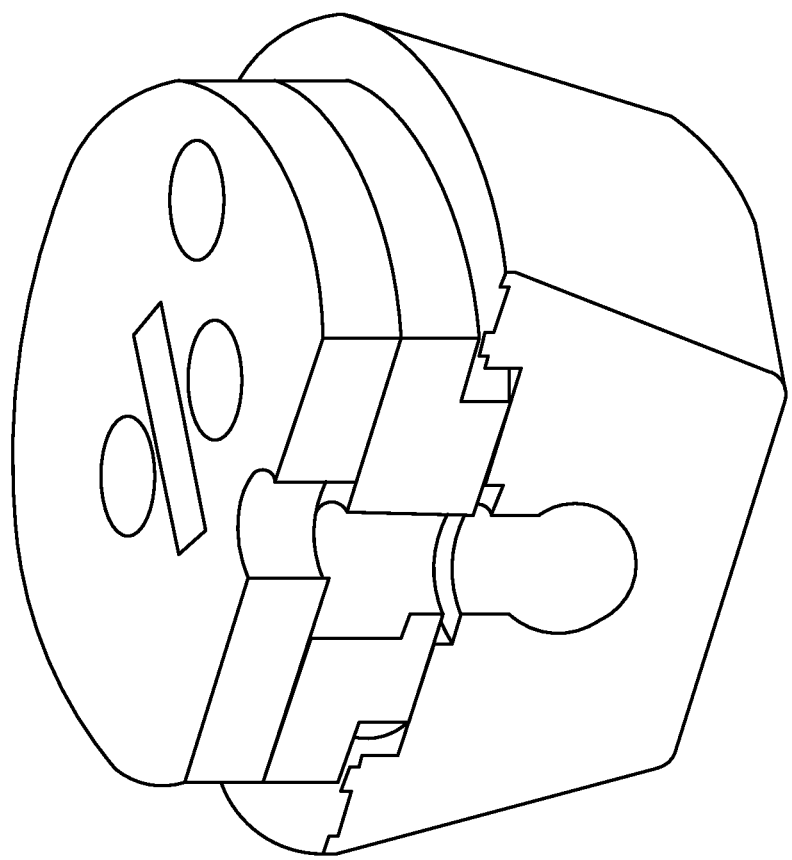

Referring now to FIGS. 6G-6H, diverter plate 330 is shown in the second end position, according to an exemplary embodiment. In the second end position, inlet channels 336, 336 may remain fluidly connected with inlet channels 326, 326. However, as diverter plate 330 is rotated toward the second end position, outlet channel 335 may move into alignment with outlet channel 325, thereby forming a fluid connection between the mixing chamber and outlet port 105.

Accordingly, when diverter plate 330 is in the second end position, the mixed fluid may be diverted toward outlet port 105.

Figure 6I:
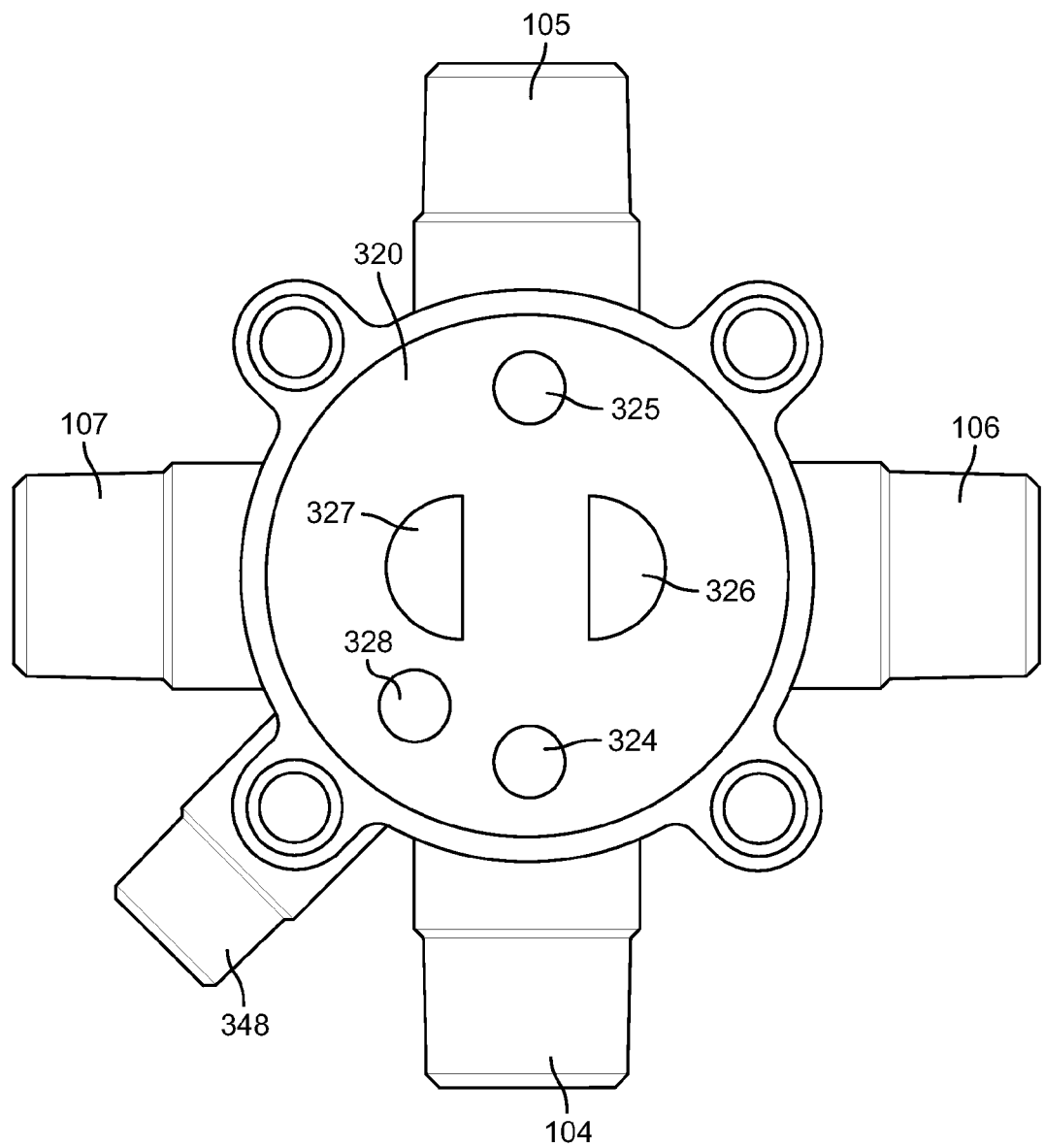
FIG. 6I illustrates another configuration in which the diverter plate and valve body include additional outlet channels.

Referring now to FIG. 6I, another exemplary embodiment of diverter plate 320 is shown. In some embodiments, diverter plate 320 may include a greater number of outlet channels. For example, diverter plate 320 may include an additional (e.g., third, fourth, fifth, etc.) outlet channel 328 for directing the mixed fluid toward an additional (e.g., third, fourth, fifth, etc.) outlet port 348 of a valve body into which cartridge 100 may be inserted. In some embodiments, outlet channel 328 may be fluidly connected with outlet port 348 at all times. In some embodiments, diverter plate 320 may include a lesser number of outlet channels (e.g., a single outlet channel). In some embodiments, diverter plate 320 may be rotatably fixed to diverter plate 330 (e.g., via pegs, slots, etc.) such that rotation of diverter plate 330 causes a corresponding rotation of diverter plate 320. In some embodiments, an outlet channel of diverter plate 320 may be rotated into alignment with an outlet connection of inlet adapter 110 for directing fluid to a specific outlet port (e.g., a first, second, third, fourth, etc. outlet port).

Figure 6J:
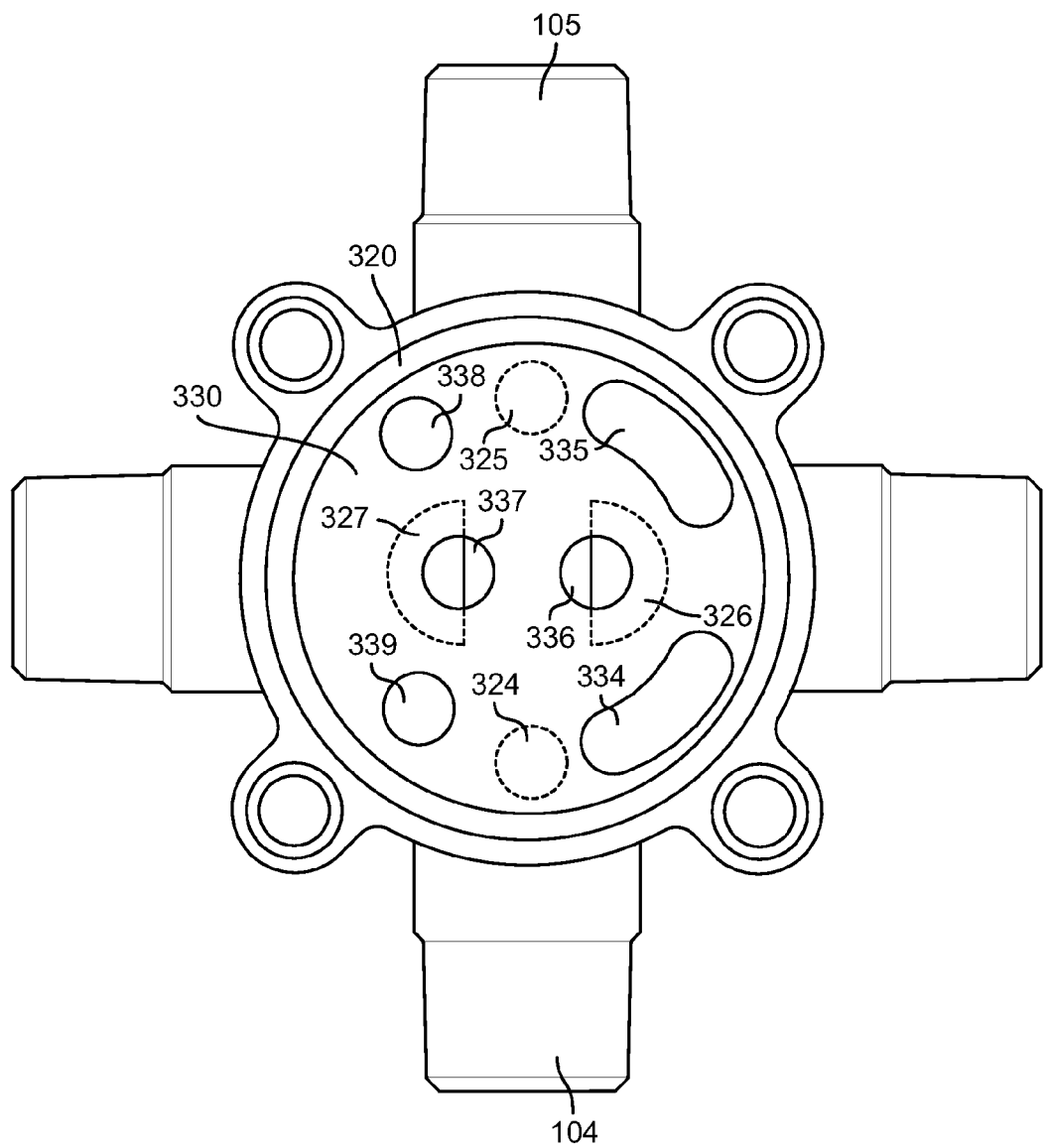
FIGS. 6J-6L illustrates another configuration in which the diverter plate includes additional outlet channels.
Figure 6K:
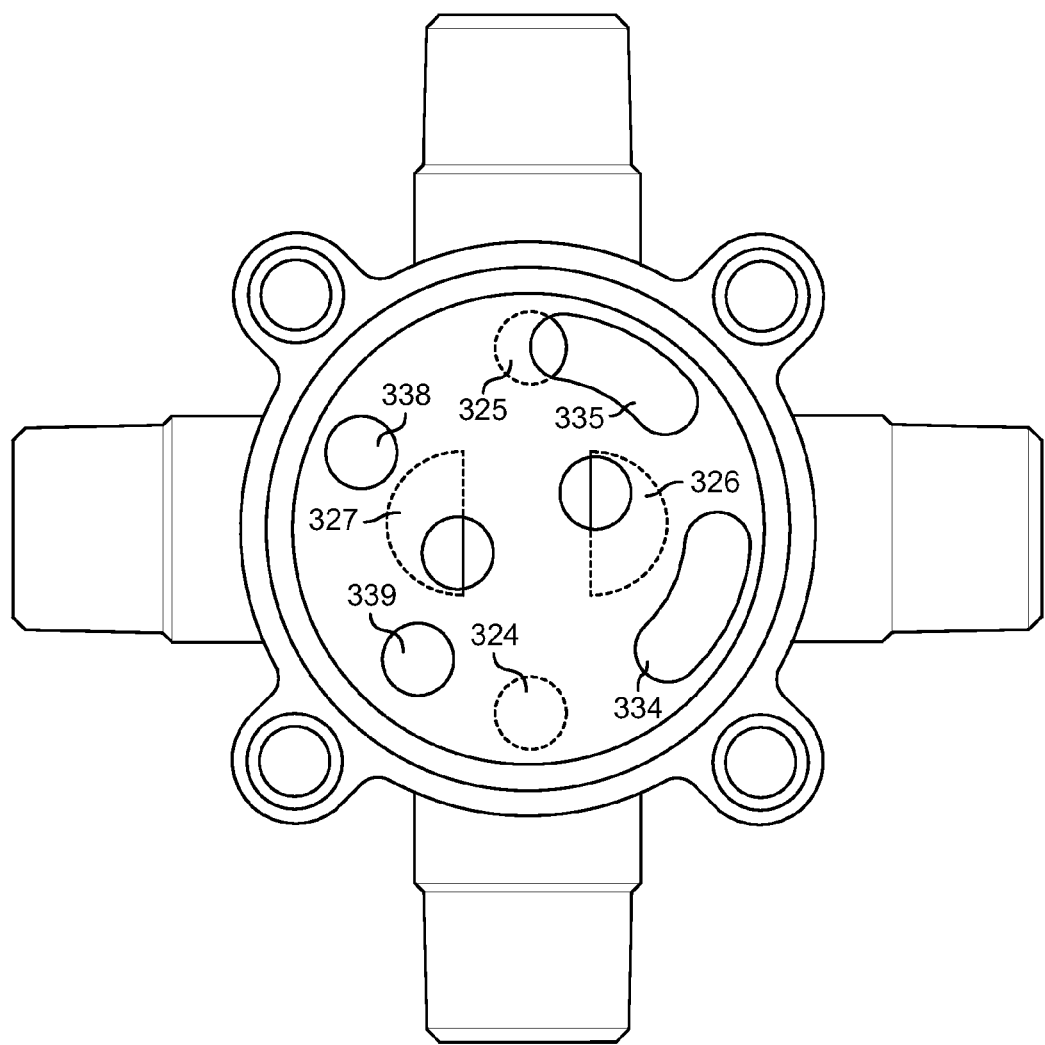
Figure 6L:
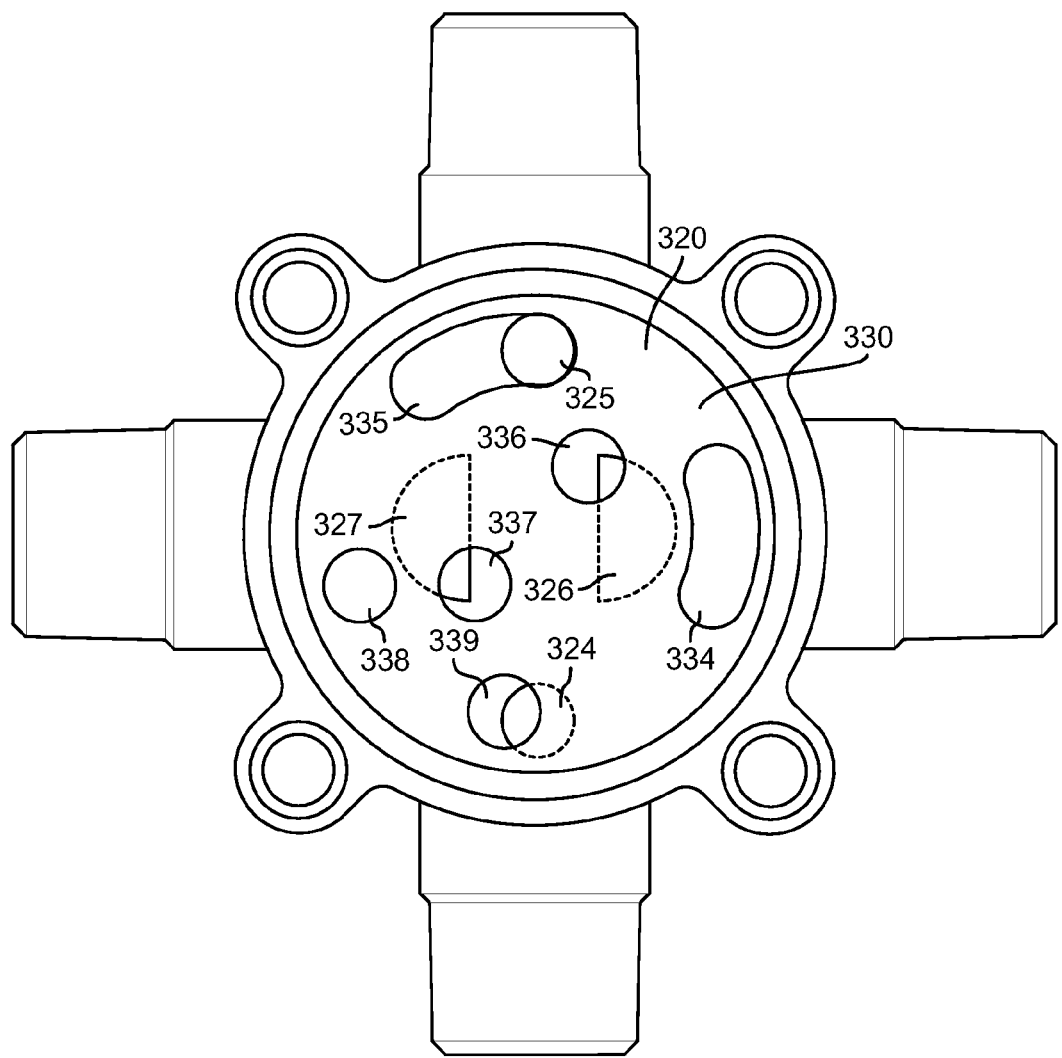

Referring now to FIGS. 6J-6L, another exemplary embodiment of diverter plate 330 is shown. In some embodiments, diverter plate 330 may include one or more additional outlet channels (e.g., a third outlet channel, a fourth outlet channel, etc.). For example, diverter plate 330 is shown to include a third outlet channel 338 and a fourth outlet channel 339. Outlet channels 338,339 may be positioned about diverter plate 330 such that rotation of diverter plate 330 relative to diverter plate 320 causes the alignment of one or more of outlet channels 338,339 with one or more outlet channels in diverter plate 320 (e.g., outlet channels 324,325 or additional outlet channels for directing fluid to additional outlet ports).

In some embodiments, the positioning and/or size of outlet channels 338,339 relative to outlet channels 334,334 may be such that the mixed fluid is directed to both of outlet ports 104,105 simultaneously. For example, diverter plate 330 is shown to include an additional outlet channel 339 spaced approximately 180 degrees from outlet channel 335. When outlet channel 335 is moved into alignment with outlet channel 325, outlet channel 339 may move into alignment with outlet channel 324. Similarly, diverter plate 330 is shown to include an additional outlet channel 338 approximately 180 degrees from outlet channel 334. When outlet channel 334 is moved into alignment with outlet channel 324, outlet channel 338 may move into alignment with outlet channel 325. In other embodiments, the positioning and/or size of outlet channels 338,339 relative to outlet channels 334,334 may be such that the mixed fluid is directed to no more than one of outlet ports 104,105 for any given rotational position of diverter plate 330.

In some embodiments, the positioning and/or size of outlet channels 338,339 relative to outlet channels 334,334 may be such that the mixed fluid is directed to only one of outlet ports 104,105 for some rotational positions of diverter plate 330 and directed to both of outlet ports 104,105 for other rotational positions of diverter plate 330. For example, diverter plate 330 is shown to include an additional outlet channel 339 spaced approximately 180 degrees from outlet channel 335. Referring specifically to FIG. 6K, when outlet channel 335 is moved into partial alignment with outlet channel 325, outlet channel 339 may not align with outlet channel 324. Similarly, if diverter plate 330 is rotated in an opposite direction, outlet channel 334 may move into partial alignment with outlet channel 324 and outlet channel 338 may not align with outlet channel 335. This misalignment may be caused by the position of outlet channels 338,339 relative to outlet channels 334,335 (e.g., not directly opposite outlet channels 334,335) or the size of outlet channels 338,339 relative to outlet channels 334,335 (e.g., smaller than outlet channels 334,335).

Referring specifically to FIG. 6L, as diverter plate 330 is rotated further, outlet channel 335 may at least partially align with outlet channel 325 and outlet channel 339 may at least partially align with outlet channel 324. Similarly, if diverter plate 330 is rotated further in an opposite direction (e.g., from the neutral position shown in FIG. 6J), outlet channel 334 may at least partially align with outlet channel 324 and outlet channel 338 may at least partially align with outlet channel 325. In this manner, the rotational position of diverter plate 330 may divert the mixed fluid to a single outlet port (e.g., as shown in FIG. 6k) or two or more outlet ports (e.g., as shown in FIG. 6L).

In some embodiments, outlet channels 338,339 may have a larger or smaller opening than outlet channels 334,335. For, example, in FIGS. 6J-6L, outlet channels 338,339 are shown as circular channels whereas outlet channels 334,335 are shown as kidney-shaped channels. This size discrepancy may cause outlet channels 338,339 become aligned with outlet channels 324,325 after outlet channels 334,335 become aligned with outlet channels 324,325 as diverter plate 330 is rotated from a neutral position toward an end position.

Figure 6M:
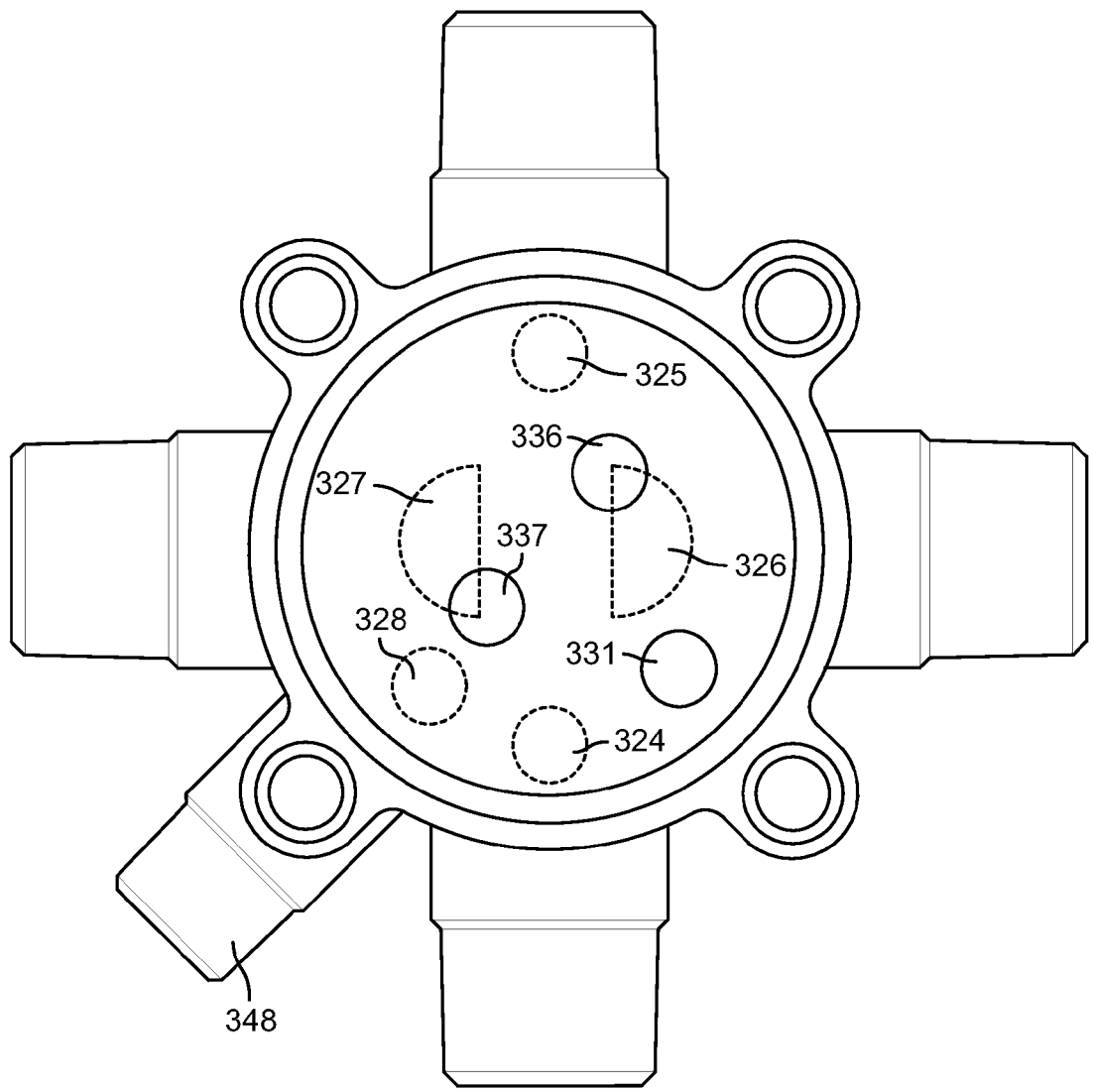
FIG. 6M, illustrates another configuration in which the diverter plate includes fewer outlet channels.

Referring now to FIG. 6M, in some embodiments, diverter plate 330 may include a lesser number of outlet channels. For example, diverter plate 330 is shown to include a single outlet channel 331. The rotational position of diverter plate 330 may move outlet channel 331 into discrete alignment with one of outlet channels 325,326,328 in diverter plate 320. In some embodiments, outlet channel 331 may be configured to direct the mixed fluid to two or more of outlet channels 325,326,328 simultaneously. For example, outlet channel 331 may be sufficiently wide or include multiple fluid paths (e.g., similar to inlet channels 136,137) configured to at least partially align with two or more outlet channels in diverter plate 320 concurrently.

In some embodiments, diverter plate 330 may be rotated into the first end position by rotating diverter plate in a first direction by approximately 45 degrees from the neutral position. Similarly, diverter plate 330 may be rotated into the second end position by rotating diverter plate in a second direction by approximately 45 degrees from the neutral position. In other embodiments, the first and second end positions may be separated from the neutral position by any other degree of rotation (e.g., 15 degrees, 30 degrees, 60 degrees, 90 degrees, etc.).

In some embodiments, diverter plate 330 may be attached to a volume control handle via a linkage (e.g., a gear coupling, a cam system, etc.) which translates a relatively larger rotation of the volume control handle into a smaller rotation of diverter plate 330. For example, the volume control handle may be attached to diverter plate 330 in such a way that a 90 degree rotation of the volume control handle effects a 30 degree rotation of diverter plate 330 (e.g., by gears having a 3:1 gear ratio, etc.).

Figure 7A:
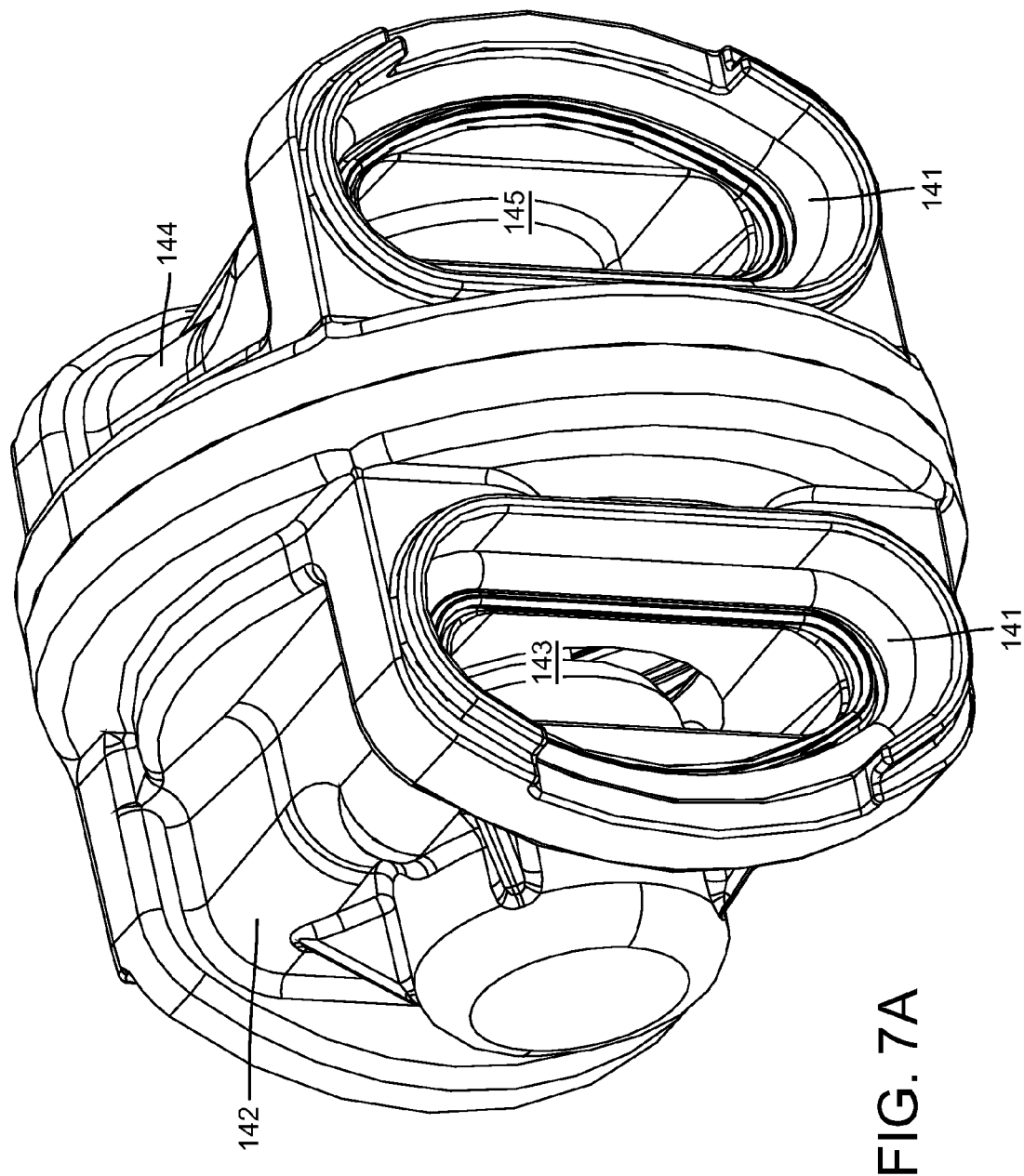
FIG. 7A is a drawing illustrating the pressure balance unit in greater detail, according to an exemplary embodiment.
Figure 7B:
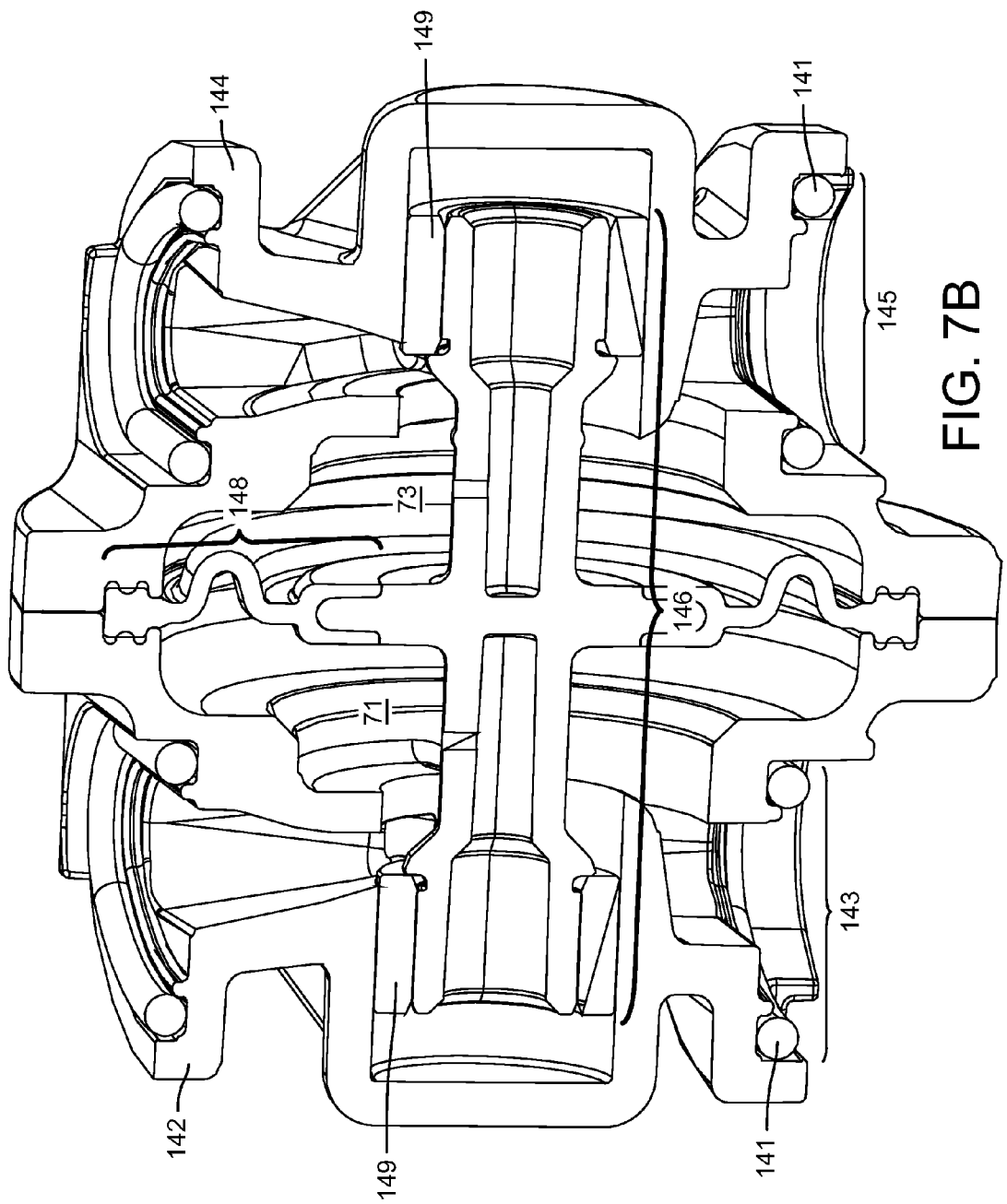
FIG. 7B is a half-sectional view of the pressure balance unit, according to an exemplary embodiment.

Referring now to FIGS. 7A and 7B, pressure balance unit 140 is shown, according to an exemplary embodiment. Pressure balance unit 140 may respond to a difference in pressure between the fluid supply lines and reduce or limit the flow rate of the fluid with the higher fluid pressure. Pressure balance unit 140 is shown to include a first shell 142, a second shell 144, a sliding element 146, a diaphragm 148 extending from a center portion of sliding element 146, and sleeves 149 inserted over the ends of sliding element 146.

First shell 142 and second shell 144 may be aligned using a tongue-and-groove alignment system and united (e.g., connected, linked, attached, joined, welded, etc.) to form a cohesive unit. Sliding element 146 may be positioned within shells 142,144 and may be movable along a longitudinal axis defined by a shaft of sliding element 146. Diaphragm 148 may be overmolded onto sliding element 146 and secured inside shells 142,144 along an outer perimeter of diaphragm 148. Diaphragm 148 may form a flexible and pressure-sensitive barrier between shells 142,144.

Pressure balance unit 140 may further include inlet ports 143,145. Ports 143,145 may receive fluid from second diverter plate 130 via inlet channels 136,137 respectively. In some embodiments, ports 143,145 may be kidney-shaped. Advantageously, kidney-shaped ports 143,145 may accommodate a high volume flow rate of the first and second fluids with minimal fluid drag. In other embodiments, ports 143,145 may oval-shaped, circular, or have any other shape. In some embodiments, the shape of ports 143,145 may be selected to match the shape of the upper openings of inlet channels 136,137 or a shape of a transition element inserted between second diverter plate 130 and pressure balance unit 140.

Referring specifically to FIG. 7A, pressure balance unit 140 is shown to include perimeter seals 141 around ports 143,145. In some embodiments, seals 141 may form a fluid barrier around ports 143,145, thereby preventing leakage between second diverter plate 130 and pressure balance unit 140. In some embodiments, seals 141 may contact both pressure balance unit 140 and second diverter plate 130. In other embodiments, seals 141 may form a fluid barrier around ports 143,145 between pressure balance unit 140 and an intermediate transition element between pressure balance unit 140 and second diverter plate 130 (e.g., transition element 190, described in greater detail in reference to FIGS. 8A-8B). In some embodiments, seals 141 form a fluid barrier between two elements (e.g., pressure balance unit 140, second diverter plate 130, transition element 190, etc.) which do not rotate relative to one another (e.g., both elements do not rotate or both rotate at the same rate and in the same direction). In other embodiments, seals 141 may be configured to maintain a fluid barrier between elements having a relative rotation.

Referring specifically to FIG. 7B, in operation, a first fluid (e.g., hot water) may pass through second diverter plate 130 via inlet channel 136 and enter pressure balance unit 140 via inlet port 143. A second fluid (e.g., cold water) may pass through second diverter plate 130 via inlet channel 137 and enter pressure balance unit 140 via inlet port 145. Diaphragm 148 may separate a first pressure chamber 71 from a second pressure chamber 73 within pressure balance unit 140. Diaphragm 148 may form a watertight barrier, thereby preventing cross-flow between fluid channels. Due to the flexibility of diaphragm 148, a difference in fluid pressure between the fluids contained within shells 142,144 may cause diaphragm 148 to expand, bulge, or otherwise deflect into the shell having the lower pressure. This deflection may cause sliding element 146 to slide over an inlet port fluidly connected to the pressure chamber (e.g., pressure chamber 71 or 73) having the higher pressure, thereby reducing the volumetric flow rate of the high-pressure fluid.

In some embodiments, pressure balance unit 140 may include a thermostatic component. The thermostatic component may provide for temperature regulation in addition to pressure balancing functionality. The thermostatic component may be an additional component inserted in series with the aforementioned components of pressure balance unit 140 or may be integrated into the previously described components. For example, sliding element 146 and/or diaphragm 148 may be biased toward one of pressure chambers 71,73 based on the temperature of the first or second fluid. As the fluid temperature changes, the thermostatic component may alter the bias of sliding element 146 and/or diaphragm 148 (e.g., the thermostatic offset), thereby increasing or decreasing the open cross-sectional area of the inlet ports leading into pressure chambers 71,73. In some embodiments, the pressure balance unit 140 may be replaced by a thermostatic component.

In other embodiments, pressure balance unit 140 may be a combination pressure balance and thermostatic unit. The combination unit may be sensitive to two or more fluid properties and/or attributes (e.g., pressure, temperature, flow rate, etc.) and may be referred to generally as an "attribute-sensitive" unit. The attribute-sensitive unit may variably open or close a fluid port based on any number of attributes of the first and second fluid. The attributes may be independent attributes (e.g., a temperature of the first fluid, a pressure of the first fluid, etc.) or relative attributes (e.g., a pressure difference between fluids, a temperature of the mixed fluid, etc.).

Figure 8B:
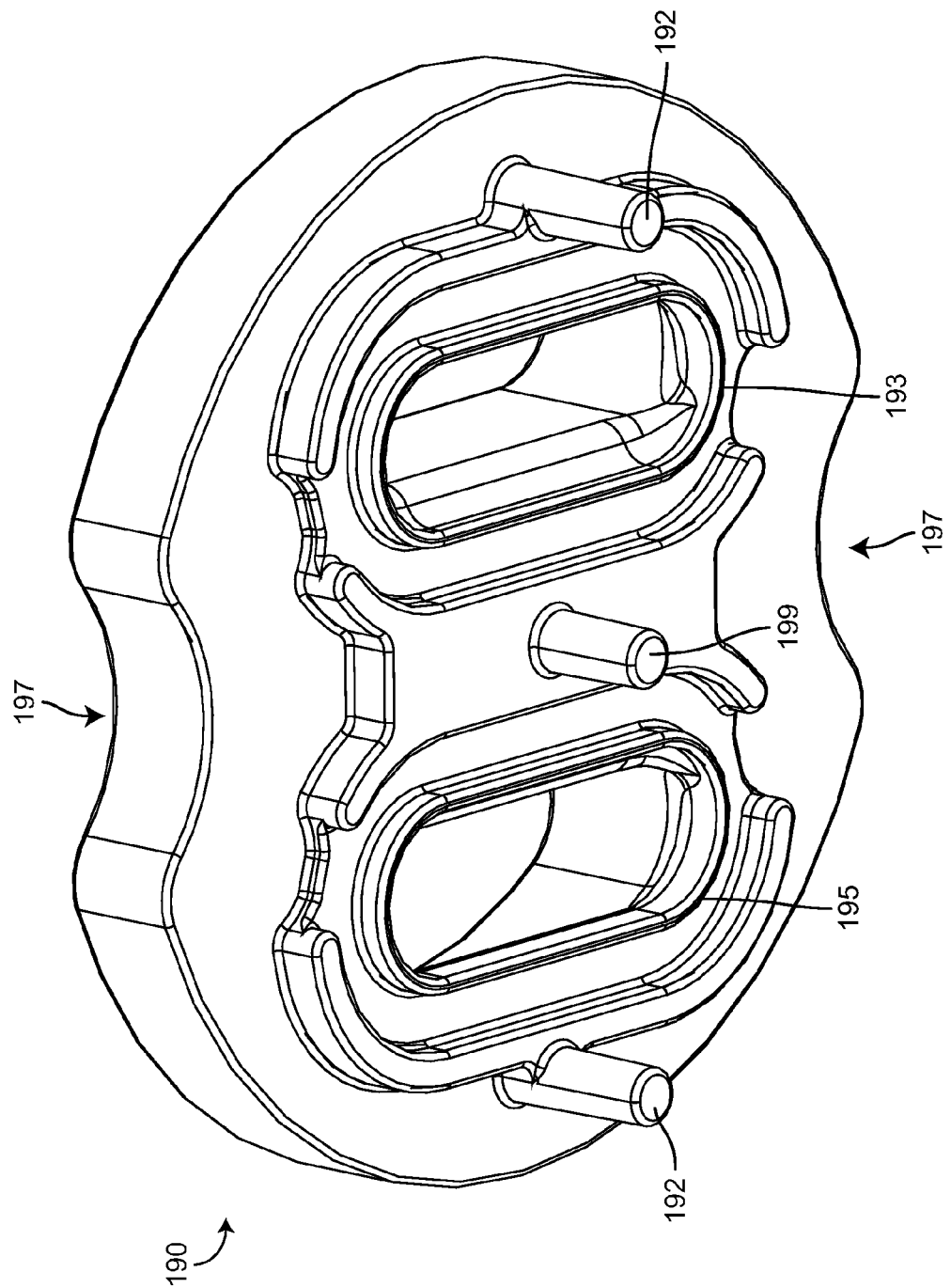
FIG. 8B is a drawing showing pegs extending from the bottom surface of the transition element for engaging holes in an upper surface of the second diverter plate and causing rotation of the second diverter plate relative to the first diverter plate, according to an exemplary embodiment.

Referring now to FIGS. 8A and 8B, in some embodiments, diverter cartridge 100 may further include a transition element 190. Transition element 190 may function as an intermediary between volume control plate second diverter plate 130 and pressure balance unit 140. As shown in FIG. 7A, transition element 190 may be located on top of second diverter plate 130. Transition element 190 is shown to include openings 193,195. Openings 193,195 may be configured to align with ports 143,145 of pressure balance unit 140 as well as inlet channels 136,137 in second diverter plate 130.

In some embodiments, openings 193,195 may have a non-uniform cross-sectional area. In other words, the shape of openings 193,195 may change as openings 193,195 extend through transition element 190. In some embodiments, one side of openings 193,195 (e.g., a side facing pressure balance unit 140) may be kidney-shaped. The kidney-shape may be configured to align with kidney-shaped ports 143,145 in pressure balance unit 140. The alignment of openings 193,195 with ports 143,145 may rotatably link pressure balance unit 140 with transition element 190. In other words, rotating pressure balance unit 140 (e.g., via an external volume control handle) may cause transition element 190 to rotate.

The other side of openings 193,195 (e.g., the side facing second diverter plate 130) may be circular, rectangular, oval-shaped, or have any other shape. In some embodiments, the shape of openings 193,195 facing second diverter plate 130 may match the shape of the upper openings of inlet channels 136,137. For example, in FIG. 8B, transition element 190 is shown having oval-shaped openings to match the upper openings of inlet channels 136,137.

Still referring to FIG. 8B, in some embodiments, transition element 190 may include rotation pegs 192 and axis peg 199. Rotation pegs 192 and axis peg 199 are shown extending from a bottom surface of transition element 190. Pegs 192 may be configured to align with rotation holes 132 in top surface 131 of second diverter plate 130. Axis peg 199 may be configured to align with central hole 139 in second diverter plate 130. Rotation pegs 192 may be used to rotatably link transition element 190 with second diverter plate 130 such that rotation of transition element 190 causes second diverter plate 130 to rotate about axis peg 199. The coupling between transition element 190 and second diverter plate 130 may allow a user to effectuate volume control over the fluids by rotating transition element 190 (e.g., via an external volume control handle), thereby causing second diverter plate 130 to rotate relative to first diverter plate 120. Transition element 190 may be rotatably linked to pressure balance unit 140 as well such that rotation of pressure balance unit 140 causes both transition element 190 and second diverter plate 130 to rotate.

In some embodiments, transition element 190 may include openings 197. Openings 197 may be holes, gaps, slots, or other means by which fluid may pass through or around transition element 190. Openings 197 may provide a fluid path through which the mixed fluid may travel before entering outlet channel 134 or outlet channel 135 in second diverter plate 130. In some embodiments, openings 197 are positioned at an edge of transition element 190 such that openings 197 define indentations into a side of transition element 190. In other embodiments, openings 197 are surrounded on all sides by transition element 190. Openings 197 may be circular, semi-circular, or have any other shape.

Figure 9A:
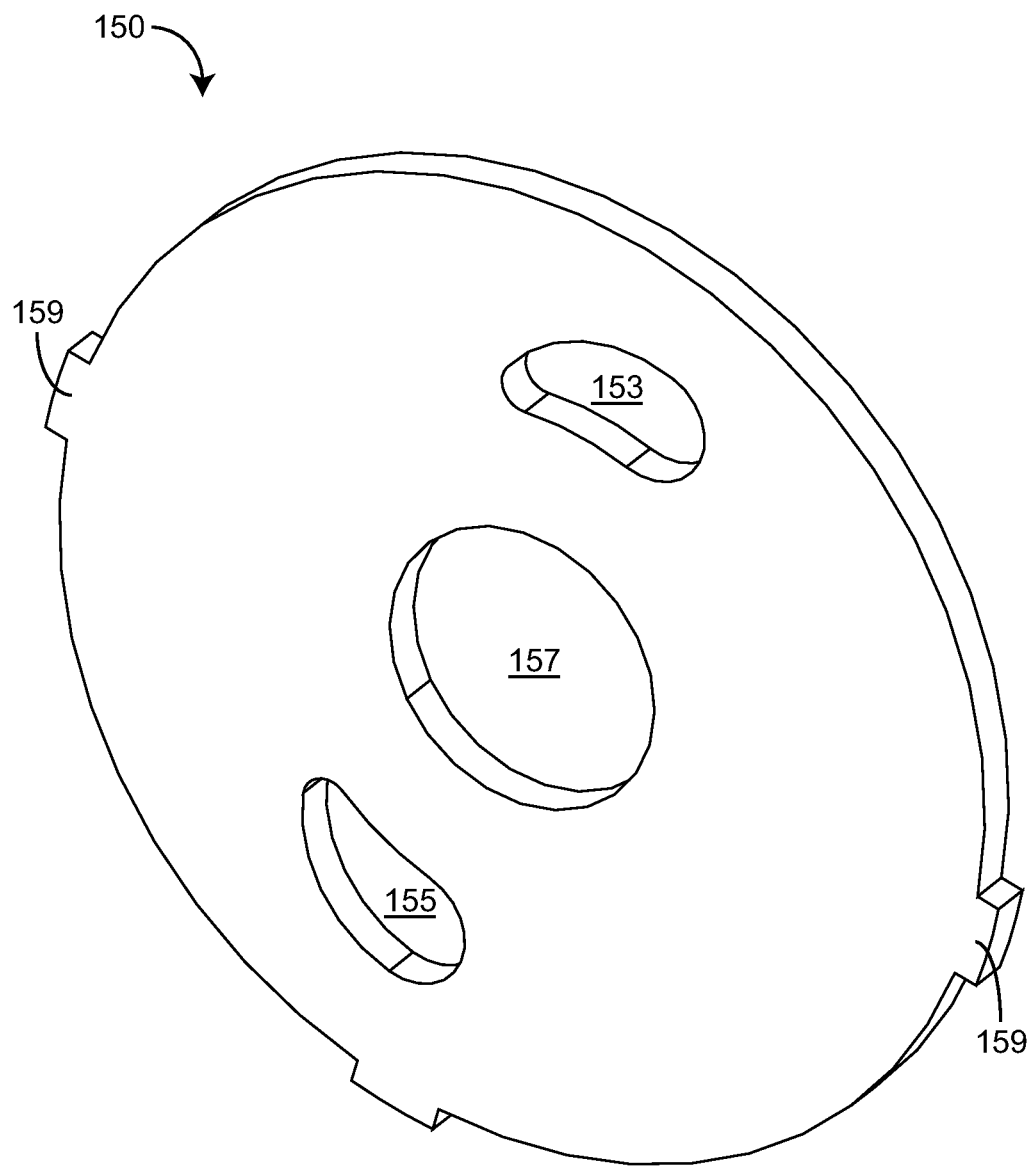
FIG. 9A is a drawing of the mixing plate including teardrop-shaped fluid openings, according an exemplary embodiment.
Figure 9B:
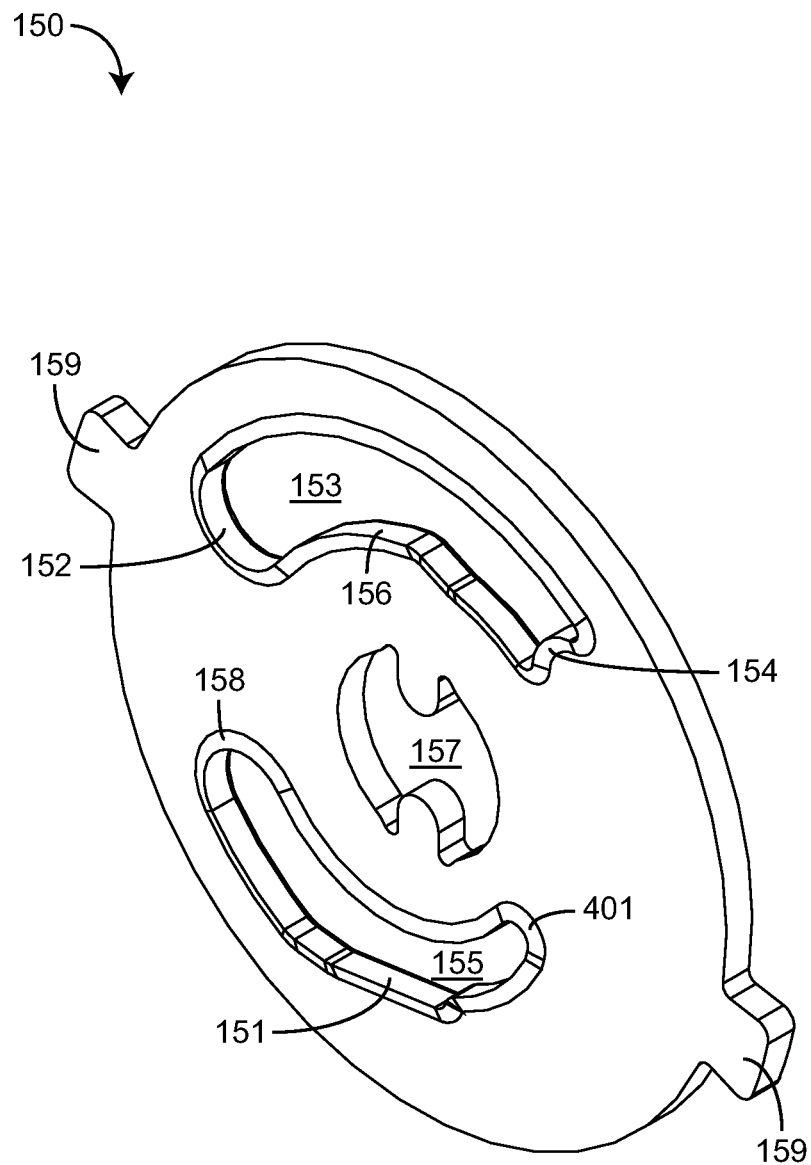
FIG. 9B is a drawing of the mixing plate including irregularly-shaped fluid openings, according to an exemplary embodiment.

Referring now to FIGS. 9A and 9B, mixing plate 150 is shown, according to a first and second exemplary embodiment. Mixing plate 150 may be a thin disc including one or more fluid openings. In some embodiments, mixing plate 150 may be substantially circular. Mixing plate 150 may be used to control the relative proportions of the first and second fluids allowed to enter mixing chamber 172. In some implementations, mixing plate 150 may be used to effectuate temperature control over the mixed fluid. Mixing plate 150 may be used with diverter cartridge 100, a different fluid control cartridge, a sequential fluid control cartridge, or any other fluid control or mixing device. Mixing plate 150 may be used as a standalone component or in combination with any other component or set of components. Mixing plate 150 is shown to include a first opening 153, a second opening 155, a central opening 157, and flanges 159.

Central opening 157 may extend completely through plate 150. In some embodiments, central opening 157 may allow a shaft or other element to extend through plate 150 for interaction with another component of cartridge 100. For example, a central shaft may extend through central opening 157 and attach to pressure balance unit 140 The central shaft may allow a user to cause rotation of pressure balance unit 140 without affecting the linear position or angular rotation of mixing plate 150.

In some embodiments, mixing plate 150 may include flanges 159. Flanges 159 may be used to secure plate 150 to housing 172 for holding plate 150 in a fixed position relative to the housing. In other embodiments, flanges 159 may attach, secure, or otherwise couple plate 150 to pressure balance unit 140, temperature control plate 160, or any other component of cartridge 100. In an exemplary embodiment, mixing plate 150 may include two flanges 159 spaced 180° apart. In other embodiments, more or fewer flanges 159 may be used and the spacing between flanges may be less than or greater than 180°.

In some embodiments, flanges 159 may extend radially from a circumferential edge of plate 150. In other embodiments, flanges 159 may extend in a direction transverse to plate 150 (e.g., in a direction perpendicular to the flat face) or obliquely from plate 150. In further embodiments, flanges 159 may extend radially inward from central opening 157. Inwardly extending flanges 159 may be used to couple plate 150 to a central shaft extending through plate 150.

Still referring to FIGS. 9A and 9B, mixing plate 150 may further include openings 153, 155. In some embodiments, opening 153 may be aligned with a first outlet of pressure balance unit 140 and opening 155 may be aligned with a second outlet of pressure balance unit 140. Fluids from the first and second outlets in pressure balance unit 140 may pass through mixing plate 150 and combine to form a mixed fluid. In some implementations, the first fluid may be hot water, the second fluid may be cold water, and the mixed fluid may be water having an intermediate temperature. Mixing plate 150 may be configured to control the mixing ratio of the mixed fluid by controlling an amount of the first fluid permitted to pass through the disc relative to an amount of the second fluid permitted to pass through the disc. If the two fluids have different temperatures, mixing plate 150 may be configured to control the temperature of the mixed fluid.

Referring specifically to FIG. 9B, opening 153 may include a first end 152, a second end 154, and a side 156. Side 156 may extend between ends 152,154. Typical mixing plates may include circular, kidney-shaped, or teardrop-shaped openings. Teardrop-shaped openings generally include continuously curved sides which intersect at a point (e.g., a tip of the teardrop). In some embodiments, side 156 may be discontinuously curved. For example, side 156 may have multiple radii of curvature, radii of curvature centered around different points on either side of opening 153, straight edges intersecting at angles, straight edges combined with curved edges, or any other irregular profile. Similarly, opening 155 may include a first end 401, a second end 158, and a side 151. In some embodiments, side 151 may not be continuously curved. Sides 151,156 may have a complex or irregular profile. Advantageously, the complex or irregular profile of openings 153,155 may allow mixing plate 150 to achieve precise control over the fluid mixing ratio. This precise control may allow a user to achieve superior temperature control over the mixed fluid.

Figure 9C:
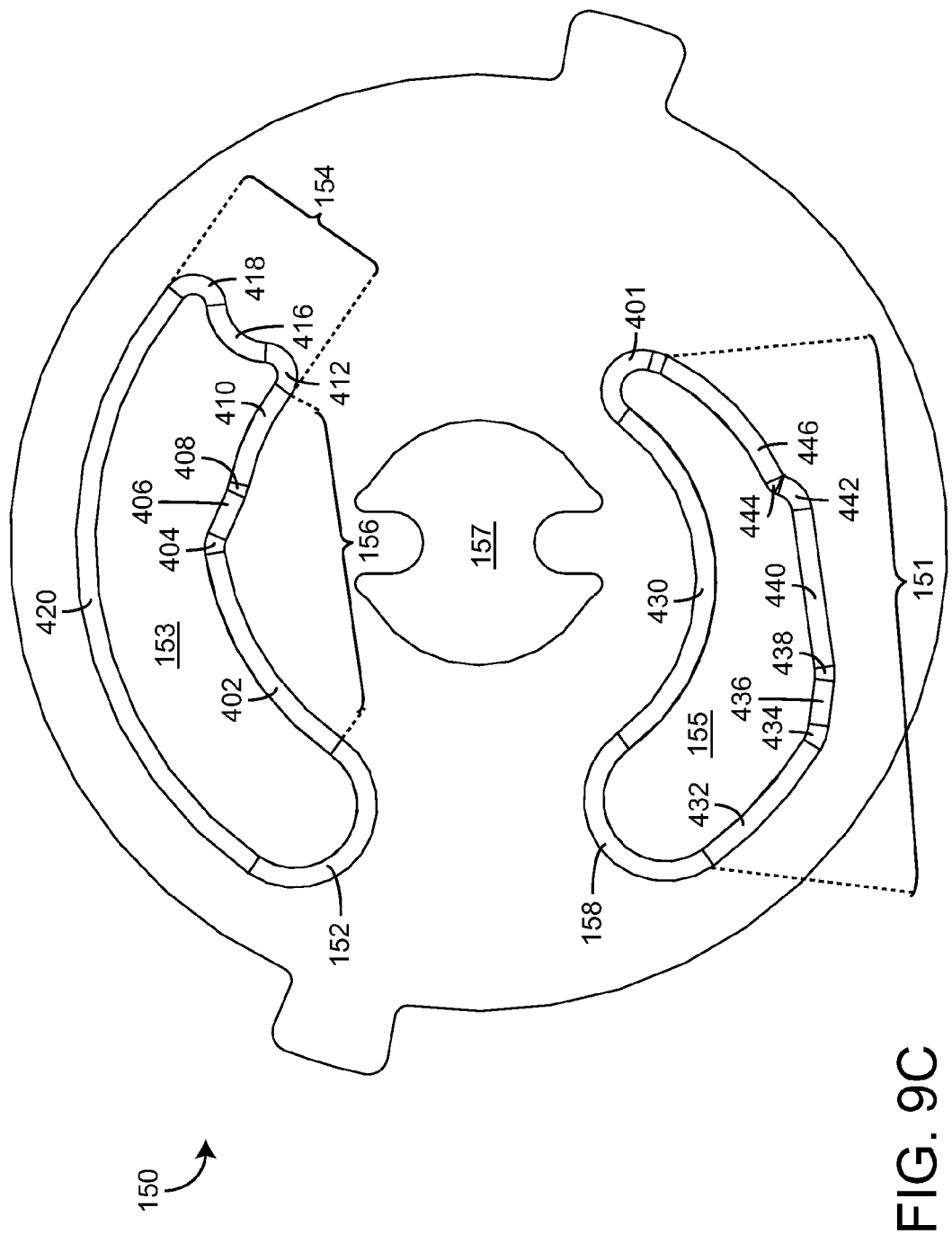
FIG. 9C is a plan view of the mixing plate including the irregularly shaped openings, according to an exemplary embodiment.

Referring now to FIG. 9C, a plan view of the mixing plate 150 of FIG. 9B is shown, according to an exemplary embodiment. FIG. 9C illustrates in detail the irregular profiles of openings 153,155. For example, opening 153 is shown to have a first end 152, a second end 154, a first side 156, and a second side 420. End 152 is shown as a continuous arc having a single radius of curvature. In some embodiments, end 152 may be approximately semi-circular. Second side 420 is also shown as a single continuous arc. However, in other embodiments, end 152 and side 420 may be broken into multiple segments having various radii of curvature.

End 154 is shown to include a plurality of arc segments 412, 416, and 418. Segments 412 and 418 are shown as "concave" arc segments with respect to opening 153 (e.g., segments having radii of curvature which intersect opening 153) whereas arc segment 416 is shown as a "convex" arc segment with respect to opening 153 (e.g., segments having radii of curvature which do not intersect opening 153). Segments 412,418 may have equal radii of curvature or different radii of curvature. Segment 416 may have a radius of curvature equal to, greater than, or less than either of the radii of curvature corresponding to segments 412,418.

Side 156 is shown to include a plurality of segments 402, 404, 406, 408, and 410. Segments 402-410 may have various radii of curvature and may be concave or convex with respect to opening 153. For example, segments 402, 404, and 410 are shown as convex arc segments with respect to opening 153. Segment 402 may have a first radius of curvature, segment 404 may have a second radius of curvature, and segment 410 may have a third radius of curvature. In some embodiments, the first, second, and third radii of curvature have discrete values. In other embodiments, two or more of the first, second, and third radii of curvature are equal or substantially equal. Side 156 may be an inner side of opening 153 or an outer side of opening 153, wherein the inner side has a lesser average distance to the center of mixing plate 150 than does the outer side.

Segment 408 is shown as a concave arc segment with respect to opening 153. Segment 408 may have a fourth radius of curvature. The fourth radius of curvature may be equal to, greater than, or less than any of the first, second, or third radii of curvature. Segment 406 is shown as a substantially linear segment (e.g., having an infinite radius of curvature). In some embodiments, two or more of segments 402-410 may be combined into a single segment or additional segments (e.g., other than the segments shown in FIG. 5C) may be present. The orientation, arrangement, or length of any of segments 402-410 may be varied in alternate embodiments.

Still referring to FIG. 5C, opening 155 is shown to have a first end 141, a second end 158, a first side 151, and a second side 430. First end 401, second end 158, and second side 430 are shown to each include a single arc segment. End 401 and end 158 are shown as concave with respect to opening 155 whereas side 430 is shown as convex with respect to opening 155. Segments 401,158,430 may have discrete radii of curvature or two or more of segments 401,158,430 may have substantially equal radii of curvature. In some embodiments, segments 401,158,430 may be broken into multiple segments having varying radii of curvature.

Side 151 is shown to include a plurality of segments 432, 434, 436, 438, 440, 442, 444, and 446. Segments 432,434, 438,442,446 are shown as concave with respect to opening 155 whereas segment 444 is shown as convex with respect to opening 155. Segments 436,440 are shown as substantially linear segments. In some embodiments, segments 432-446 may each have different radii of curvature. For example, segment 432 may have a first radius of curvature, segment 434 may have a second radius of curvature, segment 436 may have a third radius of curvature, segment 438 may have a fourth radius of curvature, segment 440 may have a fifth radius of curvature, segment 442 may have a sixth radius of curvature, segment 444 may have a seventh radius of curvature, and segment 446 may have an eighth radius of curvature. In some embodiments, any of the first through eighth radii of curvature may be equal or approximately equal. In other embodiments all eight radii of curvature may have separate values. In some embodiments, two or more of segments 432-446 may be combined into a single segment or additional segments may be present. The orientation, arrangement, or length of any of segments 432-446 may be varied in alternate embodiments.

Opening 153 may receive a fluid having a first temperature (e.g., a hot fluid) and opening 155 may receive a second fluid having a second temperature (e.g., a cold fluid). The temperature of the first fluid may be greater than the temperature of the second fluid. In some embodiments, the temperature of the hot fluid may be approximately 140° F. or approximately 60° C. The temperature of the cold fluid may be approximately 50° F. or approximately 10° C. The first fluid and the second fluid may pass through the first opening 153 and the second opening 155 respectively and combine to form a third fluid (e.g., a mixture of the first and second fluids) having a third temperature between the first and second temperature. A user may be able to control the temperature of the third fluid by controlling an amount of the first fluid and of the second fluid permitted to pass through openings 153,155 of mixing plate 150. Advantageously, the irregular profiles of openings 153,155 may allow mixing plate 150 to achieve precise control over the fluid mixing ratio. This precise control may allow a user to achieve superior temperature control over the mixed fluid. For example, the irregular profiles of openings 135,155 may facilitate a linear relationship between mixed-fluid temperature and angular rotation of the handle. A user may rotate a temperature control handle to effect such control.

Figure 9D:
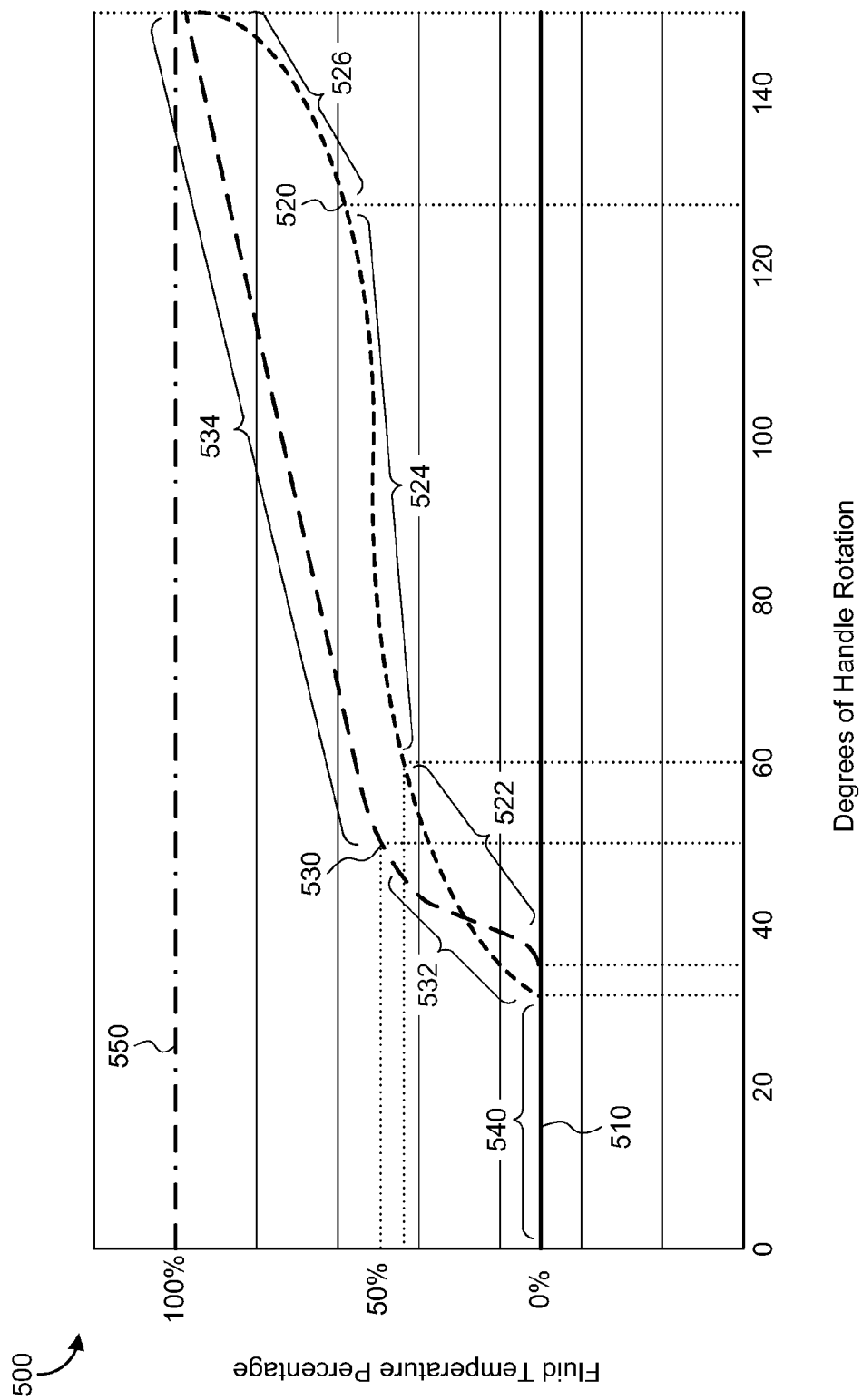
FIG. 9D is a graph illustrating an advantageously linear relationship between fluid temperature and angular rotation of a temperature control handle caused by the irregular shape of the fluid openings in the mixing plate, according to an exemplary embodiment.

Referring now to FIG. 9D, a chart 500 illustrating the temperature control performance of mixing plate 150 is shown, according to an exemplary embodiment. Line 510 represents the temperature of the cold fluid passing through opening 155 and line 550 represents the temperature of the hot fluid passing through opening 153. Curve 520 represents the performance of a conventional mixing plate design whereas curve 530 represents the performance of mixing plate 150.

Chart 500 illustrates the relative temperature of the mixed fluid (e.g., as a percentage of the difference between the cold fluid temperature 510 and the hot fluid temperature 550) as a function of the degrees of rotation of a control handle. For example a temperature percentage of "0%" corresponds to the cold fluid temperature 510 and a temperature percentage of "100%" corresponds to the hot fluid temperature 550. A temperature percentage of "50%" corresponds to a temperature halfway between the cold fluid temperature and the hot fluid temperature. The control handle may be a single handle for a sequential-type fluid control valve or a discrete temperature control handle or dial for a concentric-type fluid control valve.

Both curves 520,530 are shown to include an initial flat region 540. In region 540, rotation of the control handle may not result in any increase in the mixed fluid temperature. In some embodiments, region 540 may represent a volume control region (e.g., for a sequential-type fluid control valve). For example, rotation of the control handle from a 0 degree angle of rotation to an approximately 30 degree angle of rotation may increase the volumetric flow rate of the mixed fluid without increasing the temperature percentage.

Still referring to FIG. 9D, a user may desire a linear temperature response (e.g., a linear relationship between mixed fluid temperature and rotational angle of the control handle). Disadvantageously, conventional mixing plates may result in an "S-shaped" temperature response curve 520. For example, curve 520 is shown to include a first region 522, a second region 524, and a third region 526. In region 522, rotation of the temperature control handle by approximately 30 degrees (e.g. from a 30 degree angle of rotation to a 60 degree angle of rotation) may result in an increase of the mixed fluid temperature percentage from 0% (e.g. the cold fluid temperature) to approximately 45% (e.g., the cold fluid temperature plus approximately 45% of the difference between the cold fluid temperature and the hot fluid temperature).

Region 524 is a generally flat region in which continued rotation of the temperature control handle fails to effect a significant change in temperature. For example, in region 524, rotation of the temperature control handle by approximately 70 degrees (e.g., from a 60 degree angle of rotation to a 130 degree angle of rotation) may result in a mere 10% increase in the mixed fluid temperature percentage (e.g., from 45% to 55%).

Region 526 is a relatively sensitive region in which continued rotation of the temperature control handle by 20 degrees (e.g., from a 130 degree angle of rotation to a 150 degree angle of rotation) results in a significant 45% increase in mixed fluid temperature (e.g., from 55% to 100%).

Advantageously, mixing plate 150 is shown to result in an improved temperature response curve 530. For example, curve 530 is shown to include a first region 532 and a second region 534. In region 532, rotation of the temperature control handle by approximately 15 degrees (e.g., from a 35 degree angle of rotation to a 50 degree angle of rotation) may result in an initial increase in the mixed fluid temperature percentage of approximately 50% (e.g., from 0% to 50%). In region 534, rotation of the temperature control handle by 100 degrees (e.g., from a 50 degree angle of rotation to a 150 degree angle of rotation) may result in a substantially linear increase in the mixed fluid temperature percentage from approximately 50% to 100%. The irregular shape of openings 153,155 may achieve this desirable linear temperature response.

Figure 10A:
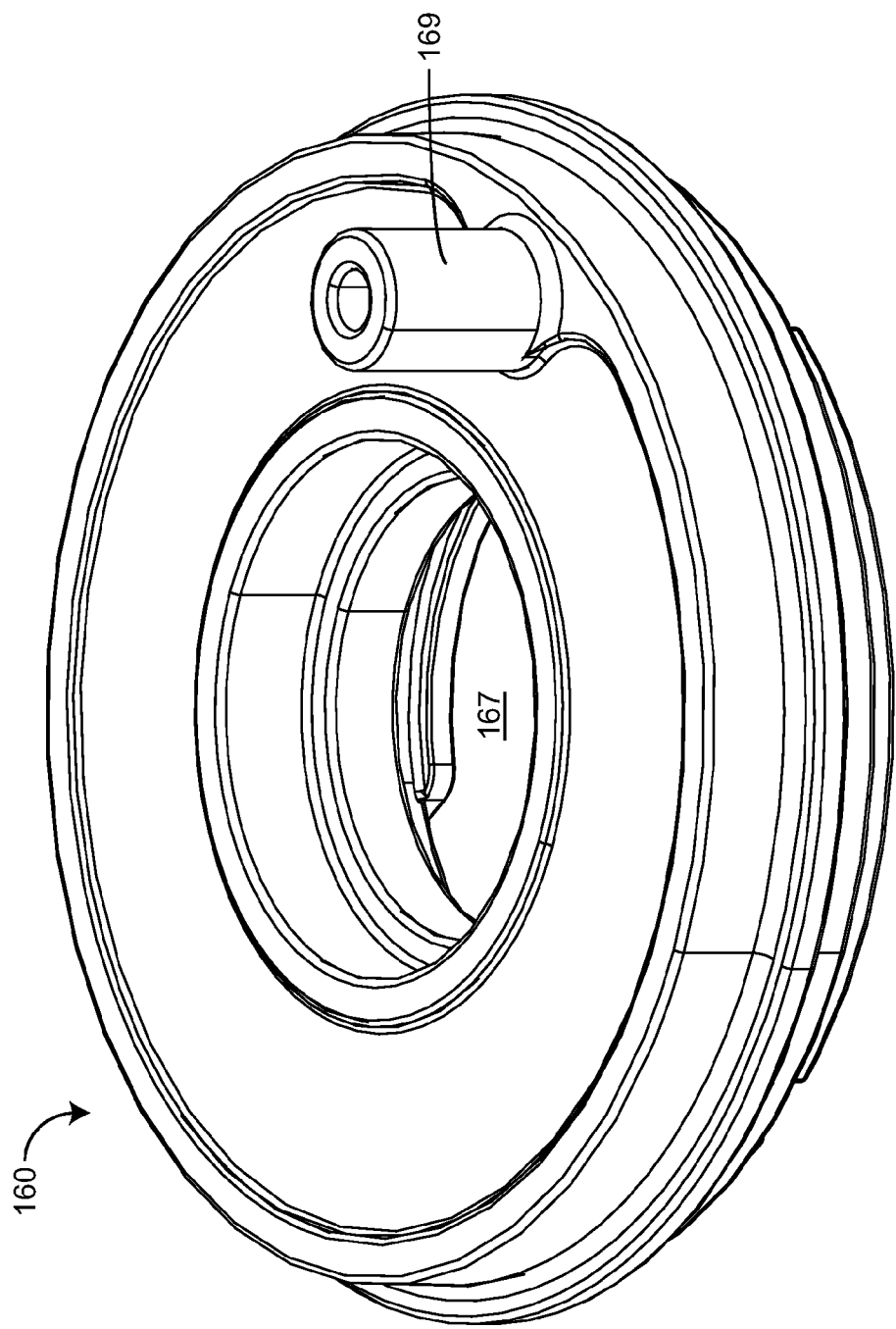
FIG. 10A is a top perspective view of the temperature control plate, according to an exemplary embodiment.
Figure 10B:
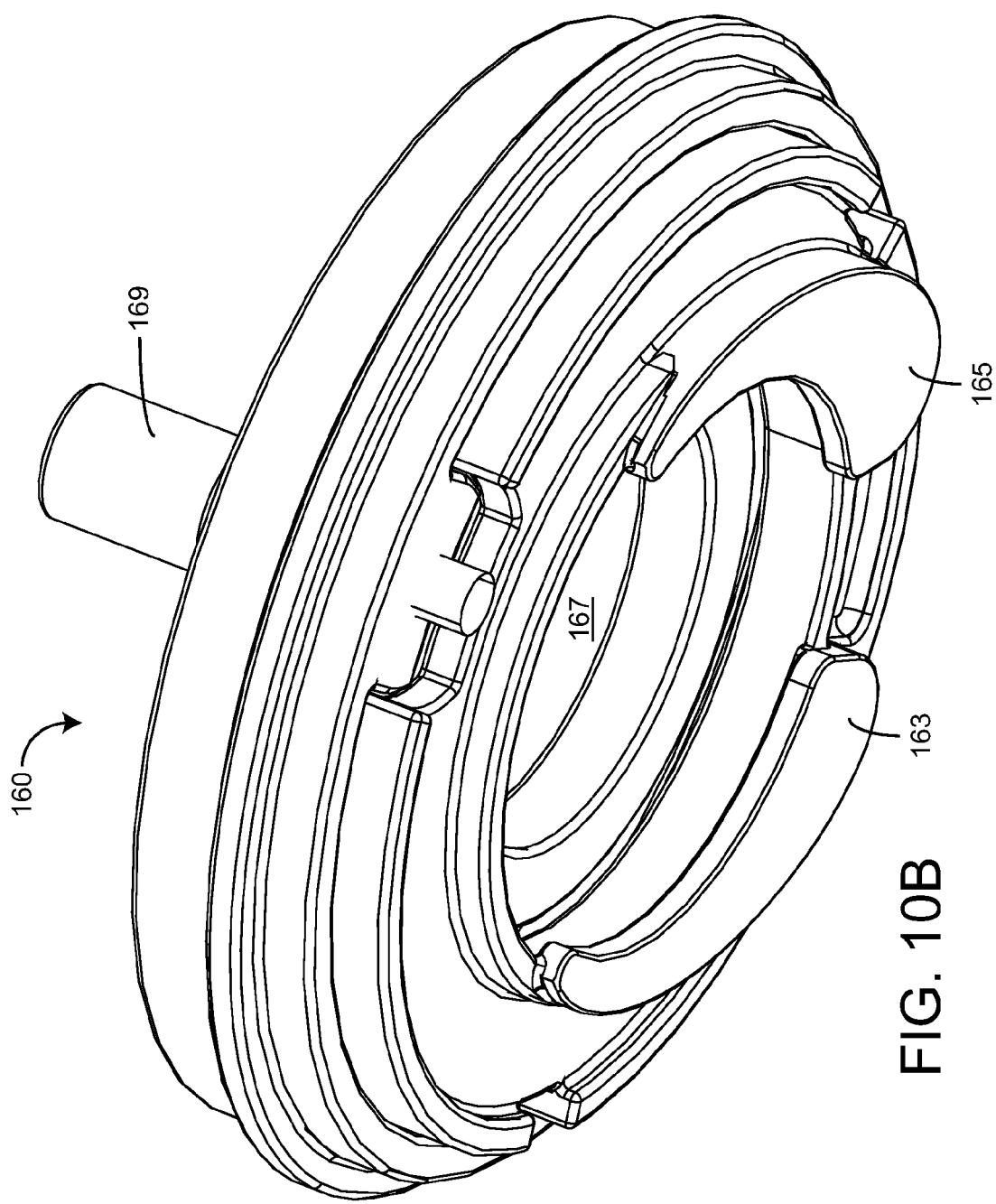
FIG. 10B is a bottom perspective view of the temperature control plate showing surfaces configured to cover and uncover openings in the mixing plate, according to an exemplary embodiment.

Referring now to FIGS. 10A and 10B, cartridge 100 may further include a temperature control plate 160. In some embodiments, temperature control plate 140 may be substantially circular. Temperature control plate 160 may be positioned adjacent to mixing plate 150. In some embodiments, plate 160 and may be rotatable relative to mixing plate 150. Rotation of temperature control plate 160 relative to mixing plate 150 may cover or uncover openings 153,155, thereby allowing a user to control the temperature of the mixed fluid. Temperature control plate 160 may be rotatable between a first position in which opening 153 is completely uncovered and opening 155 is completely covered and a second position in which opening 153 is completely covered and opening 155 is completely covered. Temperature control plate 160 is shown to include a first cover 163, a second cover 165, a central opening 167, and a connection pin 169.

Temperature control plate 160 may include covers 163, 165. In some embodiments, covers 163,165 may align with openings 153,155 either partially or completely. The alignment of covers 163,165 with openings 153,155 may control the amount of the first and second fluids permitted to pass through openings 153,155 and enter mixing chamber 172. For example, when temperature control plate 160 is in the first position, cover 163 may completely uncover opening 153, thereby allowing the first fluid to flow through opening 153 and enter mixing chamber 172. When temperature control plate 160 is in the second position, cover 165 may completely uncover opening 155, thereby allowing the second fluid to flow through opening 155 and enter mixing chamber 172. When temperature control plate 160 is in an intermediate position (e.g., a position between the first position and the second position), cover 163 may partially block opening 153 and/or cover 165 may partially block opening 155, thereby allowing a controlled amount of each fluid to enter the mixing chamber.

In some embodiments, temperature control plate 160 may include a central opening 167. Central opening 167 may be aligned with opening 157 and may extend completely through temperature control plate 160. In some embodiments, central opening 167 may allow a shaft or other element to extend through plate 160 for interaction with another component of cartridge 100. For example, a central shaft may extend through central openings 167,157 and attach to pressure balance unit 140. The central shaft may allow a user to cause rotation of pressure balance unit 140 without affecting the position (e.g., linear or rotational position) of mixing plate 150.

Still referring to FIGS. 10A and 10B, in some embodiments, temperature control plate 160 may include a connection pin 169. In some embodiments, connection pin 169 may extend from temperature control plate 160 in a direction transverse to a face of plate 160 (e.g., axially). Connection pin 169 may be used to attach, secure, or otherwise kinematically couple temperature control plate 160 to a user-operable temperature control handle. For example, connection pin 169 may be configured to fit within a hole, slot, indentation, opening, or other connecting feature of the temperature control handle. Rotation of the temperature control handle may cause connection pin 169 to rotate about central opening 167, thereby causing temperature control plate 160 to rotate.

Figure 11:
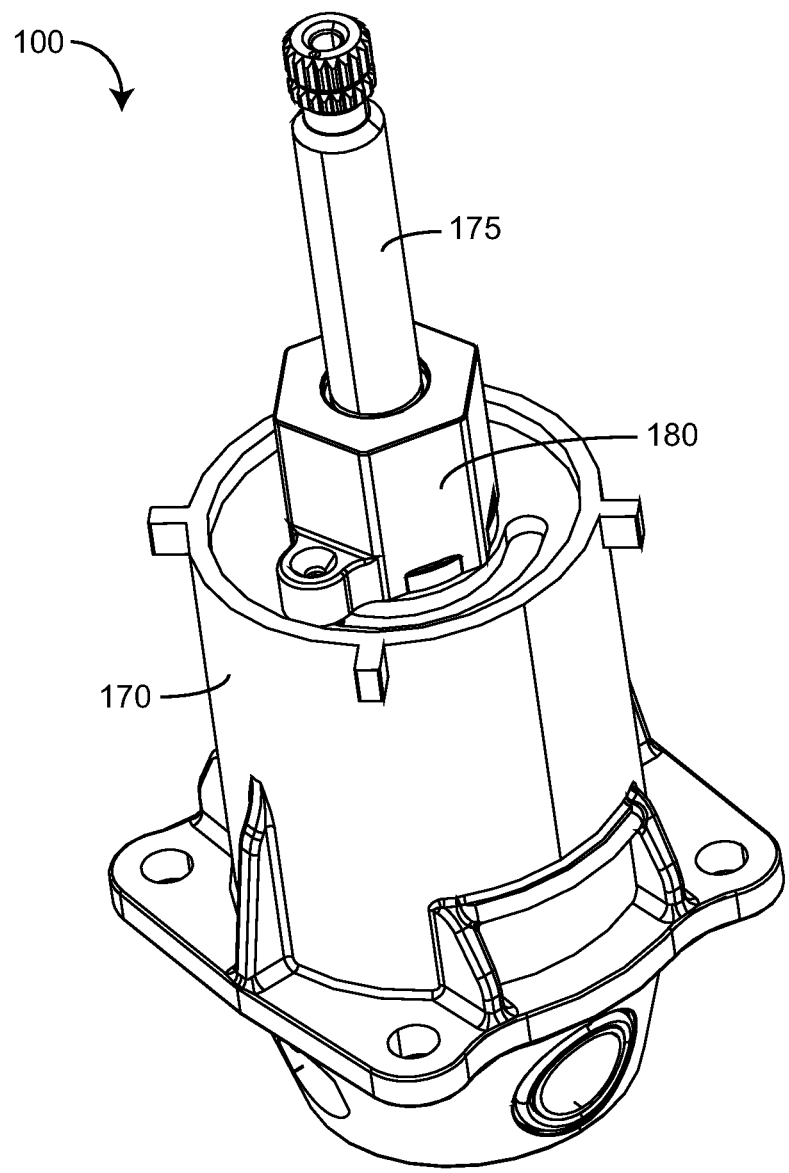
FIG. 11 is a drawing of the concentric diverter cartridge showing a volume control shaft for rotating the second diverter plate and a temperature control sleeve for rotating the temperature control plate and surrounding the volume control shaft, according to an exemplary embodiment.

Referring now to FIG. 11, a perspective view of diverter cartridge 100 is shown, according to an exemplary embodiment. In some embodiments, cartridge 100 may include a shaft 175. Shaft 175 may align with a central axis of cartridge 100 and may be referred to as a central shaft. Shaft 175 may be attached to pressure balance unit 140. Rotation of shaft 175 may cause pressure balance unit 140 to rotate. In some embodiments, rotation of shaft 175 may cause second diverter plate 130 to rotate relative to first diverter plate 120 (e.g., if second diverter plate 130 is rotatably linked to pressure balance unit 140). Rotation of shaft 175 may increase or decrease the volumetric flow rate of the first and second fluids into pressure balance unit 140 by opening or closing the fluid connection between inlet channels 126,127 and inlet channels 136,137. Accordingly, shaft 175 may be referred to as a volume control shaft.

Advantageously, rotation of shaft 175 in a first direction (e.g., from a neutral position) may increase the volume flow rate of the first and/or second fluids and divert the mixed fluid to outlet port 104. Rotation of shaft 175 in a second direction (e.g., from the neutral position) may increase the volume flow rate of the first and/or second fluids and divert the mixed fluid to outlet port 105. In some embodiments, shaft 175 may extend through openings 147,157 in temperature control plate 160 and mixing plate 150.

Still referring to FIG. 11, cartridge 100 may further include a sleeve 180. Sleeve 180 may be concentric with shaft 175 around the central axis of cartridge 100. In some embodiments, sleeve 180 may be attached to temperature control plate 160 (e.g. via connecting pin 169). Rotation of sleeve 180 may cause temperature control plate 160 to rotate relative to mixing plate 150, thereby increasing or decreasing the relative proportions of the first fluid and the second fluid permitted to enter mixing chamber 172. Therefore, rotation of sleeve 180 may provide a means for controlling the temperature of the mixed fluid. Sleeve 180 may be referred to as a temperature control sleeve. Advantageously, shaft 175 and sleeve 180 may independently rotate about the central axis. In other words, rotation of shaft 175 may not cause rotation of sleeve 180 and rotation of sleeve 180 may not cause rotation of shaft 175. Independent rotation may allow a user to control each of the temperature and the volumetric flow rate of the mixed fluid without affecting the other.

Figure 12:
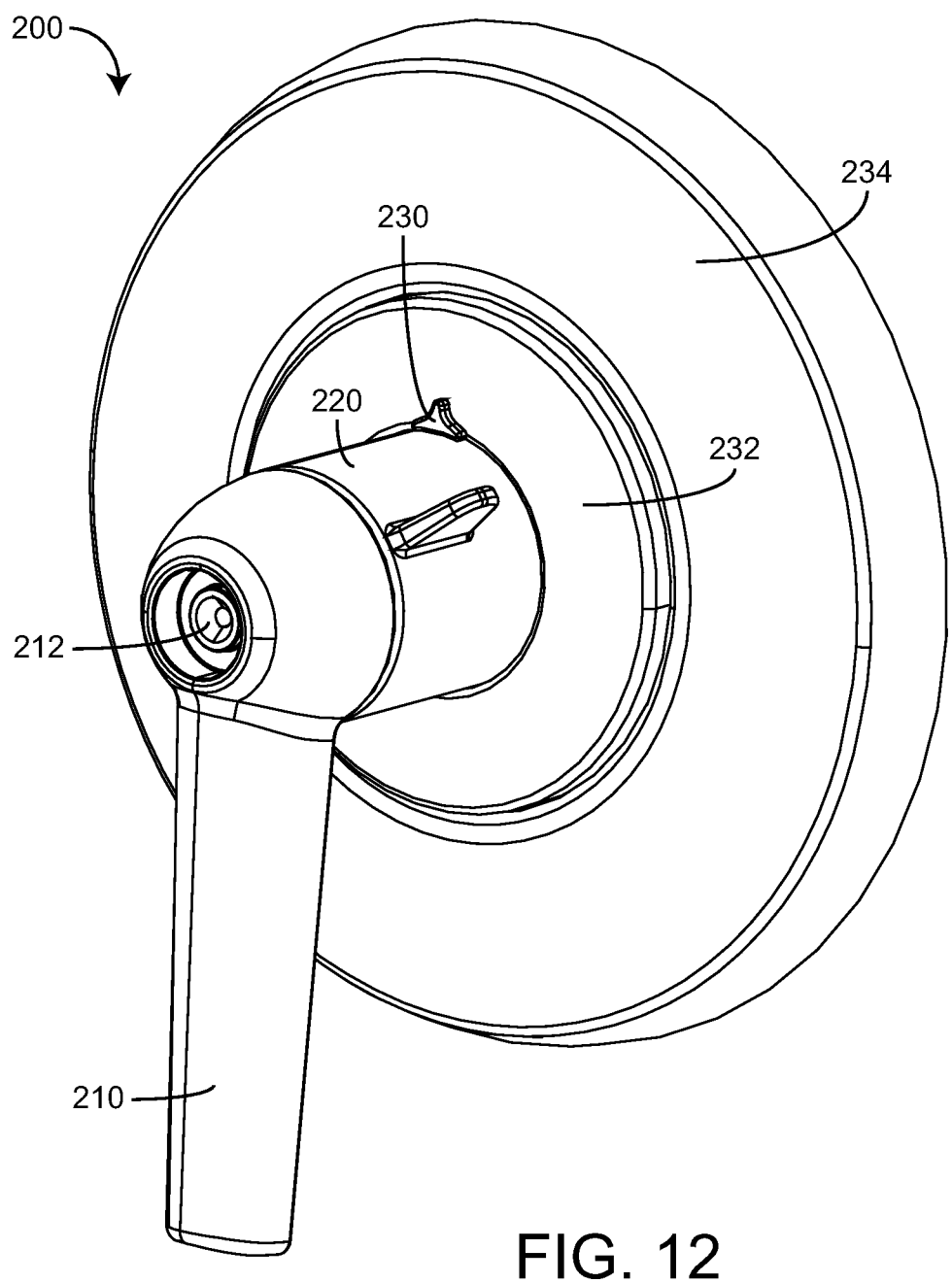
FIG. 12 is a drawing of a user interface for operating the concentric diverter cartridge including a volume control handle, a temperature control handle, and a marker, according to an exemplary embodiment.

Referring now to FIG. 12, a concentric control interface 200 for use with concentric cartridge 100 is shown, according to an exemplary embodiment. Interface 200 may include a user-operable volume control handle 210, a user-operable temperature control handle 220, and a marker 230. Volume control handle 210 may be configured to attach to volume control shaft 175. Rotation of volume control handle 210 may cause rotation of volume control shaft 175, thereby increasing or decreasing the volumetric flow rate of one or more of the fluids. In some embodiments, volume control handle 210 may include a bore 212 configured to fit over an exposed end of volume control shaft 175. Bore 212 may include notches, grooves, slots, splines, indentations, extrusions, or other features configured to mate with corresponding features of volume control shaft 175. In other embodiments, volume control handle 210 may attach to volume control shaft 175 in other ways. For example, volume control handle 210 may include a coupling peg configured to fit within a hollow core of volume control shaft 175 such that the outer perimeter of volume control shaft 175 circumscribes the coupling peg.

Advantageously, a user may rotate volume control handle 210 in a first direction (e.g., from a neutral position) to increase the volume flow rate of the first and/or second fluids and divert the mixed fluid to outlet port 104. In some implementations, outlet port 104 may be fluidly connected to a bathtub faucet and the user may direct flow to the bathtub faucet by rotating handle 210 in the first direction. Continued rotation of volume control handle 210 in the first direction may increase the volume flow rate of the mixed fluid to outlet port 104.

A user may rotate volume control handle 210 in a second direction (e.g., from the neutral position) may increase the volume flow rate of the first and/or second fluids and divert the mixed fluid to outlet port 105. In some implementations, outlet port 105 may be fluidly connected to a shower head and the user may direct flow to the shower head by rotating handle 210 in the second direction. Continued rotation of volume control handle 210 in the second direction may increase the volume flow rate of the mixed fluid to outlet port 105.

Still referring to FIG. 12, concentric control interface 200 may further include a temperature control handle 220. Temperature control handle 220 may be configured to attach to temperature control sleeve 180. Rotation of temperature control handle 220 may cause rotation of temperature control sleeve 180, thereby controlling the temperature of the mixed fluid. In some embodiments, concentric cartridge 100 may be installed in a wall or other surface. When installed in a surface, temperature control handle 220 may be disposed between the surface and volume control handle 210. In some embodiments, temperature control handle 220 may circumscribe volume control shaft 175. Such circumscription may allow volume control shaft 175 to extend through temperature control handle 220 (e.g., in a direction away from the surface) before attaching to volume control handle 210.

Advantageously, handles 210,220 may be independently rotatable. For example, a user may set temperature control handle 220 to a desired position corresponding to a desired temperature of the mixed fluid. The user may then increase or decrease the volumetric flow rate of the mixed fluid via volume control handle 210 without changing the position of temperature control handle 220. Concentric cartridge 100 may be referred to as having "temperature memory" because the position of temperature control handle 220 may "remember" a previous temperature setting. Advantageously, such temperature memory may allow a user to make repeated use of cartridge 100 (e.g., when taking a shower, bathing, etc.) without having to set the desired fluid temperature upon each use.

In some embodiments, interface 200 may include a marker 230. Marker 230 may be a rotatable component concentric with volume control shaft 175 and temperature control sleeve 180. Marker 230 may be rotated by a user to indicate, designate, mark, or otherwise record an angular position of volume control handle 210 or temperature control handle 220. For example, a user may decide that a specific position of volume control handle 210 results in a preferred flow rate. The user may align marker 230 with volume control handle 210 in the preferred position. When the volume control handle is rotated into an "off" or "no-flow" position, marker 230 may remain in the preferred position. Upon subsequent operation of cartridge 100, the user may readily select the preferred flow rate by rotating volume control handle 210 into alignment with marker 230.

In some embodiments, marker 230 may be used to record a preferred temperature setting. For example, a user may decide that a specific position of temperature control handle 220 results in a preferred fluid temperature. The user may align marker 230 with temperature control handle 220 in the preferred position to indicate, mark, or record the preferred temperature position. Because it may be unnecessary to rotate temperature control handle 220 during normal operation of cartridge 100, marker 230 may be used to mark a second preferred temperature position. The second preferred temperature position may correspond to a preferred temperature for a second user (e.g., an adult user, a child user) or indicate a desirable temperature for another use of the mixed fluid (e.g., bath, shower, cleaning, etc.). In some embodiments, multiple markers 230 may be used to record a plurality of preferred positions for volume control handle 210 and temperature control handle 220. Different markers 230 may have different colors, shapes, or other distinguishing features. A user may associate a particular marker 230 with a preferred temperature setting, volume flow rate setting, or both.

The temperature control handle 220 includes a structure 222 (e.g., handle portion, fin, etc.) configured to facilitate grasping and rotation of the temperature control handle 220 by the user. As shown, the structure 222 has an aspect ratio such that the radial and/or axial dimensions of the structure 222 are much greater than the circumferential dimension. Such an aspect ratio facilitates alignment of the temperature control handle 220 with the marker 230.

According to the embodiment shown, the marker 230 is coupled to an inner portion 232 of the escutcheon. In such an embodiment, rotation of the marker 230 causes the inner portion 232 of the escutcheon to rotate relative to an outer portion of the escutcheon. According to various embodiments, the outer portion 234 of the escutcheon may be fixed relative to the wall, and the inner portion 232 and the outer portion 234 may be on a first or outer side of the wall while the valve cartridge is on a second or inner side of the wall. According to another embodiment, an intermediate portion of the escutcheon may be located radially between the inner portion 232 and the outer portion 234 of the escutcheon. The intermediate portion may rotate independently of, and relative to, the outer portion 234, the inner portion 232, the temperature control handle 220 and the volume control handle 210. The intermediate portion of the escutcheon may be advantageously used to provide a second marker to provide an additional volume or temperature control memory setting.

The inner portion 232 may include an annular groove about the outer diameter thereof for receiving a seal (e.g., o-ring, gasket, etc.) therein. Advantageously, such a seal may prevent water from passing between the inner portion 232 and the outer portion 234. Such a seal may also provide resistance to rotation of the inner portion 232, thereby increasing the efficacy of the inner portion 232 as a "memory" feature. According to another embodiment, the outer diameter annular groove of the inner portion 232 may receive an inwardly extending annular flange from the inner diameter of the outer portion 234, thereby creating a labyrinthine or tortuous path to prevent water from passing therebetween. According to various other embodiments, a seal may be located on the inner diameter of outer portion 234 to seal against the inner portion 232, and the inner portion 232 may have an outwardly extending flange to engage an annular groove in the inner diameter of the outer portion 234. One or more of the seal and/or tortuous path configurations may implemented between the inner diameter of the inner portion 232 and the outer diameter of the temperature control handle 220.

ILLUSTRATIVE EMBODIMENTS

While various embodiments of the present invention are discussed in detail herein, it should be appreciated that the present invention provides many applicable inventive concepts that can be embodied in a wide variety of specific contexts. The specific embodiments discussed herein are merely illustrative of specific embodiments of the invention and do not delimit the scope of the invention.

Another illustrative embodiment of the present disclosure is a diverter cartridge for a fluid mixing valve. The diverter cartridge includes an inlet adapter and a diverter plate. The inlet adapter includes a first inlet port, a second inlet port, a first outlet port and a second outlet port. The diverter plate includes a first outlet channel and a second outlet channel, wherein the diverter plate is rotatable relative to the inlet adapter between a first end position, a second end position, and a neutral position between the first and second end positions. Rotation of the diverter plate from the neutral position toward the first end position increases a volume flow rate of a fluid through the first outlet channel and diverts the fluid to exit the cartridge via the first outlet port, and rotation of the diverter plate from the neutral position toward the second end position increases a volume flow rate of a fluid through the second outlet channel and diverts the fluid to exit the cartridge via the second outlet port.

In some embodiments, the diverter plate further includes a third outlet channel and a fourth channel. Rotation of the diverter plate between the neutral position and the first end position may vary a volume flow rate of the fluid through the third outlet channel and divert the fluid to exit the cartridge at least partially via the second outlet port, and rotation of the diverter plate between the neutral position and the second end position may vary a volume flow rate of the fluid through the fourth outlet channel and divert the fluid to exit the cartridge at least partially via the first outlet port.

For some rotational positions of the diverter plate between the neutral position and the first end position, the fluid may be diverted to exit the cartridge via only the first outlet port, and for other rotational positions of the diverter plate between the neutral position and the first end position, the fluid may be permitted to exit the cartridge via both the first outlet port and the second outlet port. For some rotational positions of the diverter plate between the neutral position and the second end position, the fluid may be diverted to exit the cartridge via only the second outlet port, and for other rotational positions of the diverter plate between the neutral position and the second end position, the fluid may be permitted to exit the cartridge via both the second outlet port and the first outlet port. For some embodiments, rotation of the diverter plate from a second intermediate position toward the second end position decreases a volume flow rate of the fluid through the second outlet channel and increases a volume flow rate of the fluid through the fourth outlet channel, wherein the second intermediate position is between the neutral position and the second end position.

Another illustrative embodiment of the present disclosure is a concentric cartridge for a fluid mixing valve. The concentric cartridge includes an inlet adapter configured to receive a first fluid and a second fluid, a pressure balance unit, a diverter plate rotatably coupled to the pressure balance unit and positioned between the inlet adapter and the pressure balance unit, a temperature control plate, and a mixing plate positioned between the pressure balance unit and the temperature control plate. The pressure balance unit and the diverter plate are rotatable relative to the inlet adapter and the temperature control plate is rotatable relative to the mixing plate.

In some embodiments, the pressure balance unit and the diverter plate are configured to rotate between a full-volume position in which the first fluid and the second fluid are permitted to flow through the diverter plate and into the pressure balance unit and a no-volume position in which the first fluid and the second fluid are blocked from entering the pressure balance unit by the diverter plate.

In some embodiments, the temperature control plate is configured to rotate between a first position in which the first fluid is permitted to enter a mixing chamber through a first opening in the mixing plate and the second fluid is blocked by the temperature control plate from entering the mixing chamber and a second position in which the second fluid is permitted to enter the mixing chamber through a second opening in the mixing plate and the first fluid is blocked by the temperature control plate from entering the mixing chamber. The pressure balance unit may be rotatable via a user-operable volume control handle, and the temperature control plate may be rotatable via a user-operable temperature control handle. During rotation of the pressure balance unit, the temperature control plate may remain substantially stationary, and wherein during rotation of the temperature control plate, the pressure balance unit may remain substantially stationary. In some embodiments, the mixing plate remains substantially stationary.

In some embodiments, the pressure balance unit may be coupled to a central shaft defining an axis, and rotation of the central shaft causes rotation of the pressure balance unit relative to the inlet adapter. The central shaft may configured to attach to a user-operable volume control handle, and rotation of the volume control handle may cause rotation of the central shaft. The temperature control plate may be coupled to a connecting sleeve formed around the central shaft, and rotation of the connecting sleeve may cause rotation of the temperature control plate relative to the mixing plate. The connecting sleeve may be configured to attach to a user-operable temperature control handle, and rotation of the temperature control handle may cause rotation of the connecting sleeve.

Another illustrative embodiment of the present disclosure is a concentric cartridge for a fluid control valve including a volume control shaft and a temperature control sleeve located around the volume control shaft. The volume control shaft and the temperature control sleeve are independently rotatable about a shared axis. The temperature control sleeve remains substantially stationary during rotation of the volume control shaft and the volume control shaft remains substantially stationary during rotation of the temperature control sleeve. In one embodiment, the concentric cartridge includes a diverter plate having a first inlet channel and a second channel, wherein rotation of the volume control shaft causes rotation of the diverter plate between a first position in which the first and second inlet channels are fluidly connected with respective first and second fluid supply lines and a second position in which the first and second inlet channels are not fluidly connected with the respective first and second fluid supply lines. In some embodiments, the volume control shaft may be configured to attach to a user-operable volume control handle, and the temperature control sleeve may be configured to attach to a user-operable temperature control handle. Rotation of the volume control handle causes rotation of the volume control shaft and rotation of the temperature control handle causes rotation of the temperature control sleeve. In some embodiments, the concentric cartridge further includes a temperature control plate. Rotation of the temperature control sleeve causes rotation of the temperature control plate between a first position in which a first fluid is permitted to enter a mixing chamber and a second fluid is blocked from entering the mixing chamber and a second position in which the second fluid is permitted to enter the mixing chamber and the first fluid is blocked from entering the mixing chamber.

The construction and arrangement of the elements of the diverter cartridge as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A diverter cartridge for a fluid mixing valve, the cartridge comprising:
    an inlet adapter having a first inlet port, a second inlet port, a first outlet port and a second outlet port;
    a diverter plate having:
        a first surface comprising a first opening and a second opening;
        a second surface opposite the first surface, the second surface comprising a third opening, a fourth opening, a fifth opening, and a sixth opening;
        a first inlet channel extending through the diverter plate and connecting the first opening, the third opening, and the fourth opening; and
        a second inlet channel extending through the diverter plate and connecting the second opening, the fifth opening, and the sixth opening;
    wherein the diverter plate is rotatable relative to the inlet adapter between a first end position, a second end position, and a neutral position between the first and second end positions;
    wherein rotation of the diverter plate from the neutral position toward the first end position fluidly connects the first inlet channel with the first inlet port via the third opening, fluidly connects the second inlet channel with the second inlet port via the fifth opening, increases a volume flow rate of a fluid through at least one of the first and second inlet channels, and diverts the fluid to exit the cartridge via the first outlet port; and
    wherein rotation of the diverter plate from the neutral position toward the second end position fluidly connects the first inlet channel with the first inlet port via the fourth opening, fluidly connects the second inlet channel with the second inlet port via the sixth opening, increases a volume flow rate of a fluid through at least one of the first and second inlet channels, and diverts the fluid to exit the cartridge via the second outlet port.

2. The diverter cartridge of claim 1, wherein the neutral position is a no-flow position in which fluid is prevented from flowing through the cartridge, the first end position is a maximum flow position for the first outlet port, and the second end position is a maximum flow position for the second outlet port.

3. The diverter cartridge of claim 1, wherein the first outlet port and the second outlet port are mutually exclusive outlets such that the fluid is prevented from exiting the cartridge via the second outlet port when diverted to the first outlet port and the fluid is prevented from exiting the cartridge via the first outlet port when diverted to the second outlet port.

4. The diverter cartridge of claim 1, wherein the first inlet channel and the second inlet channel extend through the diverter plate and each of the first inlet channel and the second inlet channel have an upper opening located on a top surface of the diverter plate and a pair of lower openings located on a bottom surface of the diverter plate;
    wherein rotation of the diverter plate from the neutral position toward the first end position fluidly connects one of the lower openings of the first inlet channel with the first inlet port and one of the lower openings of the second inlet channel with the second inlet port; and
    wherein rotation of the diverter plate from the neutral position toward the second position fluidly connects the other of the lower openings of the first inlet channel with the first inlet port and the other of the lower openings of the second inlet channel with the second inlet port.

5. The diverter cartridge of claim 1, wherein neither of the first or second inlet channels are fluidly connected with the first or second inlet ports when the diverter plate is in the neutral position.

6. The diverter cartridge of claim 5, wherein the diverter cartridge effectuates volume control over the fluid permitted to flow through the cartridge by varying a fluid connection between the first and second inlet channels and the first and second inlet ports respectively.

7. The diverter cartridge of claim 1, wherein the diverter plate further includes a first outlet channel and a second outlet channel; and
    wherein the first outlet channel is fluidly connected with the first outlet port when fluid is diverted to the first outlet port and the second outlet channel is fluidly connected with the second outlet port when fluid is diverted to the second outlet port.

8. The diverter cartridge of claim 1, further comprising:
    a stationary plate positioned between the inlet adapter and the diverter plate;
    wherein the stationary plate has a first inlet channel fluidly connected with the first inlet port, a second inlet channel fluidly connected with the second inlet port, a first outlet channel fluidly connected with the first outlet port, and a second outlet channel fluidly connected with the second outlet port.

9. The diverter cartridge of claim 8, wherein the first and second outlet channels of the stationary plate each have an upper opening in a top surface of the stationary plate and a lower opening in a bottom surface of the stationary plate; and
    wherein the upper openings are larger than the lower openings.

10. The diverter cartridge of claim 9, wherein the diverter plate further includes a first outlet channel and a second outlet channel;
    wherein the first outlet channel of the diverter plate is fluidly connected with the first outlet channel of the stationary plate when fluid is diverted to the first outlet port; and wherein the second outlet channel of the diverter plate is fluidly connected with the second outlet channel of the stationary plate when fluid is diverted to the second outlet port.

11. A diverter cartridge for a fluid mixing valve, the cartridge comprising:
   an inlet adapter having a first inlet port, a second inlet port, a first outlet port and a second outlet port; and
   a diverter plate having:
      a first surface comprising a first opening and a second opening;
      a second surface opposite the first surface, the second surface comprising a third opening, a fourth opening, a fifth opening, and a sixth opening;
      a first inlet channel extending through the diverter plate and connecting the first opening, the third opening, and the fourth opening;
      a second inlet channel extending through the diverter plate and connecting the second opening, the fifth opening, and the sixth opening; and
      a first outlet channel and a second outlet channel;
   wherein the diverter plate is rotatable relative to the inlet adapter between a first end position, a second end position, and a neutral position between the first and second end positions;
   wherein rotation of the diverter plate from the neutral position toward the first end position fluidly connects the first inlet channel with the first inlet port via the third opening, fluidly connects the second inlet channel with the second port channel via the fifth opening, increases a volume flow rate of a fluid through the first outlet channel, and diverts the fluid to exit the cartridge via the first outlet port; and
   wherein rotation of the diverter plate from the neutral position toward the second end position fluidly connects the first inlet channel with the first inlet port via the fourth opening, fluidly connects the second inlet channel with the second port channel via the sixth opening, increases a volume flow rate of a fluid through the second outlet channel, and diverts the fluid to exit the cartridge via the second outlet port.

12. The diverter cartridge of claim 11, wherein the first inlet channel is fluidly connected with the first inlet port and the second inlet channel is fluidly connected with the second inlet port regardless of the rotational position of the diverter plate.

13. The diverter cartridge of claim 11, wherein the diverter cartridge effectuates volume control over the fluid permitted to flow through the cartridge by varying a fluid connection between the first outlet channel and the first outlet port and between the second outlet channel and the second outlet port.

14. The diverter cartridge of claim 11, wherein the first outlet port and the second outlet port are mutually exclusive outlets such that the fluid is prevented from exiting the cartridge via the second outlet port when diverted to the first outlet port and the fluid is prevented from exiting the cartridge via the first outlet port when diverted to the second outlet port.

15. The diverter cartridge of claim 11, wherein the diverter plate further includes a third outlet channel, and rotation of the diverter plate between the neutral position and the first end position varies a volume flow rate of the fluid through the third outlet channel and diverts the fluid to exit the cartridge at least partially via the second outlet port.

16. The diverter cartridge of claim 15, wherein for some rotational positions of the diverter plate between the neutral position and the first end position, the fluid is diverted to exit the cartridge via only the first outlet port; and
   wherein for other rotational positions of the diverter plate between the neutral position and the first end position, the fluid is permitted to exit the cartridge via both the first outlet port and the second outlet port.

17. The diverter cartridge of claim 16, wherein rotation of the diverter plate from a first intermediate position toward the first end position decreases a volume flow rate of the fluid through the first outlet channel and increases a volume flow rate of the fluid through the third outlet channel; and
   wherein the first intermediate position is between the neutral position and the first end position.

* * * * *